United States Patent
Hamagishi et al.

(10) Patent No.: US 9,766,469 B2
(45) Date of Patent: Sep. 19, 2017

(54) STEREOSCOPIC IMAGE DISPLAY DEVICE

(71) Applicant: Samsung Display Co., Ltd., Yongin, Gyenonggi-Do (KR)

(72) Inventors: Goro Hamagishi, Hwaseong-si (KR); Se Huhn Hur, Yongin-si (KR); Kyung Ho Jung, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 393 days.

(21) Appl. No.: 14/532,661

(22) Filed: Nov. 4, 2014

(65) Prior Publication Data

US 2015/0362740 A1 Dec. 17, 2015

(30) Foreign Application Priority Data

Jun. 16, 2014 (KR) .................. 10-2014-0073075

(51) Int. Cl.
*G02B 27/22* (2006.01)
*H04N 13/04* (2006.01)
*G02B 27/00* (2006.01)

(52) U.S. Cl.
CPC ..... *G02B 27/2214* (2013.01); *G02B 27/0093* (2013.01); *H04N 13/0409* (2013.01); *H04N 13/0415* (2013.01); *H04N 13/0468* (2013.01); *H04N 13/0472* (2013.01); *H04N 13/0475* (2013.01); *H04N 13/0477* (2013.01)

(58) Field of Classification Search
None
See application file for complete search history.

(56) References Cited

U.S. PATENT DOCUMENTS

| | | | |
|---|---|---|---|
| 6,064,424 A | 5/2000 | Van Berkel et al. | |
| 8,233,036 B2 | 7/2012 | Park | |
| 8,436,953 B2 | 5/2013 | Sakamoto et al. | |
| 2005/0237622 A1* | 10/2005 | Yoshino | G02B 27/2285 359/618 |
| 2009/0128547 A1 | 5/2009 | Park | |
| 2009/0201362 A1 | 8/2009 | Shestak et al. | |
| 2010/0157181 A1 | 6/2010 | Takahashi | |
| 2011/0050683 A1 | 3/2011 | Yun et al. | |
| 2011/0181706 A1 | 7/2011 | Harrold et al. | |
| 2012/0044330 A1 | 2/2012 | Watanabe | |

(Continued)

FOREIGN PATENT DOCUMENTS

| | | |
|---|---|---|
| JP | 3229824 | 9/2001 |
| JP | 2013-037264 | 2/2013 |

(Continued)

*Primary Examiner* — Frederick Bailey
(74) *Attorney, Agent, or Firm* — Innovation Counsel LLP

(57) ABSTRACT

A stereoscopic image display device includes: a display panel including a plurality of pixels arranged in a matrix format; and a viewpoint division unit dividing light of a left-eye image and light of a right-eye image displayed by the plurality of dots and transferring the divided light to a plurality of viewpoints corresponding to each dot, wherein the viewpoint division unit includes a plurality of openings and a light blocking unit, and when a horizontal directional width of each of the plurality of openings corresponds to an m number of dots (m is a natural number), a number dots of n adjacent in the horizontal direction displaying the left-eye image and the right-eye image is equal to $n=2m+1$ or $n=2(m+1)$.

19 Claims, 71 Drawing Sheets

(56) References Cited

U.S. PATENT DOCUMENTS

| | | |
|---|---|---|
| 2012/0050857 A1 | 3/2012 | Lee et al. |
| 2012/0182407 A1 | 7/2012 | Yoshida |
| 2013/0135719 A1 | 5/2013 | Tsai |
| 2013/0241964 A1* | 9/2013 | Ohyama ................ G09G 3/003 345/690 |
| 2013/0335537 A1* | 12/2013 | Goro .................. H04N 13/0402 348/54 |
| 2015/0029317 A1* | 1/2015 | Kim .................. G02B 27/2214 348/59 |

FOREIGN PATENT DOCUMENTS

| | | |
|---|---|---|
| JP | 2013-068707 | 4/2013 |
| KR | 10-2009-0054500 | 6/2009 |
| KR | 10-2010-0005268 | 1/2010 |
| KR | 10-2012-0119982 | 11/2012 |
| KR | 10-2012-0133719 | 12/2012 |
| KR | 10-2013-0027389 | 3/2013 |
| KR | 10-2014-0030604 | 3/2014 |
| KR | 10-2014-0033560 | 3/2014 |
| WO | 2011-007757 | 12/2012 |

* cited by examiner

FIG. 13

| | LCD dots distribution for LR image | Free dot No. | Dot number to one barrier aperture width. | Max Crosstalk at OVD with HT | Barrier aperture ratio | |
|---|---|---|---|---|---|---|
| ① | 2 dots ; 1-1 (L-R) | 0 | 1 | 50% | 1/2 50% | Without free dot |
| ② | 3 dots ; 1-2 (L-RR) | 1 | 1 | 25% | 1/3 33.3% | |
| ③ | 4 dots ; 2-2 (LL-RR) | 2 | 1 | 0% | 1/4 25% | |
| ④ | 5 dots ; 2-3 (LL-RRR) | 1 | 2 | 12.5% | 2/5 40% | |
| ⑤ | 6 dots ; 3-3 (LLL-RRR) | 2 | 2 | 0% | 2/6 33.3% | |
| ⑥ | 7 dots ; 3-4 (LLL-RRRR) | 1 | 3 | 8% | 3/7 42.9% | |
| ⑦ | 8 dots ; 4-4 (LLLL-RRRR) | 2 | 3 | 0% | 3/8 37.5% | |
| ⑧ | 9 dots ; 4-5 (LLLL-RRRRR) | 1 | 4 | 8% | 4/9 44.4% | |

Barrier aperture ratio; 50%

Barrier aperture ratio; 40%

Barrier aperture ratio; 42.9%

Barrier aperture ratio; 37.5%

FIG. 28
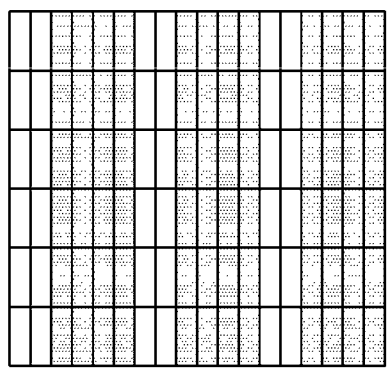
(A)
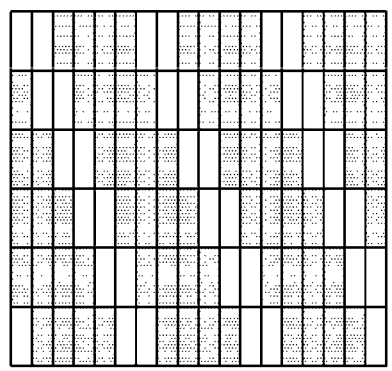
(B)
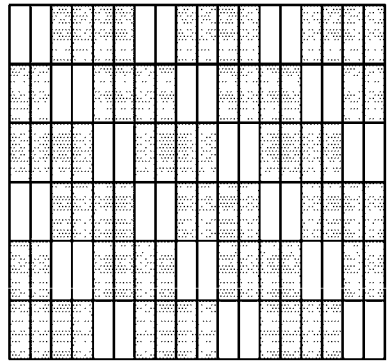
(C)
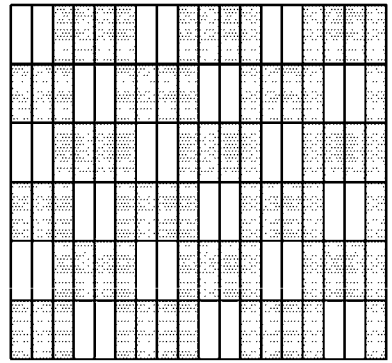
(D)

FIG. 29
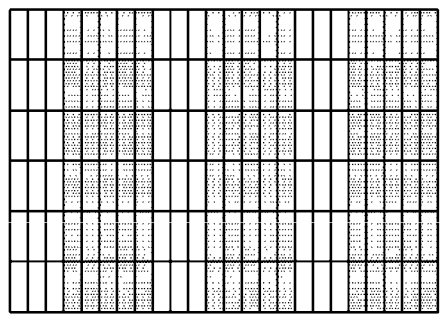
(A)
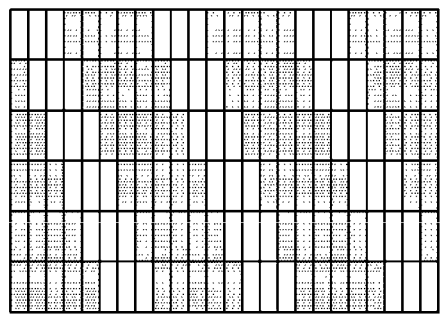
(B)
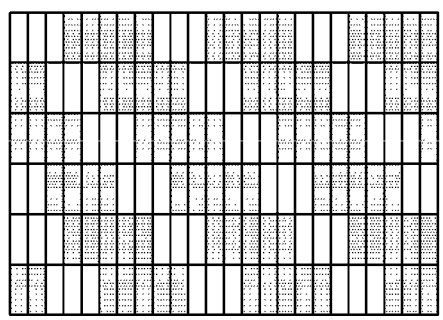
(C)
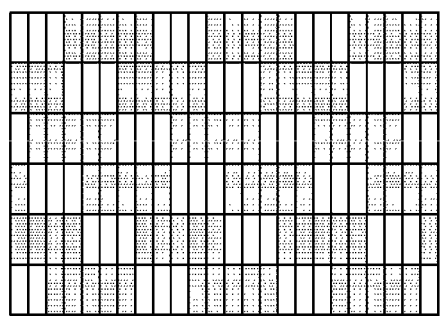
(D)
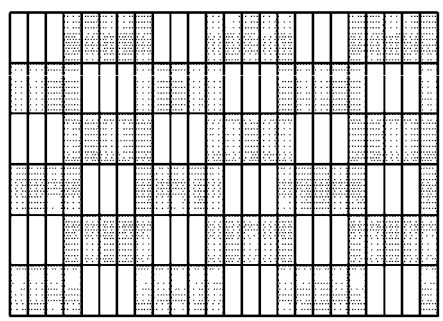
(E)

FIG. 30
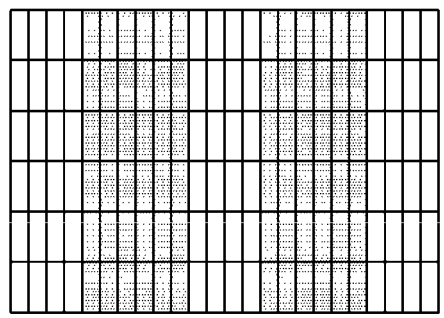
(A)
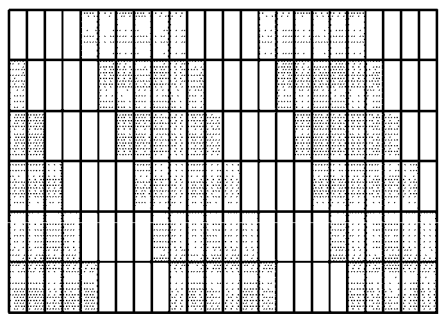
(B)
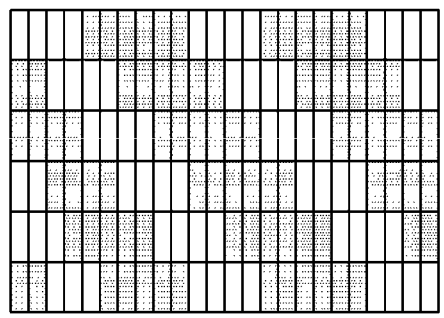
(C)
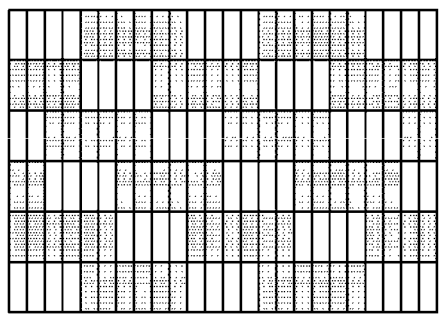
(D)
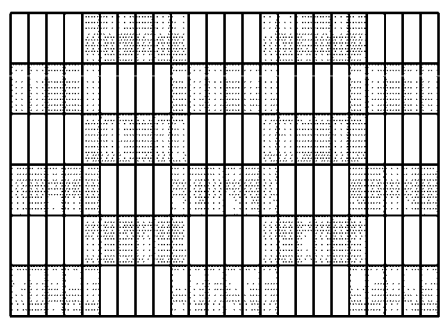
(E)

FIG. 56

| 9 | 18 |
|---|---|
| 8 | 17 |
| 7 | 16 |
| 6 | 15 |
| 5 | 14 |
| 4 | 13 |
| 3 | 12 |
| 2 | 11 |
| 1 | 10 |
| 18 | 9 |
| 17 | 8 |
| 16 | 7 |
| 15 | 6 |
| 14 | 5 |
| 13 | 4 |
| 12 | 3 |
| 11 | 2 |
| 10 | 1 |

(56-a)

| 9 | 18 |
|---|---|
| 8 | 17 |
| 7 | 16 |
| 6 | 15 |
| 5 | 14 |
| 4 | 13 |
| 3 | 12 |
| 2 | 11 |
| 1 | 10 |
| 18 | 9 |
| 17 | 8 |
| 16 | 7 |
| 15 | 6 |
| 14 | 5 |
| 13 | 4 |
| 12 | 3 |
| 11 | 2 |
| 10 | 1 |

| 8 | 16 |
|---|---|
| 7 | 15 |
| 6 | 14 |
| 5 | 13 |
| 4 | 12 |
| 3 | 11 |
| 2 | 10 |
| 1 | 9 |
| 16 | 8 |
| 15 | 7 |
| 14 | 6 |
| 13 | 5 |
| 12 | 4 |
| 11 | 3 |
| 10 | 2 |
| 9 | 1 |

(58-a)

| 8 | 16 |
|---|---|
| 7 | 15 |
| 6 | 14 |
| 5 | 13 |
| 4 | 12 |
| 3 | 11 |
| 2 | 10 |
| 1 | 9 |
| 16 | 8 |
| 15 | 7 |
| 14 | 6 |
| 13 | 5 |
| 12 | 4 |
| 11 | 3 |
| 10 | 2 |
| 9 | 1 |

(58-b)

STEREOSCOPIC IMAGE DISPLAY DEVICE

CROSS-REFERENCE TO RELATED APPLICATION

This application claims priority to and the benefit of Korean Patent Application No. 10-2014-0073075 filed in the Korean Intellectual Property Office on Jun. 16, 2014, the entire contents of which are incorporated herein by reference.

BACKGROUND (a) Field

Embodiments of the present system and method relate to a stereoscopic image display device, and more particularly, to a stereoscopic image display device with an enhanced display quality.

(b) Description of the Related Art

In general, a display device that can display a three-dimensional (3D) image expresses a 3D effect of objects by using binocular parallax. That is, different 2D images are displayed to the left eye and the right eye of a user viewing the display. When the image displayed to the left eye (hereafter referred to as "left-eye image") and the image displayed to the right eye (hereafter referred to as "right-eye image") are processed by the user's brain, the brain recognizes the combination of the left-eye image and the right-eye image as a three-dimensional image having depth perception.

A display device capable of displaying 3D images using binocular parallax is generally referred to as a stereoscopic 3D image display device. Some stereoscopic 3D image display devices may require the user to wear special headgear or eye glasses (e.g., shutter glasses and polarized glasses). Other stereoscopic 3D image display devices, referred to as autostereoscopic 3D image display devices, however, do not require the user to wear special head gear or eye glasses. An autostereoscopic 3D image display device generally includes an optical system (e.g., a lenticular lens and a parallax barrier having a plurality of openings) in the display device itself that divides a 3D image into several viewpoints so as to realize a 3D image.

SUMMARY

Embodiments of the present system and method provide a stereoscopic image display device that improves luminance and suppresses occurrences of crosstalk, thereby enhancing the display device's image quality.

A stereoscopic image display device according to an exemplary embodiment of the present system and method includes: a display panel including a plurality of dots arranged in a matrix format; and a viewpoint division unit dividing light of a left-eye image and light of a right-eye image displayed by the plurality of dots and transferring the divided light to a plurality of viewpoints corresponding to each dot, wherein the viewpoint division unit includes a plurality of openings and a light blocking unit, and when a horizontal directional width of each of the plurality of openings corresponds to an m number of dots (m is a natural number), a number of dots n adjacent in the horizontal direction displaying the left-eye image and the right-eye image is equal to n=2m+1 or n=2(m+1).

When the number of dots is n=2(m+1) and a binocular distance of an observer is E, a control unit that changes the dots displaying the left-eye image and the right-eye image based on the movement of the observer in an optimal viewing distance may have a width of 2E/n that corresponds to one dot in the optimal viewing distance.

When the number of dots is n=2m+1 and a binocular distance of the observer is E, a control unit that changes the dots displaying the left-eye image and the right-eye image based on the movement of the observer in an optimal viewing distance may have a width of E/n that corresponds to one dot in the optimal viewing distance.

A free dot may exist between at least one dot displaying the left-eye image and at least one dot displaying the right-eye image in the optimal viewing distance.

When the number of dots distributed with respect to the left-eye image and the right-eye image is n=2m+1, one free dot may exist.

When m is 2, n may be 5, and when m is 3, n may be 7.

When the number of dots distributed with respect to the left-eye image and the right-eye image is n=2(m+1), two free dots may exist.

m may be equal to or smaller than 3, and when m is 3, n is 8.

When a binocular gap of the observer is E, a horizontal directional pitch of one dot is Hp, a distance between the viewpoint division unit and the display panel is g, and the optimal viewing distance is d, the following equation may be satisfied:

$$2E/n{:}d = Hp{:}g.$$

When the opening is inclined with an inclination angle with respect to a column direction of the display panel and Vp is a column directional pitch of one dot, the inclination angle may satisfy the following Equation: $A = \tan^{-1} Hp/Vp$.

A horizontal directional width of the opening may correspond to m dots, a horizontal directional pitch of the viewpoint division unit may correspond to 2m+1 or 2(m+1) dots, and an aperture ratio of the viewpoint division unit may be m/2m+1 or m/2(m+1).

A stereoscopic image display device according to another exemplary embodiment of the present system and method includes: a display panel including a plurality of dots arranged in a matrix format extending in a vertical direction and a horizontal direction, each dot having one or more display pixels; and a viewpoint division unit dividing light of a left-eye image and light of a right-eye image displayed by the plurality of dots and transferring the divided light to a plurality of viewpoints corresponding to each dot, wherein the viewpoint division unit includes a plurality of openings and a light blocking unit, the opening is inclined with an inclination angle with reference to the vertical direction of the display panel, and each of the plurality of pixels is formed in a landscape mode in which a horizontal directional pitch is greater than a vertical directional pitch, the inclination angle satisfies the following equation:

$$A = \tan^{-1} \frac{Hp}{Vp \times b}.$$

Here, Hp denotes a horizontal directional pitch of a pixel in the landscape mode, Vp is a vertical directional pitch of a pixel, and b is a natural number.

When a binocular distance of an observer is E, a control unit that changes the dots displaying the left-eye image and the right-eye image based on the movement of the observer in an optimal viewing distance may have a width of E/b that corresponds to one dot in the optimal viewing distance.

The opening may be formed to have a horizontal directional width of m×Hp/b (m is a natural number), a horizontal directional pitch of the viewpoint division unit may correspond to a horizontal directional width of two dots, and an aperture ratio of the viewpoint division unit may be m/2b.

When a binocular distance of the observer is E, a horizontal directional pitch of one dot is Hp, a distance between the viewpoint division unit and the display panel is g, and the optimal viewing distance is d, the following equation may be satisfied:

$E:d=Hp:g.$

When each of the plurality of dots is formed in a portrait mode in which a column directional pitch is greater than a row directional pitch, image processing may be performed for a set of dots displaying the left-eye image and the right-eye image to move the images in the horizontal direction in response to movement in the horizontal direction of the observer.

When the plurality of pixels are formed in the landscape mode, image processing may be performed for a set of dots displaying the left-eye image and the right-eye image to move the images in the vertical direction in response to movement in the horizontal direction of the observer.

When the plurality of pixels are formed in the landscape mode, the b may be 9.

When the plurality of pixels are formed in the landscape mode and when the plurality of pixels are formed in the portrait mode in which a column directional pitch is greater than a row directional pitch, the inclination angle and an aperture ratio may be the same in both the landscape mode and the portrait mode.

The display panel may further include a black matrix provided between each of the plurality of dots, and crosstalk may exist in an area of the black matrix.

As luminance in the autostereoscopic image display device is improved, crosstalk that may increase can be suppressed, and appropriate image quality can be maintained.

BRIEF DESCRIPTION OF THE DRAWINGS

FIG. 13 is a graph of exemplary embodiments of a free dot design according to an exemplary embodiment.

FIG. 28 to FIG. 30 exemplarily illustrate designs for an opening of a parallax barrier according to exemplary embodiments of the present system and method.

FIG. 55 to FIG. 58 are provided for description of a method for controlling a head tracking function when the observer is not in the optimal viewing distance OVD in the landscape mode, according to an exemplary embodiment.

FIG. 66 shows a case in which the maximum crosstalk occurs when no black matrix is provided, according to an exemplary embodiment.

FIG. 67 shows a case in which the maximum crosstalk occurs when a black matrix is provided, according to an exemplary embodiment.

DETAILED DESCRIPTION

Figure 1:
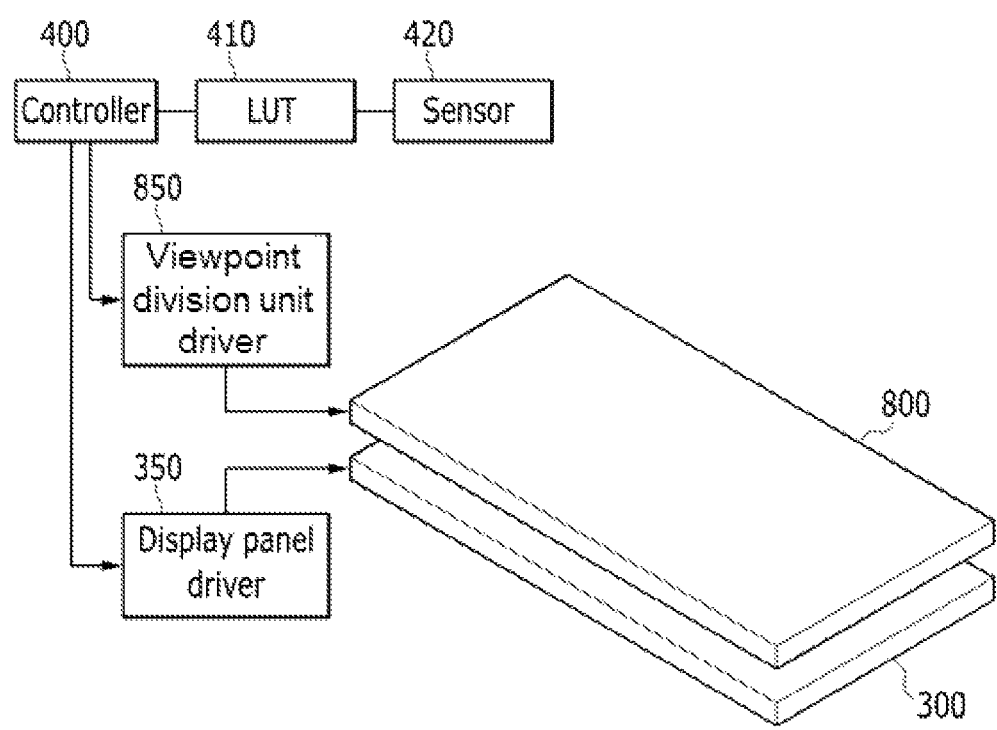
FIG. 1 is a perspective view of a stereoscopic image display device according to an exemplary embodiment of the present system and method.

In the following detailed description, certain exemplary embodiments of the present system and method have been shown and described for the purpose of illustration. The present system and method are not limited to these embodiments. Those of ordinary skill in the art would realize that the described embodiments may be modified in various different ways, all without departing from the spirit or scope of the present system and method.

Further, in the exemplary embodiments, like reference numerals designate like elements having the same configuration. To that end, a first exemplary embodiment is described with particularity, while in other exemplary embodiments, only configurations different from the first exemplary embodiment are described.

The drawings and description are illustrative in nature and not restrictive, and like reference numerals designate like elements throughout the specification.

Figure 2:
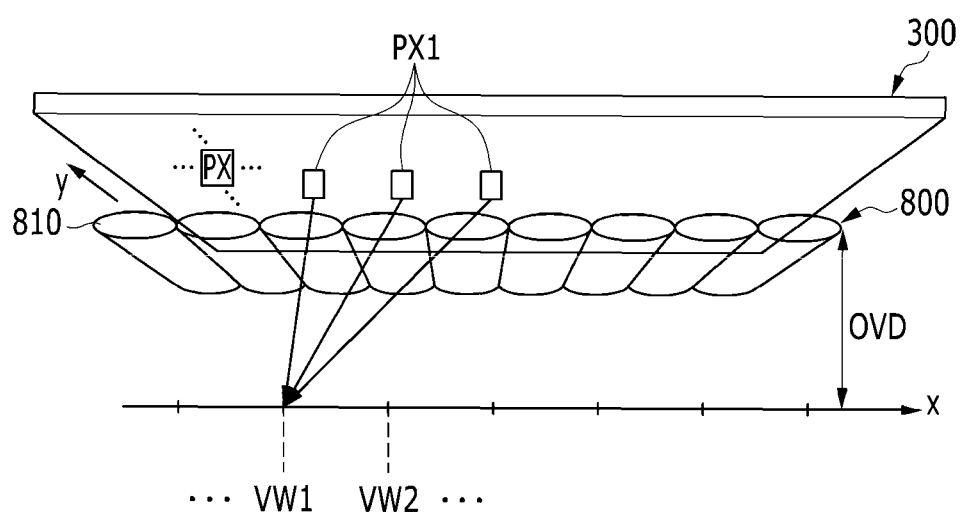
FIG. 2 is a perspective, side view of a stereoscopic image display device according to an exemplary embodiment.
Figure 3:
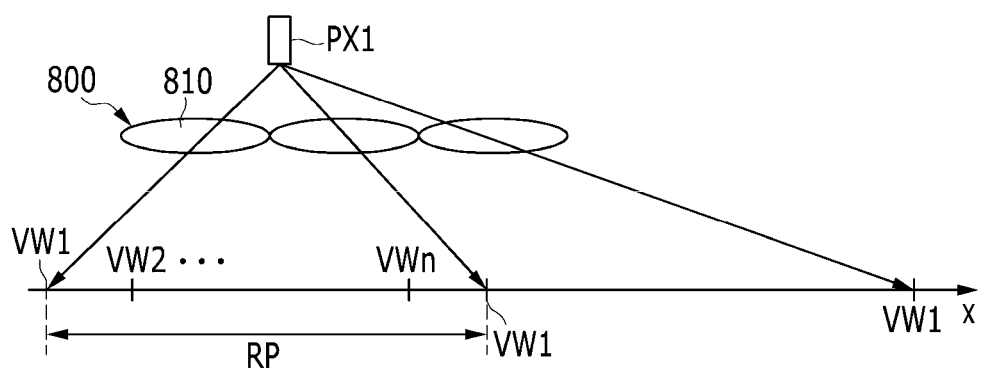
FIG. 3 and FIG. 4 show a viewpoint division unit and viewpoints by the viewpoint division unit of a stereoscopic image display device according to an exemplary embodiment.
Figure 4:
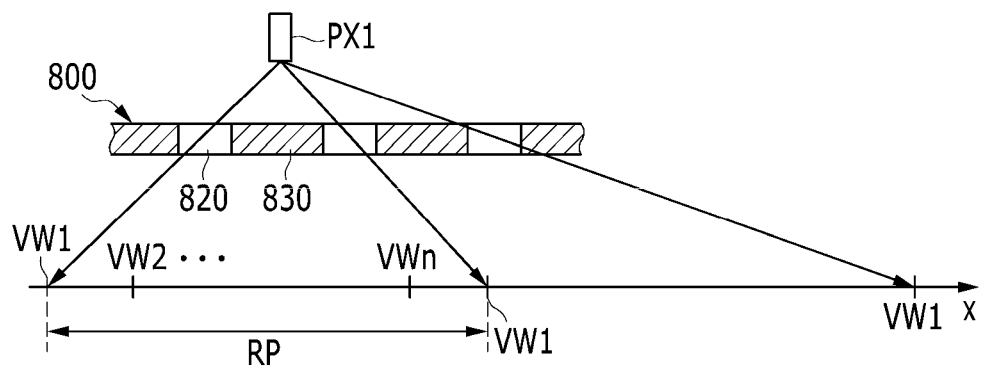
Figure 5:
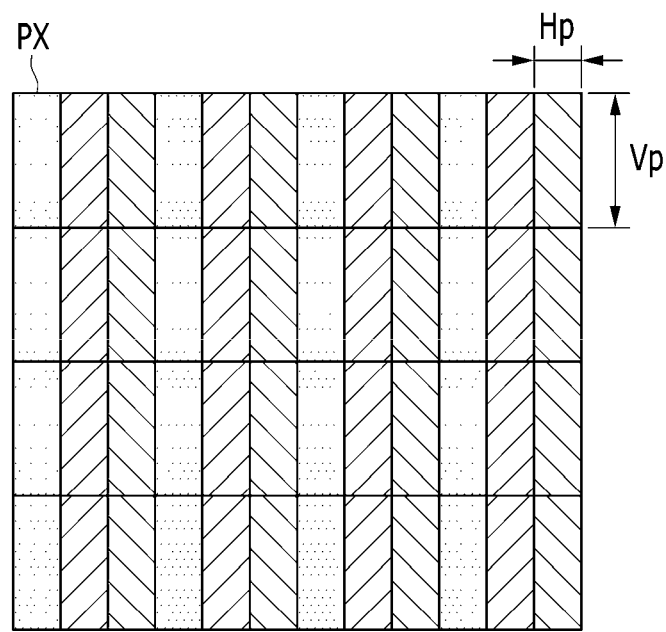
FIG. 5 and FIG. 6 show an alignment mode of pixels of the stereoscopic image display device according to an exemplary embodiment.
Figure 6:
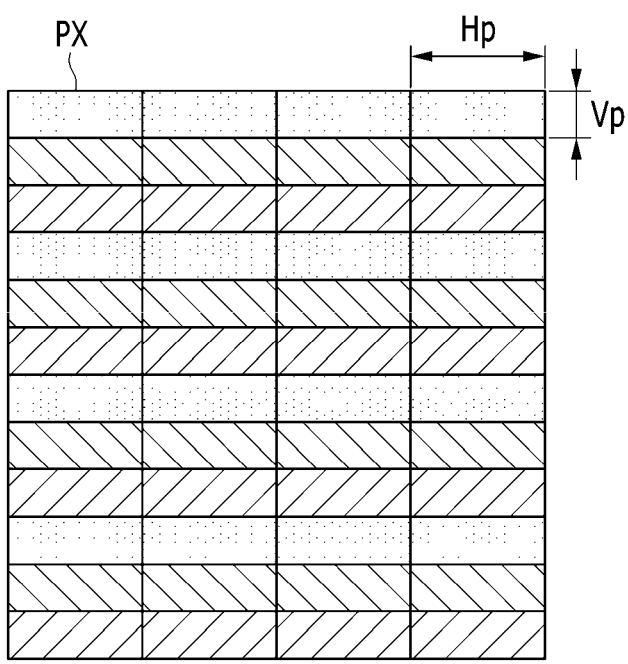

Referring to FIG. 1 to FIG. 6, a stereoscopic image display device according to one or more exemplary embodiments of the present system and method are described. FIG. 1 is a perspective view of a stereoscopic image display device according to an exemplary embodiment of the present system and method. FIG. 2 is a perspective, side view of a stereoscopic image display device according to an exemplary embodiment of the present system and method. FIG. 3 and FIG. 4 show a viewpoint division unit of the stereoscopic image display device and a viewpoint by the viewpoint division unit according to one or more exemplary embodiments of the present system and method. FIG. 5 and FIG. 6 show pixel alignment modes of the stereoscopic image display according to one or more exemplary embodiments of the present system and method.

Referring to FIG. 1 to FIG. 4, a stereoscopic image display includes a display panel 300, a display panel driver 350, a viewpoint division unit 800, a viewpoint division unit driver 850, a controller 400, a lookup table (LUT) 410, and a sensor 420.

The display panel 300, which displays an image, may be a display panel included in various display devices such as a plasma display device (PDP), a liquid crystal display, an organic light emitting device, and the like. The display panel 300 includes a plurality of signal lines and a plurality of pixels PX connected to the plurality of signal lines. The plurality of pixels PX may be arranged in a substantially matrix format. In FIG. 2, a row direction is denoted by the x-axis direction and a column direction is denoted by the y-axis direction. Each pixel PX may include a switching element (not shown) such as a thin film transistor connected to the signal line and a pixel electrode (not shown) connected to the switching element. The signal lines may include a plurality of gate lines transmitting a gate signal (also referred to as a scanning signal) and a plurality of data lines transmitting a data voltage.

In one case, each pixel PX may display one of the primary colors (space division) so that a desired color may be displayed by a spatial or temporal sum of the primary colors. In another case, the plurality of pixels PX may display one or more of the primary colors in quick successions (time division) so that a desired color may be displayed by a temporal sum of the primary colors. Any number of primary colors may be used in combination. For example, three primary colors of red (R), green (G), and blue (B) may be displayed. In some cases, a pixel may display a color other than a primary color. For example, a pixel may display one of the primary colors of cyan, magenta, and yellow or another color such as white.

As used herein, a dot refers to a display unit of a stereoscopic image and may display a white image. In the case in which each pixel PX displays one of several different colors, a dot may include a group of adjacent pixels, one pixel corresponding to each of the several different colors. Alternatively, one pixel PX may be called one dot. Hereinafter, one dot implies one pixel PX unless otherwise specified.

The pixels PXs in one pixel column may display the same primary color, but are not limited thereto. The pixels PXs that are arranged in a diagonal direction having a predetermined angle may display the same primary color.

The display panel driver 350 transfers various driving signals such as a gate signal and a data signal to the display panel 300 to drive the display panel 300.

The viewpoint division unit 800 divides light of an image displayed by the pixels PX of the display panel 300 and transfers the light to a plurality of viewpoints—e.g., VW1, VW2, and so on—that each correspond to a pixel PX. That is, consider the case shown in FIG. 2, which illustrates a number of viewpoints, including VW1 and VW2, located along the x-axis that is spaced an optical viewing distance OVD apart from the viewpoint division unit 800. When an image displayed by a first pixel PX1 is viewed is from the viewpoint VW1, light of an image displayed by each first pixel PX1 can reach the first viewpoint VW1 through the viewpoint division unit 800.

Specifically, a viewpoint may refer to a point along an x-axis, which runs parallel to and is spaced an optical viewing distance OVD from the stereoscopic image display device, where a stereoscopic image displayed by a pixel PX can be optimally observed. According to an exemplary embodiment of the present system and method, each pixel PX of the display panel 300 corresponds to one viewpoint (e.g., VW1, VW2, and so on) and transfers light of an image to its corresponding viewpoint through the viewpoint division unit 800. This enables an observer to observe different images in each of the observer's eyes, which are located at different viewpoints, and, thus, to perceive a 3D effect (i.e., simulate a depth perception in the observer's brain).

Referring to FIG. 3 or FIG. 4, an image displayed by the display panel 300 can reach any one of viewpoints VW1 to VWn (n is a natural number) located within a unit view area RP that corresponds to a predetermined viewing angle defined by the viewpoint division unit 800. The viewpoints VW1 to VWn may be allocated in the unit view area RP according to a location where light from each corresponding pixel PX is incident. The unit view area RP may be iteratively repeated on the x-axis that is an optimal viewing distance OVD apart from the viewpoint division unit 800, and viewpoints VW1 to VWn may have a predetermined order in each unit view area RP.

Referring to FIG. 2 or FIG. 3, the viewpoint division unit 800 includes a plurality of viewpoint division units, which may include a plurality of lenticular lenses 810 arranged in a first direction (e.g., row direction). Each lenticular lens 810 may extend in a second direction (e.g., column direction). A color sequence of pixel rows that neighbor each other and correspond to each lenticular lens 810 may be different from one another. That is, primary colors displayed by the first pixels PX of the neighboring pixel rows that correspond to each lenticular lens 810 may be different from each other. Thus, an extension direction of each lenticular lens 810 may be inclined while forming an acute angle with the y-axis direction, which is a column direction, and may be substantially parallel with the y-axis direction.

Referring to FIG. 4, the viewpoint division unit 800 includes a plurality of viewpoint division units, which may be a parallax barrier that has a plurality of openings 820. The parallax barrier further includes light blocking units 830 in addition to the openings 820. An alignment direction of the openings 820 arranged in one row may be inclined while forming an acute angle with the y-axis direction, which is a column direction, or may be substantially in parallel with the y-axis direction.

In FIG. 1 and FIG. 2, the viewpoint division unit 800 is located between the display panel 300 and the observer (not shown), but the present system and method are not limited thereto.

The viewpoint division unit driver 850 is connected with the viewpoint division unit 800 and generates a driving signal for driving the viewpoint division unit 800.

The sensor 420 is an eye tracking sensor that senses a location and a distance of the eyes of the observer. That is, the sensor 420 may sense a location of the center of the pupil in the observer's eyes and a distance between the stereoscopic image display device and the sensed location of the observer's eyes. In one case, a location and distance may be sensed for each of the observer's two eyes. In another case, a location and distance may be sensed for only one of the observer's two eyes. In addition, the sensor 420 may sense a distance between the two pupils of the observer's eyes, for example, as measured from the centers of the two pupils. The sense data sensed by the sensor 420 is transferred to the LUT 410.

The LUT 410 stores operational timing data for controlling the timing of the operations of the stereoscopic display device. The timing of the operations may vary depending on the sense data. That is, appropriate operational timing data is selected from the LUT 410 based on the sense data transferred from the sensor 420. The selected operational timing data is transferred to the controller 400.

The controller 400 controls the display panel driver 350 and the viewpoint division driver 850 to provide a left-eye image and a right-eye image to the respective eyes of the observer according to the operational timing data that was selected based on the sense data of the sensor 420. That is, the controller 400 performs a head tracking function.

In the exemplary embodiment of FIG. 1, the display panel driver 350, viewpoint division driver 850, and controller 400 are shown to be separate. However, in another embodiment, the display panel driver 350, viewpoint division driver 850, and controller 400 may be integrated. In addition, the LUT 410 may be provided in the controller 400.

Hereinafter, the viewpoint division unit 800 is described as a parallax barrier including the openings 820 and the light blocking unit 830, according to an exemplary embodiment of the present system and method. However, a person of ordinary skill in the art would understand that the various teachings discussed below with regards to a parallax barrier may be applied to a case in which the viewpoint division unit 800 includes a plurality of lenticular lenses 810.

The way in which the pixels are aligned, or pixel alignment mode, may include a portrait mode and a landscape mode. FIG. 5 illustrates an exemplary embodiment in which a plurality of pixels are arranged in a portrait mode. FIG. 6 illustrates an exemplary embodiment in which a plurality of pixels are arranged in a landscape mode.

As shown in FIG. 5, a y-axis directional length Vp of the pixel PX is greater than an x-axis directional length Hp of the pixel PX in the portrait mode. The x-axis directional length HP of the pixel PX may be referred to as a horizontal directional pitch, and the y-axis directional length Vp of the pixel PX may be referred to as a vertical directional pitch. As shown in FIG. 6, the x-axis directional length Hp of the pixel PX is greater than the y-axis directional length Vp of the pixel PX in the landscape mode. In an exemplary embodiment of the present system and method, a plurality of pixels included in the display panel 300 of the stereoscopic image display device may be formed in one of the portrait mode and the landscape mode.

A structure that can suppress occurrences of crosstalk in a case that the plurality of pixels included in the display panel 300 of the stereoscopic image display device are formed in the portrait mode is described. Crosstalk is a phenomenon in which a left-eye image (hereinafter referred to as an L image) is viewed by the right eye or a right-eye image (hereinafter referred to as an R image) is viewed by the left eye. When crosstalk occurs, it may interfere with the binocular parallax effect that a stereoscopic image display device relies on to display a 3D image. Hereinafter, for convenience in description, an LR image may refer to both of the L image and the R image. In addition, for convenience of description in the drawings, an L image may be denoted as L and an R image may be denoted as R.

Figure 7:
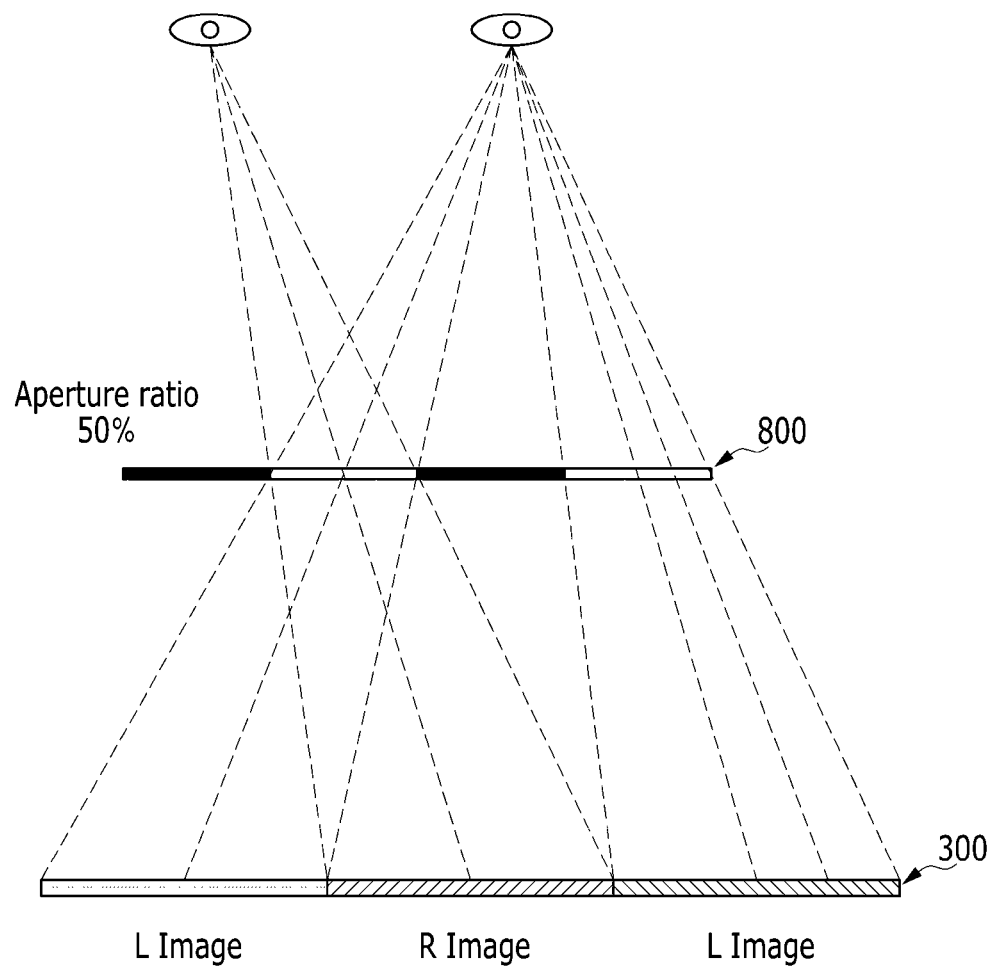
FIG. 7 and FIG. 8 exemplarily show occurrences of crosstalk in a case that an L image and an R image are alternately displayed in each dot.
Figure 8:
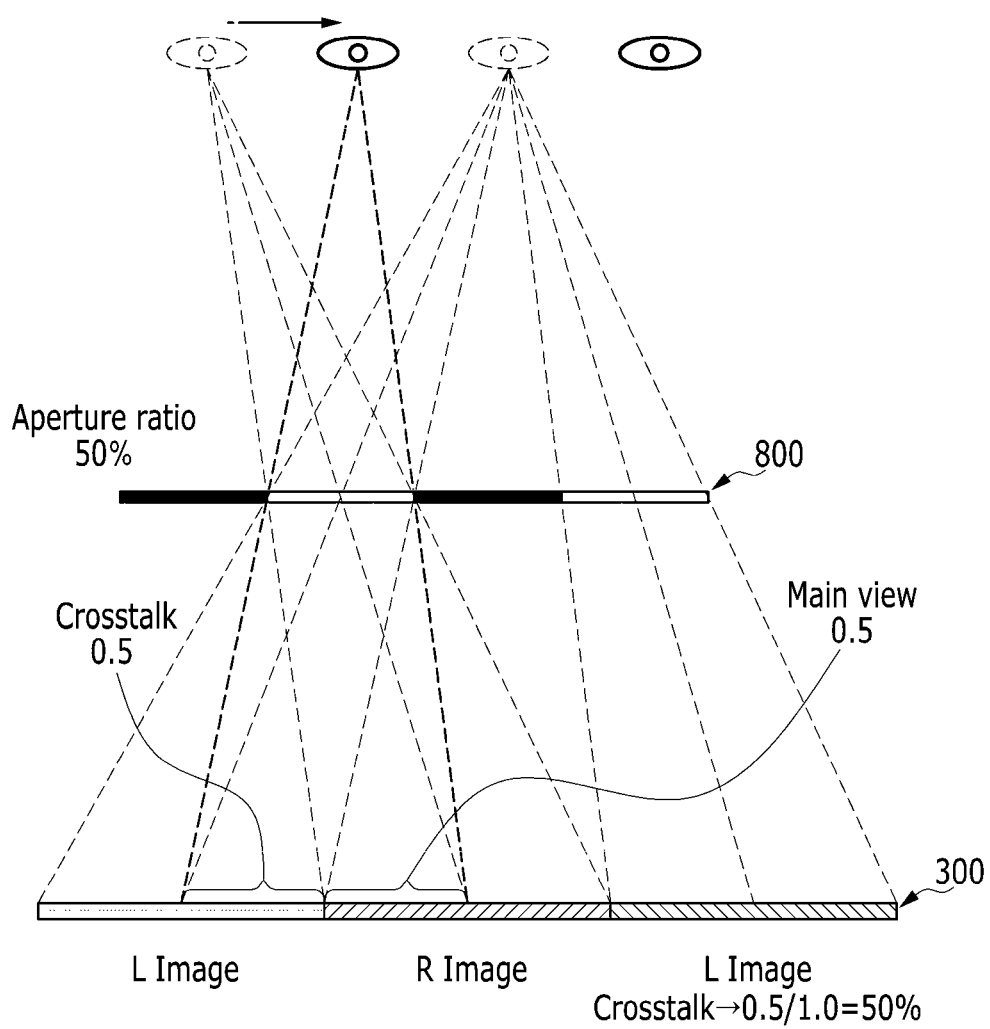

FIG. 7 and FIG. 8 exemplarily illustrate occurrences of crosstalk in which an L image and an R image are alternately displayed by each dot. In the display panel 300, the L image and the R image are alternately displayed in each dot and an aperture ratio of the viewpoint division unit 800, that is, the aperture ratio of the parallax barrier, is 50%.

Referring to FIG. 7, the right eye sees only the R image and the left eye sees only the L image through the openings of the parallax barrier. Consider the case in which the total luminance viewed by the eye is Lt and the luminance of the crosstalk is Lc. The crosstalk can be represented by a ratio (%) of Lc with respect to Lt. In FIG. 7, luminance of the crosstalk is Lc=0, and therefore the crosstalk is 0%, which is the minimum value.

Referring to FIG. 8, when the observer moves, the R image and the L image are viewed together by the right eye of the observer and the L image and the R image are viewed together by the left eye of the observer. In this case, the R image viewed by the right eye and the L image viewed by the left eye are a main view, and the L image viewed by the right eye and the R image viewed by the left eye are crosstalk. The crosstalk can be reduced by changing the dots displaying the L image and the R image based on the movement of the observer, which may be determined using a head tracking function of the controller 400. In one embodiment, when the crosstalk is increased to 50% due to movement of the observer, the head tracking function may be performed to change dots the dots that display the L image and the R image. In such a case, the maximum ratio of luminance (Lc=0.5) of the crosstalk with respect to the total luminance (Lt=0.5+0.5) is 50%. That is, the maximum crosstalk is 50%.

Figure 9:
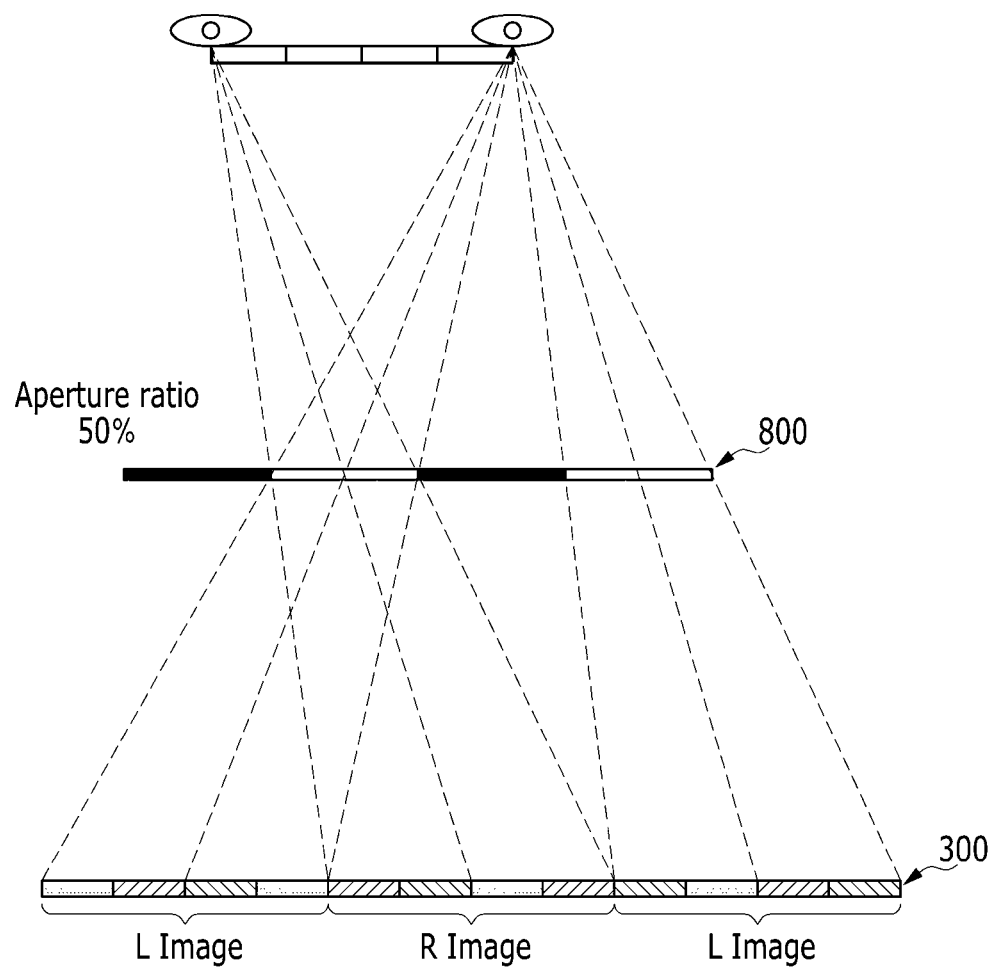
FIG. 9 and FIG. 10 exemplarily show occurrences of crosstalk in a case that an L image and an R image are alternately displayed for every four dots.
Figure 10:
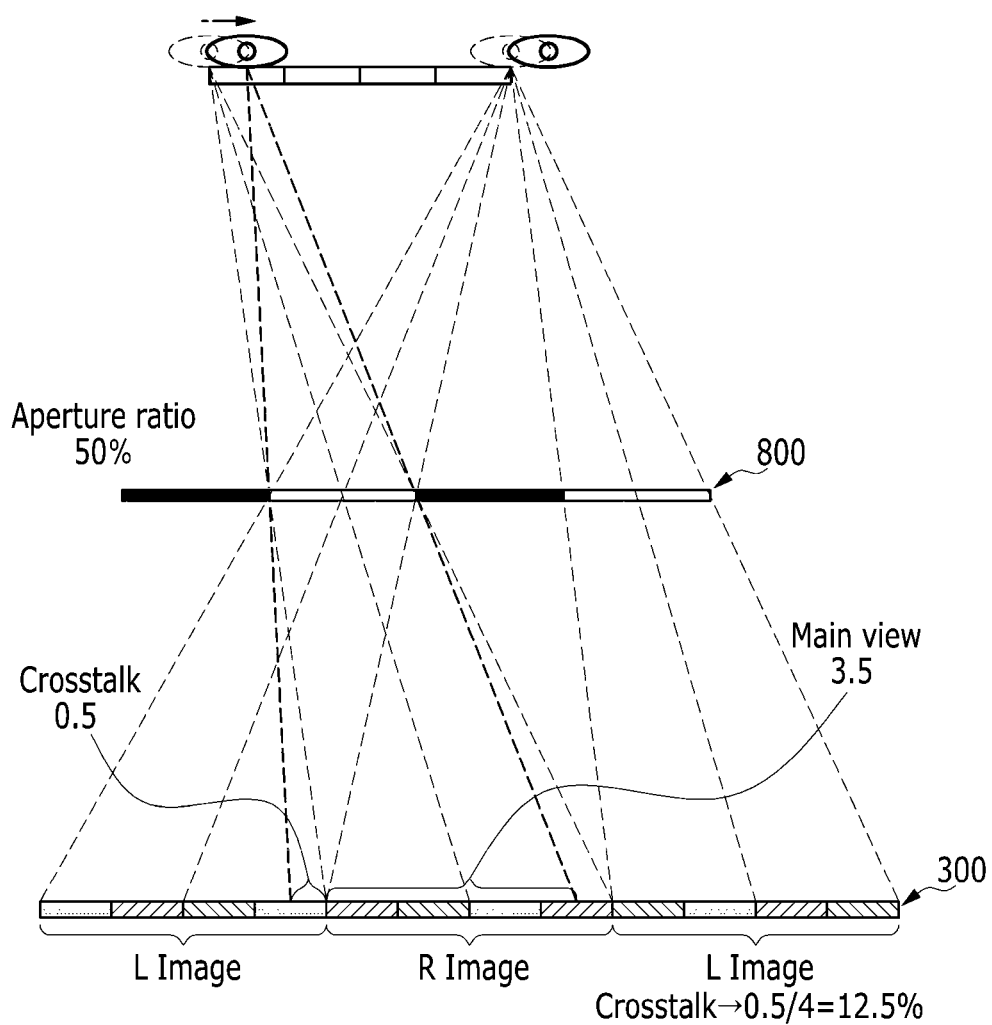

FIG. 9 and FIG. 10 exemplarily show occurrences of crosstalk in which an L image and an R image are alternately displayed for every four dots. In the display panel 300, the L image and the R image are alternately displayed for every four dots and an aperture ratio of the viewpoint division unit 800, that is, an aperture ratio of the parallax barrier, is 50%.

Referring to FIG. 9, the right eye sees only the R image and the left eye sees only the L image through the openings of the parallax barrier. Since the luminance of the crosstalk is Lc=0, the crosstalk is at the minimum, i.e., 0%.

Referring to FIG. 10, the crosstalk can be reduced by changing the dots where the L image and the R image are displayed with reference to a point in time when half of an edge dot of the L image is viewed by the right eye of the observer or half of an edge dot of the R image is viewed by the left eye. The dots may be changed to correspond to the movement of the observer using the head tracking function of the controller 400. That is, because image control using the head tracking function can be performed for every one dot, the crosstalk can be reduced by changing an image of the corresponding dot when the half of a dot existing at the edge among four dots is viewed. In such a case, because the luminance of the main view is 3.5 and the luminance of crosstalk is 0.5, the crosstalk is at 0.5/(3.5+0.5)=12.5%.

As described, the crosstalk that occurs due to movement of the observer can be reduced by increasing the number of dots included in a set of dots that display an L image and an R image. A set of dot refers to a plurality of adjacent dots displaying an L image or an R image. For example, one set of dots may include four dots, such as shown in FIG. 10.

Figure 11:
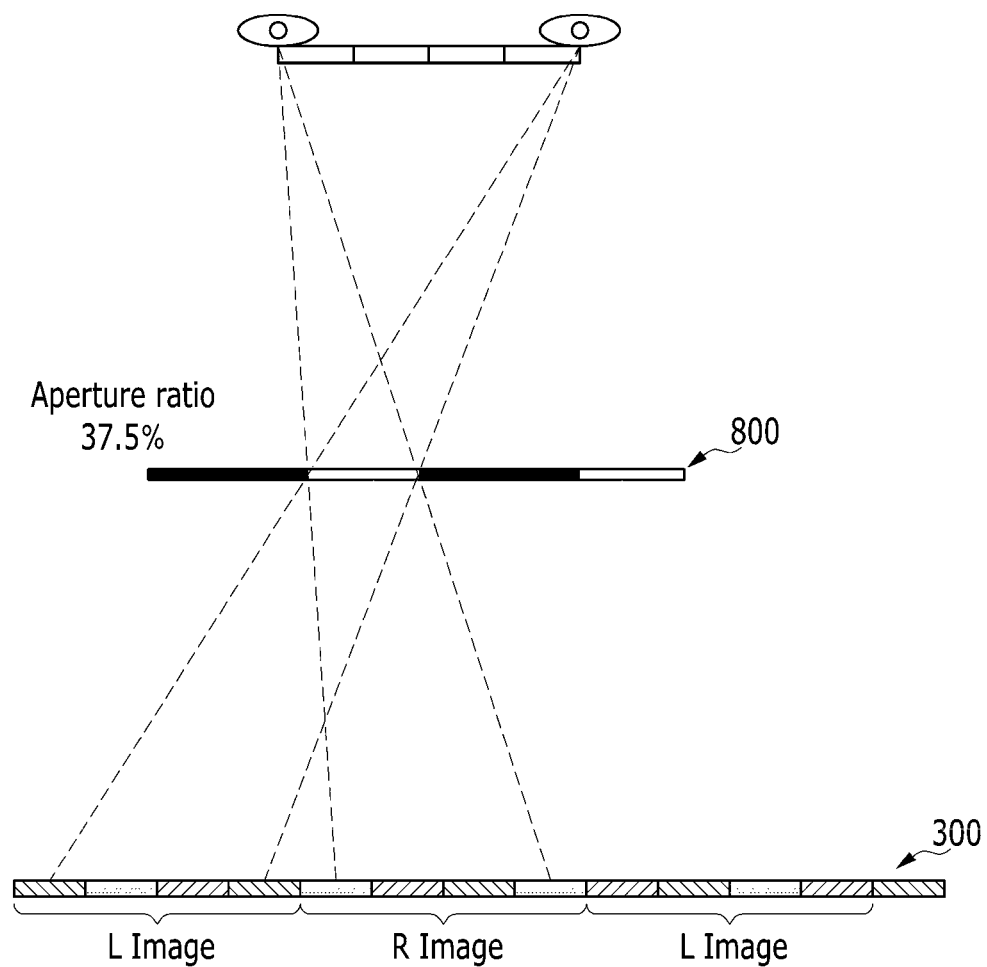
FIG. 11 and FIG. 12 exemplarily illustrate an occurrence of crosstalk in a case that a plurality of dots where an L image and an R image are displayed includes a free dot.
Figure 12:
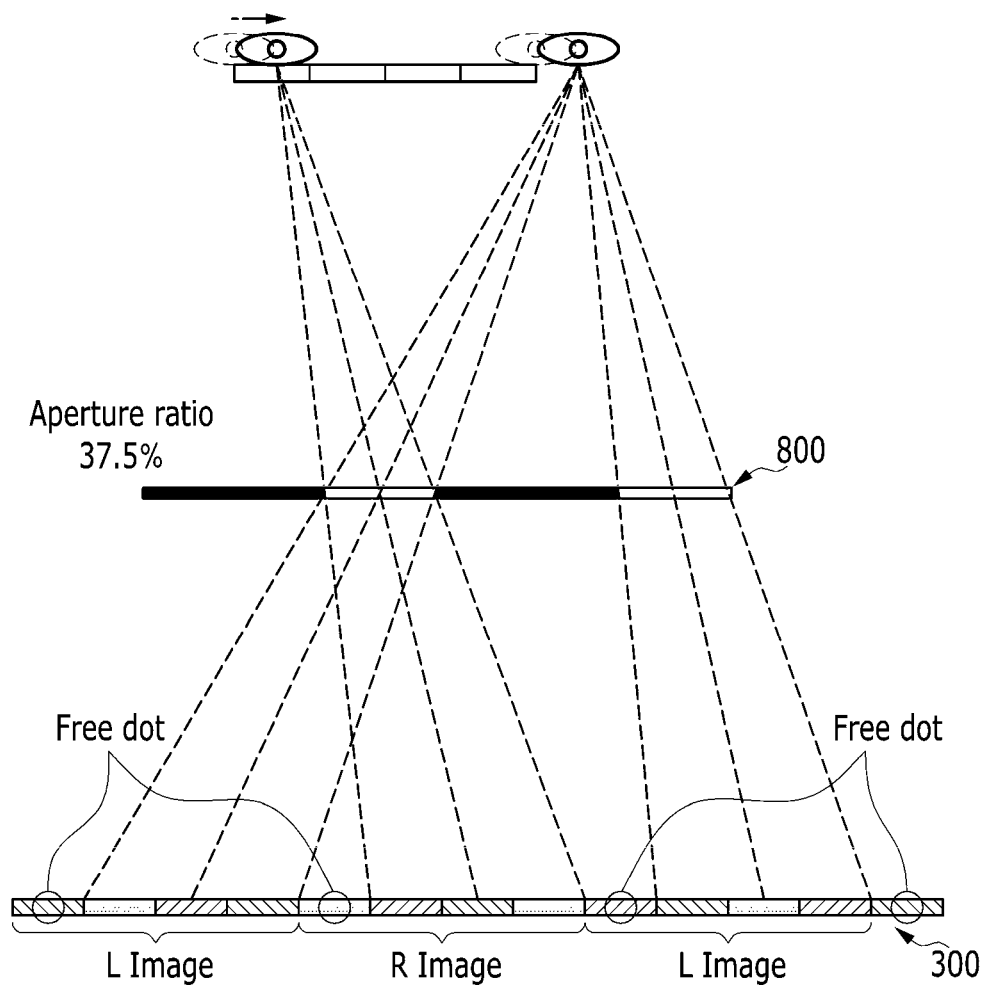

FIG. 11 and FIG. 12 exemplary show occurrences of crosstalk in which a plurality of dots displaying an L image and an R image include a free dot. That is, in the display panel 300, although the L image and the R image are alternately displayed in sets of four dots, a free dot that is not visible to the observer may be generated in each set by limiting the viewpoint division unit 800, that is, the openings of the parallax barrier to expose three dots. In this case, the aperture ratio of the parallax barrier is 3/8=37.5%. That is, free dots can be generated by forming openings of the parallax barrier such that one less than the number of dots in a dot set may be visible to the observer at a given time.

When an opening of the parallax barrier is formed to correspond to an integer times the number of dots, areas of an integer times the dots are observed so that no moiré is generated. Here, since the size of the openings of the parallax barrier corresponds to three dots for observation of an area corresponding to three dots, no moiré is generated. The reason that no moiré is generated is described later with reference to FIG. 64 and FIG. 65.

Referring to FIG. 11, an R image corresponding to three dots among four dots displaying the R image is viewed by the right eye and an L image corresponding to three dots among four dots displaying the L image is viewed by the left eye through the openings of the parallax barrier. In particular, FIG. 11 illustrates that two inner dots and half of each of the two edge dots among a set of four dots are viewed through an opening such that the three dots are visible (i.e., 2+0.5+0.5). Thus, an R image and an L image corresponding to three dots are viewed through the opening. The right eye sees only the R image and the left eye sees only the L image. Since luminance of the crosstalk is Lc=0, the crosstalk is 0%, which is the minimum value.

Referring to FIG. 12, when the observer moves, three dots displaying an R image are viewed by the right eye and three dots displaying an L image are viewed by the left eye. That is, one dot between the three dots displaying the R image and the three dots displaying the L image becomes a free dot. The free dot represents a margin with respect to the openings of the barrier. In such case, because the right eye sees only the R image and the left eye sees only the L image, the crosstalk is 0%, which is the minimum value. Furthermore, with the generation of free dots, when the controller 400 changes the dots displaying an L image and an R image to correspond to the movement of the observer using the head tracking function, no crosstalk occurs even though the observer moves.

In view of the above-stated case, the following may be applied in the design of the free dots:

(a) increasing a ratio of the main view by increasing the size of a set of dots displaying an L image or an R image so that crosstalk is reduced;

(b) forming each opening of the parallax barrier to correspond to an integer times the number of dots so that no moiré occurs;

(c) forming each opening of the parallax barrier to correspond to one less than the number of dots in the set of dots so that a free dot is generated in the set;

(d) increasing the number of dots included in the set of dots so that a ratio of occupation of the free dot is decreased and an aperture ratio of the parallax barrier is increased; and (e) limiting the number of dots included in the set of dots so that the quality of the images displayed by the stereoscopic image display device are not significantly or noticeably deteriorated. This means that the number of dots included in the set of dots should be appropriately chosen so as to balance the benefits of reducing crosstalk against the deterioration of the image quality.

Hereinafter, referring to FIG. 13 to FIG. 27, the design of a free dot according to one or more embodiments is described in consideration of the above (a) to (e). FIG. 13 is a table that summarizes a number of designs for a free dot according to a number of exemplary embodiments of the present system and method. In particularly, the table of FIG. 13 summarizes the designs based on a number of parameters such as dot distribution with respect to LR images, the number of free dots, the number of dots corresponding to the width of a barrier opening, the maximum crosstalk in the optimal viewing distance OVD, and a barrier aperture ratio. FIG. 14 to FIG. 27 show designs for a free dot according to exemplary embodiments.

According to an exemplary embodiment of the present system and method, the design of the free dot of the stereoscopic image display device may be implemented such that the number of dots divided with respect to LR images n is equal to 2m+1 or 2(m+1), wherein m denotes the number of dots corresponding to a horizontal directional width (e.g., along the x-axis shown in FIG. 3) of the opening of the barrier. That is, the number of dots distributed with respect to the LR images is determined to be n=2m+1 or n=2(m+1). When the number of dots distributed with respect to the LR image is n=2(m+1), a control unit for changing the dots displaying the LR images based on the movement of the observer in the optimal viewing distance OVD may have a width of 2E/n corresponding to one dot in the optimal viewing distance OVD, with E being a binocular distance of the observer. As discussed earlier, the movement of the observer may be determined by performing a head tracking function. When the number of dots distributed with respect to the LR images is n=2m+1, a control unit that changes a dot displaying the LR images using the head tracking corresponding to movement of the observer in the optimal viewing distance OVD may be a E/n width corresponding to one dot in the optimal viewing distance OVD.

In the table of FIG. 13, the second, fourth, sixth, and eighth rows describe exemplary embodiments that relate to a design in which n=2m+1 free dots, and the third, fifth, and seventh rows describe exemplary embodiments that relate to a design in which n=2(m+1) free dots. In this case, the aperture ratio of the barrier is m/n. With such free dot designs, one or two free dots may exist. When the design of the free dot is n=2m+1, that is, in the second, fourth, sixth, and eighth exemplary embodiments of FIG. 13, one free dot exists, and when the design of the free dot is n=2(m+1), that is, in the third, fifth, and seventh exemplary embodiments, two free dots exist. The crosstalk may be reduced by the design of the free dot, and accordingly, head tracking performance can be improved.

Figure 14:
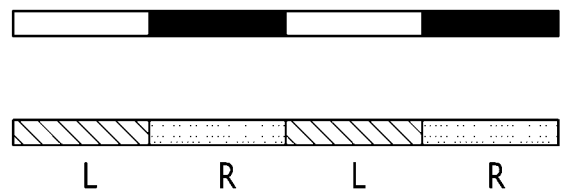
FIG. 14 to FIG. 27 illustrate exemplary embodiments of various free dot designs.
Figure 15:
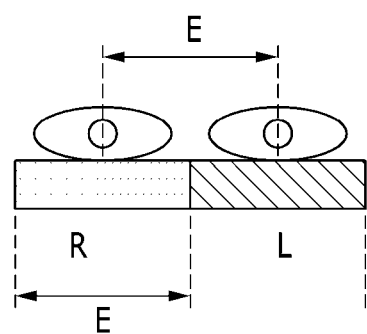

A dot design according to an exemplary embodiment is described with reference to FIG. 13 to FIG. 15. As shown in FIG. 14, two dots (L and R) are used to display an LR image, and the number of free dots is zero and the width of the opening of the barrier corresponds to one dot. In addition, as shown in FIG. 15, a control unit for changing the dots displaying L and R images based on the movement of the observer has a binocular gap E that corresponds to one dot. The barrier includes an opening corresponding to one dot and a light blocking unit corresponding to one dot, and the aperture ratio of the barrier is at 50%. In such a case, the maximum crosstalk in the optimal viewing distance is 50%. This exemplary embodiment, which corresponds to the first row of the table in FIG. 13, does not include a free dot and, thus, is not a free dot design.

Figure 16:
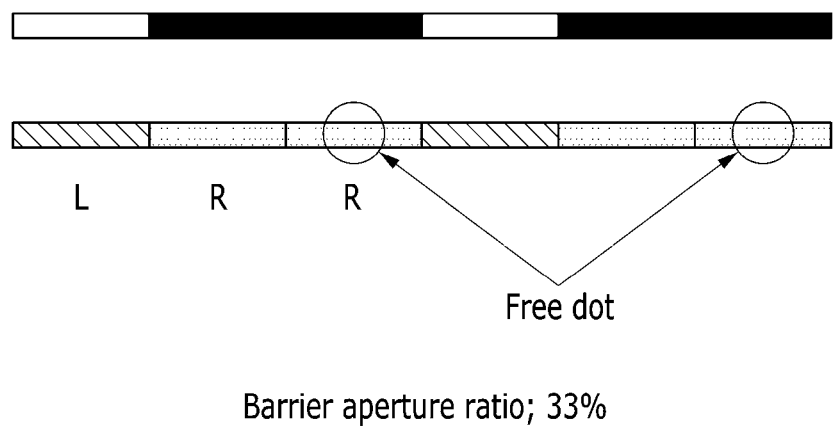
Figure 17:
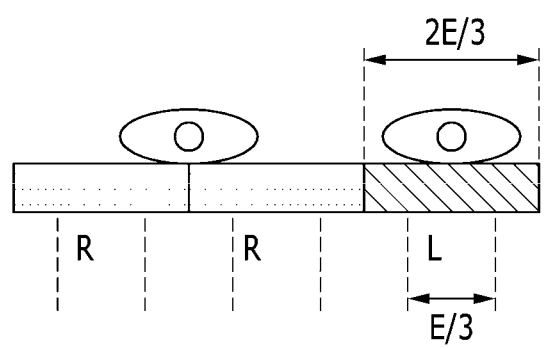

A free dot design according to an exemplary embodiment is described with reference to FIG. 13, 16, and FIG. 17. As shown in FIG. 16, three dots L and RR are used to display an LR image, one free dot exists, and the width of the barrier corresponds to one dot. In addition, as shown in FIG. 17, a control unit for changing the dots displaying L and R images based on the movement of the observer has a width of 2E/3 corresponding to one dot. In this case, in order to further reduce the crosstalk, the control unit of the head tracking function is further reduced by half so that the control unit has a width of E/3. As one free dot is used, crosstalk is reduced. The barrier includes an opening corresponding to one dot and a light blocking unit corresponding to two dots. In the optimal viewing distance OVD, the maximum crosstalk is 25%. This embodiment corresponds to the second row of the table in FIG. 13.

Figure 18:
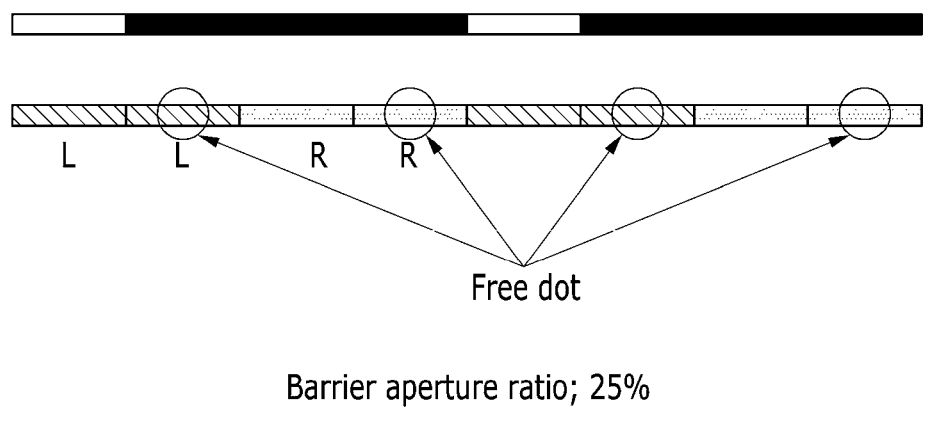
Figure 19:
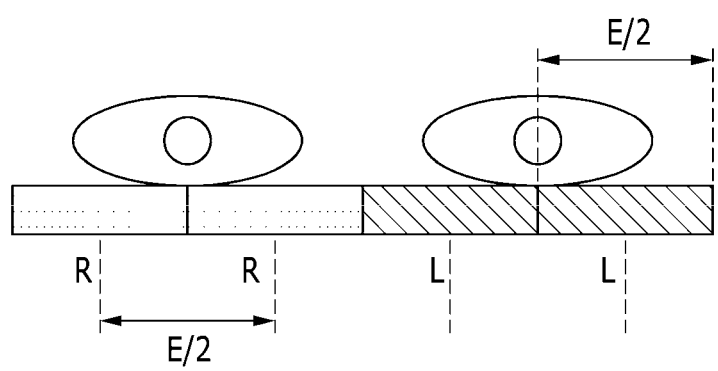

A free dot design according to another exemplary embodiment is described with reference to FIG. 13, FIG. 18, and FIG. 19. As shown in FIG. 18, four dots LL and RR are used to display an LR image, two free dots exist, and the width of the opening of the barrier corresponds to one dot. In addition, as shown in FIG. 19, a control unit for changing the dots displaying L and R images based on the movement of the observer has a width of E/2 corresponding to one dot. The barrier includes an opening corresponding to one dot and a light blocking unit corresponding to three dots, and the aperture ratio of the barrier is 25%. In the optimal viewing distance OVD, the maximum crosstalk is 0%. This embodiment corresponds to the third row of the table in FIG. 13.

Figure 20:
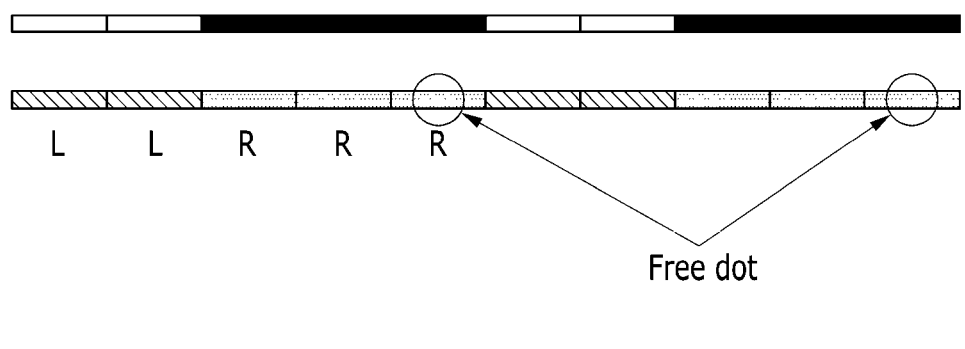
Figure 21:
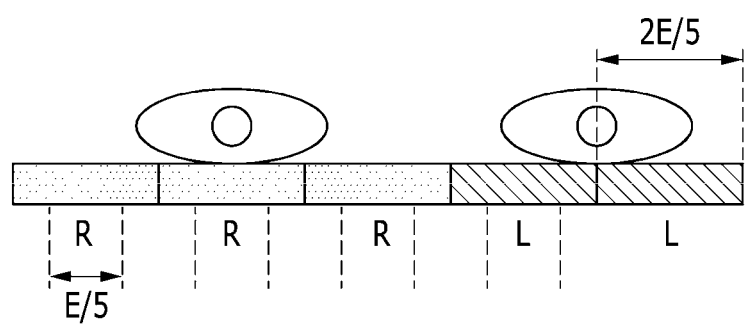

A free dot design according to another exemplary embodiment is described with reference to FIG. 13, FIG. 20, and FIG. 21. As shown in FIG. 20, five dots LL and RRR are used to display an LR image, one free dot exists, and the width of the opening of the barrier corresponds to two dots. In addition, as shown in FIG. 21, a control unit for changing the dots displaying L and R images based on the movement of the observer has a width of 2E/5 corresponding to one dot. In this case, the crosstalk can be further reduced by reducing the control unit of the head tracking function by half, that is, to a width of E/5. As one free dot is used, crosstalk is reduced. The barrier includes an opening corresponding to two dots and a light blocking unit corresponding to three dots, and the aperture ratio of the barrier is 40%. In the optimal viewing distance OVD, the maximum crosstalk is 12.5%. This embodiment corresponds to the fourth row of the table in FIG. 13.

Figure 22:
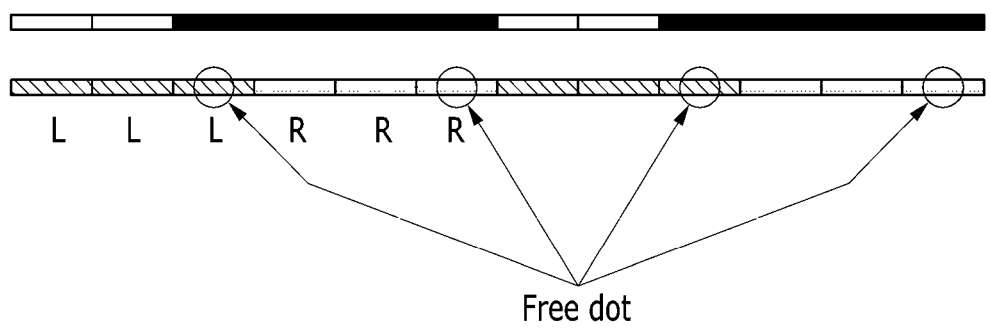
Figure 23:
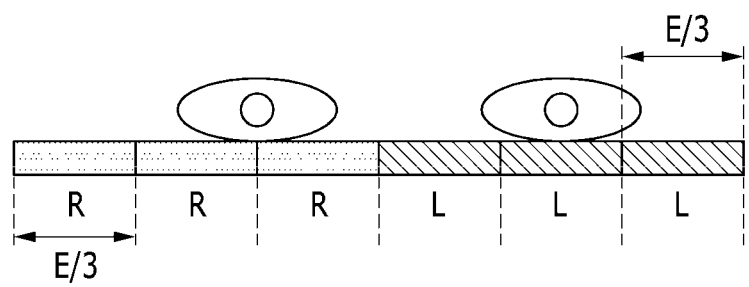

A free dot design according to another exemplary embodiment is described with reference to FIG. 13, FIG. 22, and FIG. 23. As shown in FIG. 22, six dots LLL and RRR are used to display an LR image, and the width of the opening of the barrier corresponds to two dots. In addition, as shown in FIG. 23, a control unit for changing the dots displaying L and R images based on the movement of the observer is E/3 corresponding to one dot. The barrier includes an opening corresponding to two dots and a light blocking unit corresponding to four dots, and the aperture ratio of the barrier is 33.3%. In the optimal viewing distance OVD, the maximum crosstalk is 0%. This embodiment corresponds to the fifth row of the table in FIG. 13.

Figure 24:
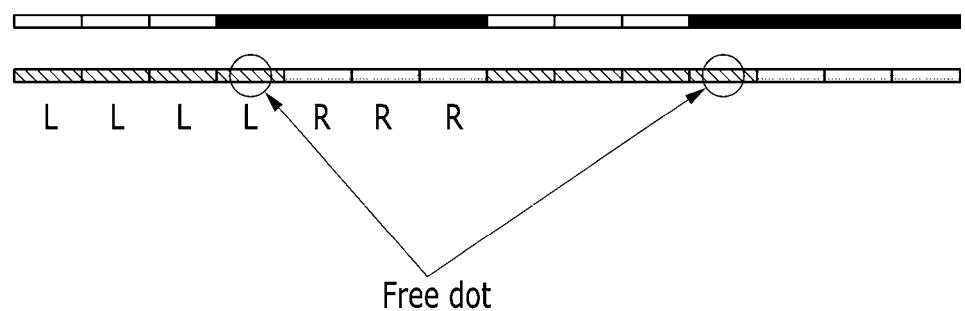
Figure 25:
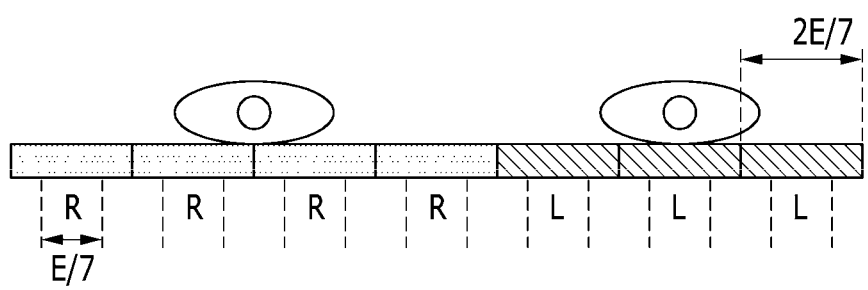

A free dot design according to another exemplary embodiment is described with reference to FIG. 13, FIG. 24, and FIG. 25. As shown in FIG. 24, seven dots LLLL and RRR are used to display an LR image, one free dot exists, and the width of the opening of the barrier corresponds to three dots. In addition, as shown in FIG. 25, a control unit for changing the dots displaying L and R images based on the movement of the observer has a width of 2E/7 corresponding to one dot. In this case, the crosstalk can be further reduced by reducing the control unit of the head tracking function by half, that is, to a width of E/7. As one free dot is used, crosstalk is reduced. The barrier includes an opening corresponding to three dots and a light blocking unit corresponding to four dots, and the aperture ratio of the barrier is 42.9%. In the optimal viewing distance OVD, the maximum crosstalk is 8%. This embodiment corresponds to the sixth row of the table in FIG. 13.

Figure 26:
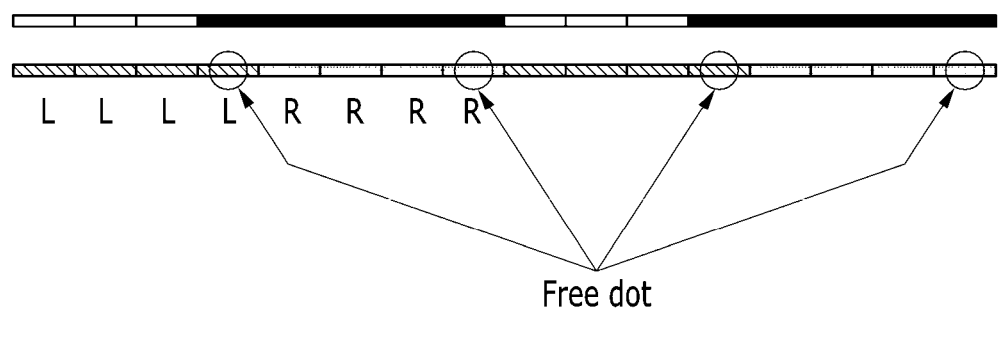
Figure 27:
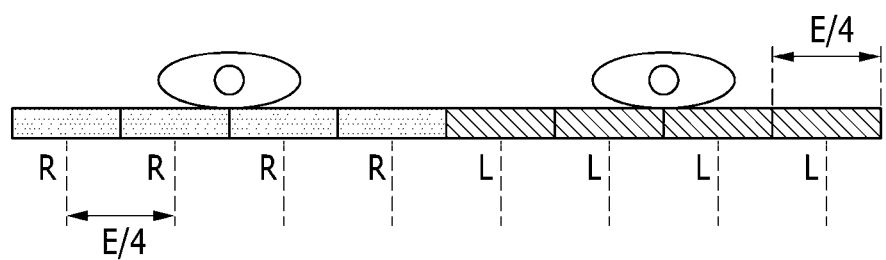

A free dot design according to another exemplary embodiment is described with reference to FIG. 13, FIG. 26, and FIG. 27. As shown in FIG. 26, eight dots LLLL and RRRR are used to display an LR image, two free dots exist, and the width of the opening of the barrier corresponds to three dots. In addition, as shown in FIG. 27, a control unit for changing the dots displaying L and R images based on the movement of the observer has a width of E/4 corresponding to one dot. The barrier includes an opening corresponding to three dots and a light blocking unit corresponding to five dots, and the aperture ratio of the barrier is 37.5%. In the optimal viewing distance OVD, the maximum crosstalk is 0%. This embodiment corresponds to the seventh row of the table in FIG. 13.

Another exemplary embodiment is described with reference to the eight row of the table in FIG. 13. Referring to FIG. 13, nine dots LLLL and RRRRR are used to display an LR image, and the width of the opening of the barrier corresponds to four dots. A control unit of the head tracking function may have a width of E/9, the maximum crosstalk in the optimal viewing distance OVD is 8%, and the aperture ratio of the barrier is 44.4%. When the width of the barrier opening is greater than three dots, image quality may deteriorate. Thus, according to an embodiment, the number of dots that are used to display an LR image is less than nine.

As described above with reference to FIG. 13 to FIG. 27, the aperture ratio of the barrier tends to increase as the number of dots increases while the crosstalk tends to decrease with the same. In other words, the number of dots included in a set of dots may be increased to reduce crosstalk and increase the aperture ratio of the barrier. However, when the number of dots included in the dot set is excessively increased, image quality of the stereoscopic image display device may deteriorate. Therefore the number of dots included in the dot sets needs to be appropriately chosen to balance the benefits of reducing crosstalk and the deterioration of the image quality.

Hereinafter, a method for designing an opening of a parallax barrier and a free dot design of a stereoscopic image display device that prevents or otherwise reduces image quality deterioration is described with reference to FIG. 28 to FIG. 30. In particular, FIG. 28 to FIG. 30 exemplarily illustrate designs for an opening of a parallax barrier according to exemplary embodiments of the present system and method.

FIG. 28 shows a case in which a parallax barrier includes an opening corresponding to two dots and a light blocking unit corresponding to four dots. That is, six dots are distributed with respect to an LR image. The opening may be vertically formed as shown in (a), or may have a predetermined inclination angle with respect to the vertical direction as shown in (b) to (d). In this case, an aperture ratio of the barrier is 33.3%. Compared to the case in which the opening of the parallax barrier is formed in the vertical direction, the maximum value of crosstalk is reduced when the opening has a predetermined inclination angle with respect to the vertical direction. This is further described later with reference to FIG. 68 and FIG. 69.

FIG. 29 shows a case in which a parallax barrier includes an opening corresponding to three dots and a light blocking unit corresponding to five dots. That is, eight dots are distributed with respect to an LR image. The opening may be vertically formed as shown in (a), or may have a predetermined inclination angle with respect to the vertical direction as shown in (b) to (e). In this case, an aperture ratio of the barrier is 37.5%.

FIG. 30 shows a case in which a parallax barrier includes an opening corresponding to four dots and a light blocking unit corresponding to six dots. That is, ten dots are distributed with respect to an LR image. The opening may be vertically formed as shown in (a), or may have a predetermined inclination angle with respect to the vertical direction as shown in (b) to (e). In this case, an aperture ratio of the barrier is 40%.

It is generally advantageous that small-sized openings are distributed for realization of high image quality. Thus, the design of the opening of the barrier of FIG. 28, which has an aperture ratio of 33%, may provide a better image quality than the barrier of FIG. 30, which has an aperture ratio of 40%. That is, although the design of the opening of the barrier of FIG. 30 improves the aperture ratio, and thus reduces crosstalk, the image quality may diminished. Thus, according to an embodiment, the size of the opening of the parallax barrier may be limited to be less than 3 dots.

Hereinafter, a simulation with respect to the above-described free dot design and a result of the simulation is described with reference to FIG. 31 to FIG. 43.

Consider a case in which a binocular gap is E, a horizontal directional pitch of a dot is Hp, a distance between a parallax barrier and a display panel is g, and an optimal viewing distance OVD is d. Based on the above denotations, a stereoscopic image display device according to an exemplary embodiment of the present system and method satisfies Equation 1.

$$2E/n:d=Hp:g$$

$$d=2gE/np \quad \text{(Equation 1)}$$

Here, as previously described, n denotes the number of dots distributed with respect to LR images and n=2m+1 or n=2(m+1). m denotes the number of dots corresponding to the width of the opening of the barrier. In this case, an inclination angle of the opening of the barrier satisfies $A=\tan^{-1} Hp/Vp$, where Vp is a vertical directional pitch of the dot. In addition, a horizontal directional width of the opening corresponds to m dots, a horizontal directional pitch of the viewpoint division unit corresponds to 2m+1 or 2(m+1) dots, and an aperture ratio of the viewpoint division unit corresponds to m/2m+1 or m/2(m+1).

Figure 31:
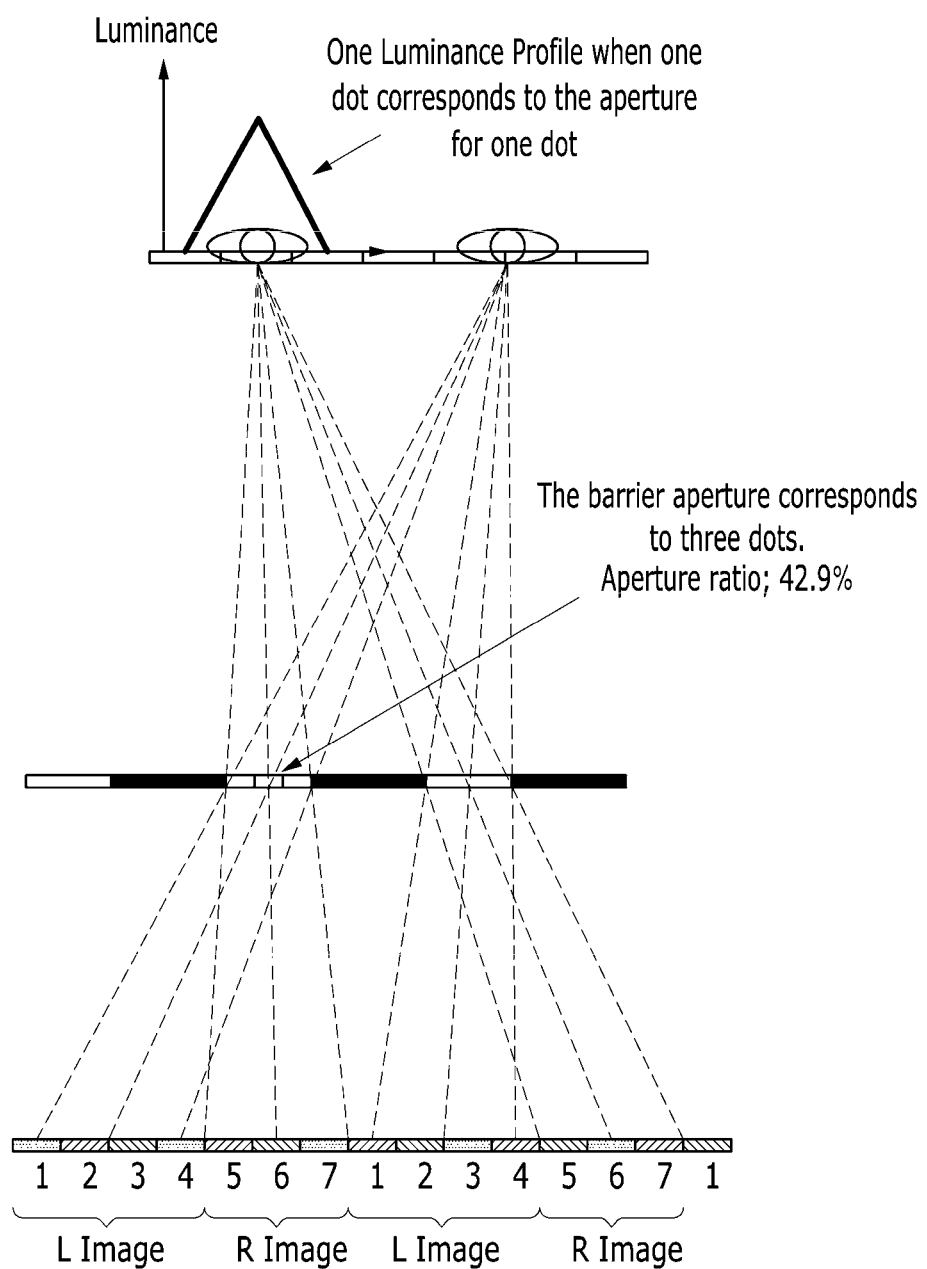
FIG. 31 to FIG. 33 show a simulation method and its result with respect to a free dot design in which seven dots are distributed with respect to the LR image, according to an exemplary embodiment.
Figure 32:
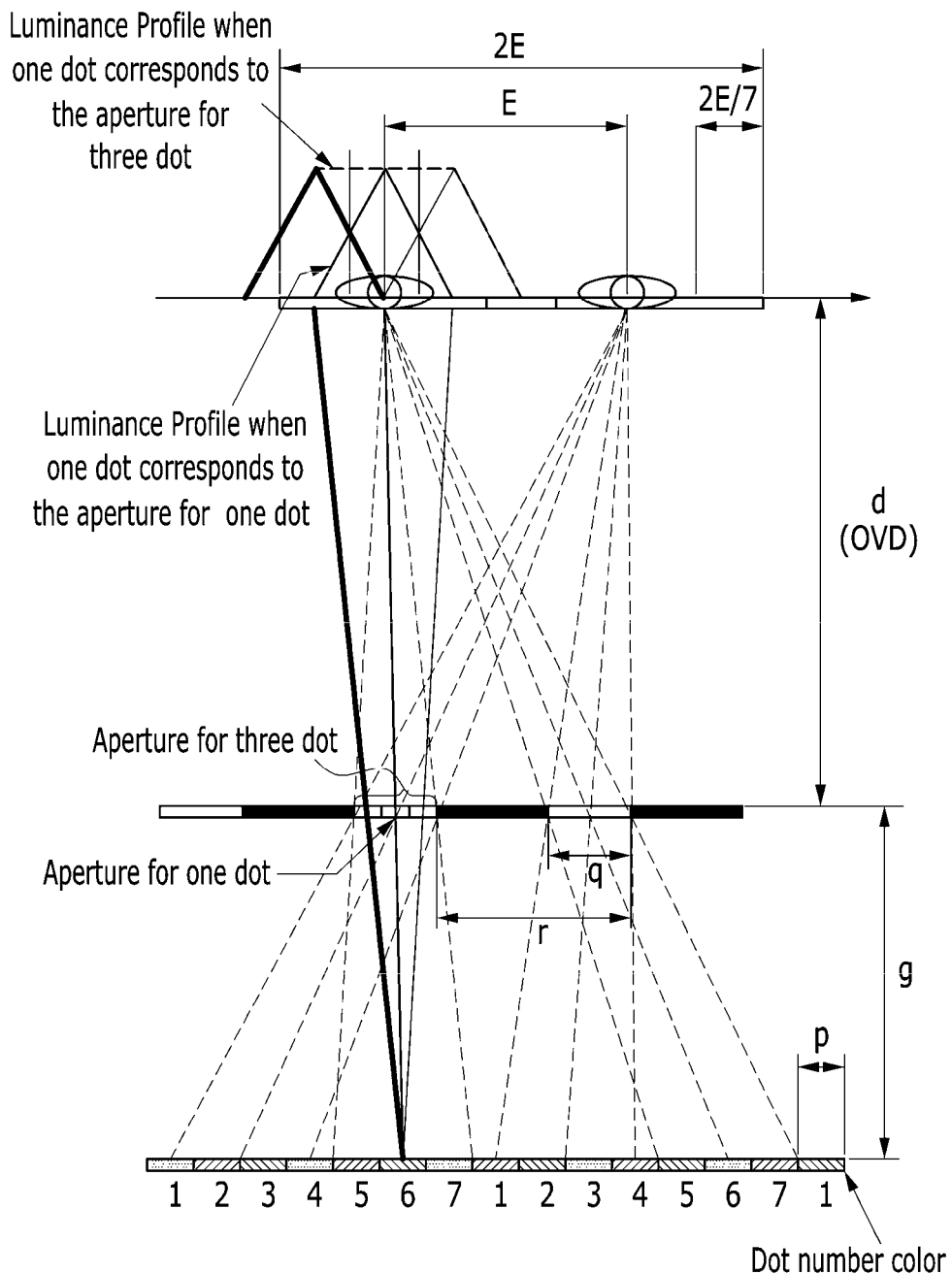
Figure 33:
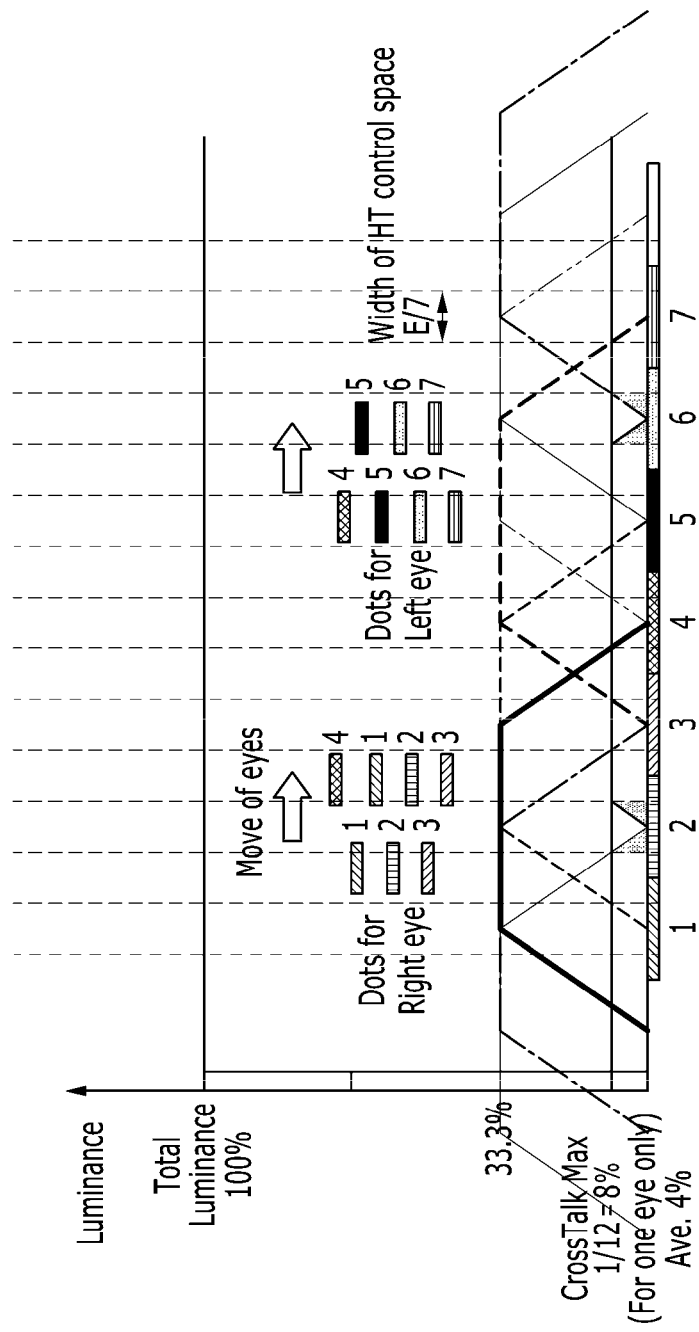

FIG. 31 to FIG. 33 show a simulation method and result for a free dot design in which seven dots are distributed for the LR image. Referring to FIG. 31 to FIG. 33, the width of the opening of the parallax barrier is q, a pitch including the opening and the light blocking unit of the parallax barrier is r, and the width of a dot is p.

In this case, p:g=2E/7:d, d:q=(d+g):3p, and r=7q/3 are established. That is, d=2gE/7p, g=7pd/2E, and q=3pd/(d+g).

The opening of the barrier is formed with a width that corresponds to three dots. The luminance of one dot emitting light through an opening of which the width corresponds to one dot among the three dots has a triangular pyramid luminance profile that is reduced toward the outside from the center. Luminance of one dot emitting light through the opening of which the width corresponds to three dots has a rhombus luminance profile as shown in FIG. 32.

When seven dots are distributed with respect to the LR image, a control unit of the head tracking function is E/7. As shown in FIG. 33, as the eyes of the observer move to the left side or to the right side in the optimal viewing distance OVD, three or four dots are viewed by the right eye or the left eye. For example, when the eyes of the observer move while dots 1, 2, and 3 are viewed by the left eye and dots 4, 5, 6, and 7 are viewed by the right eye, dots 1, 2, and 3 and a part of dot 4 are viewed by the left eye of the observer so that crosstalk occurs. In this case, the maximum crosstalk becomes 8%. The total luminance is the sum of the luminance profiles of the respective three or four dots viewed by the eyes. Although the eyes of the observer may move to the left or right side in the optimal viewing distance OVD, the entire luminance is constantly maintained.

Figure 34:
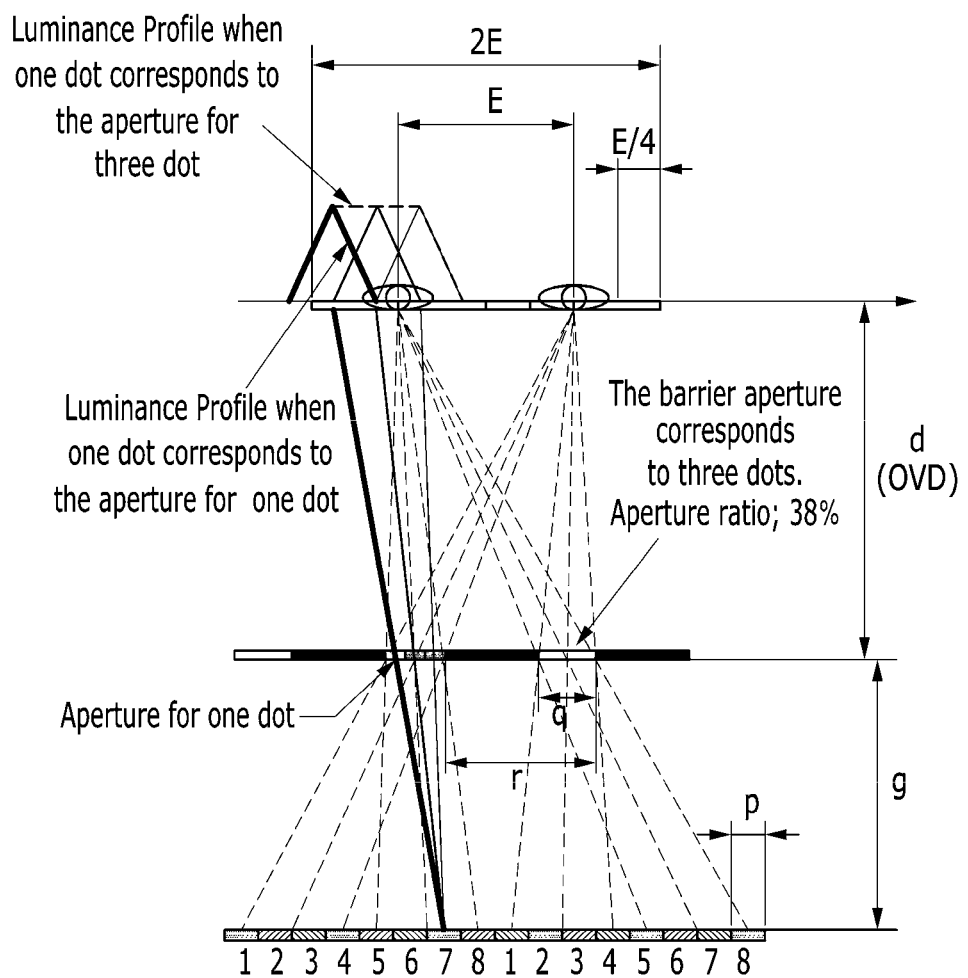
FIG. 34 and FIG. 35 show a simulation method and its result with respect to a free dot design in which eight dots are distributed with respect to the LR image, according to an exemplary embodiment.
Figure 35:
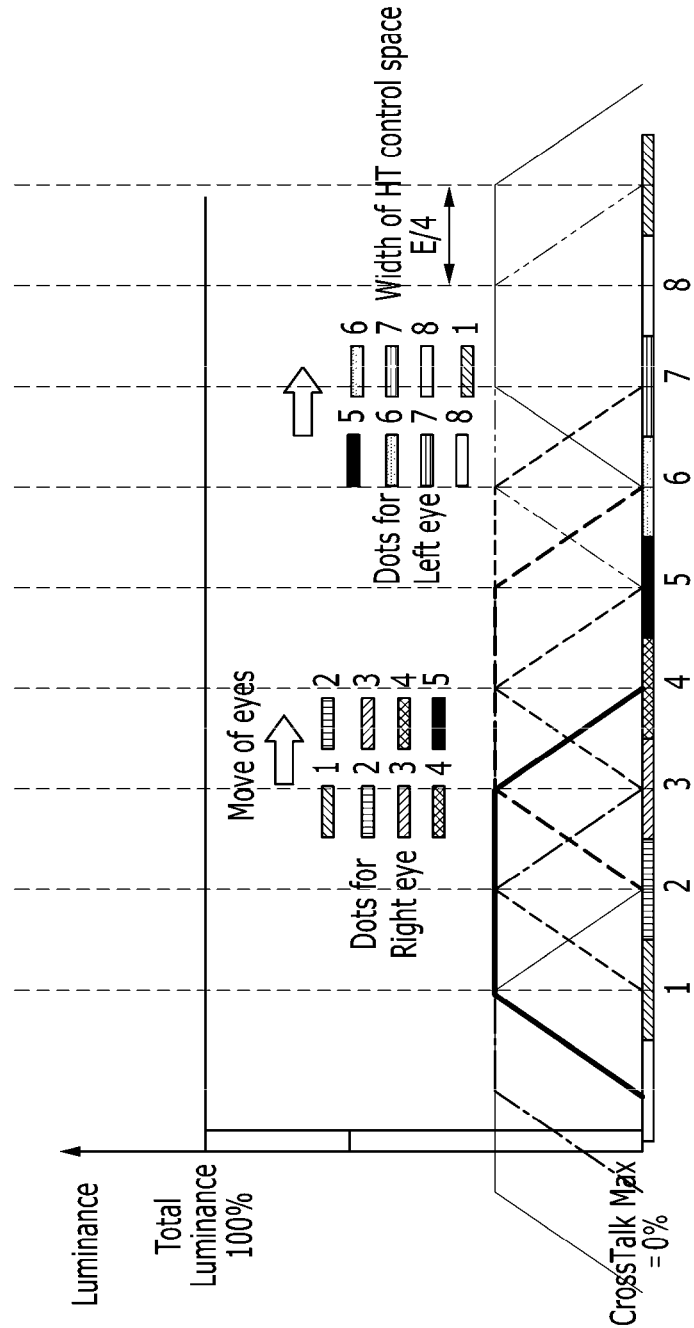

FIG. 34 and FIG. 35 show a simulation method and result for a free dot design in which eight dots are distributed for the LR image. Referring to FIG. 34 and FIG. 35, p:g=E/4:d, d:q=(d+g):3p, and r=8q/3 are established. That is, d=gE/4p, g=4pd/E, and q=3pd/(d+g).

The opening of the barrier is formed with a width that corresponds to three dots. The luminance of one dot emitting light through an opening of which the width corresponds to the three dots has a rhombus luminance profile as shown in FIG. 34.

When eight dots are distributed with respect to the LR image, a control unit of the head tracking function is E/4. As shown in FIG. 35, four dots are viewed by the right eye or left eye of the observer in the optimal viewing distance OVD. For example, when the eyes of the observer move while dots 1, 2, 3, and 4 are viewed by the right eye and dots 5, 6, 7, and 8 are viewed by the left eye, dot 5 is not viewed by the left eye when the right eye starts to see dot 5 and no crosstalk occurs. That is, the maximum crosstalk becomes 0%. The total luminance is the sum of the luminance profiles of the four dots viewed by the eyes. Although the eyes of the observer may move to the left or right side in the optimal viewing distance OVD, the total luminance is constantly maintained.

Figure 36:
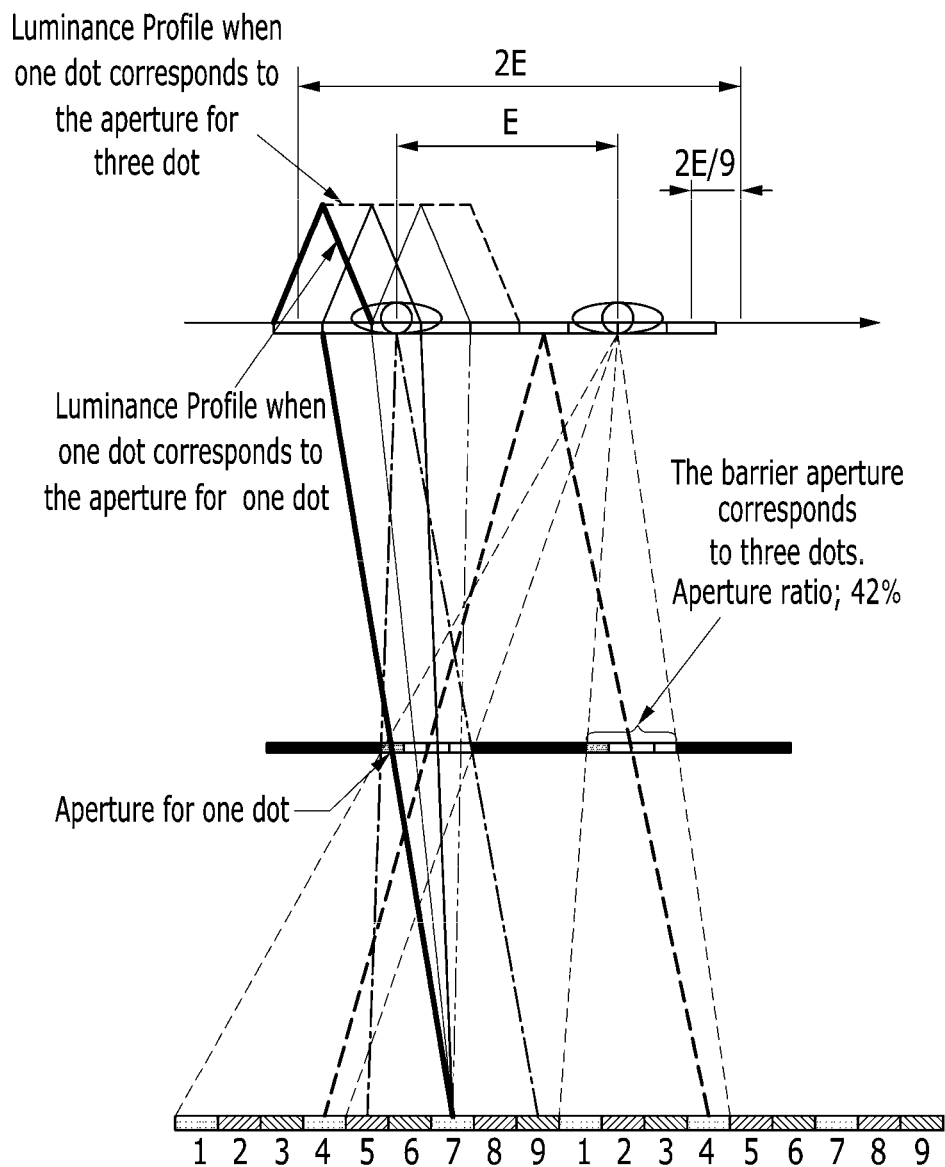
FIG. 36 and FIG. 37 show a simulation method and its result with respect to a free dot design in which nine dots are distributed with respect to the LR image, according to an exemplary embodiment.
Figure 37:
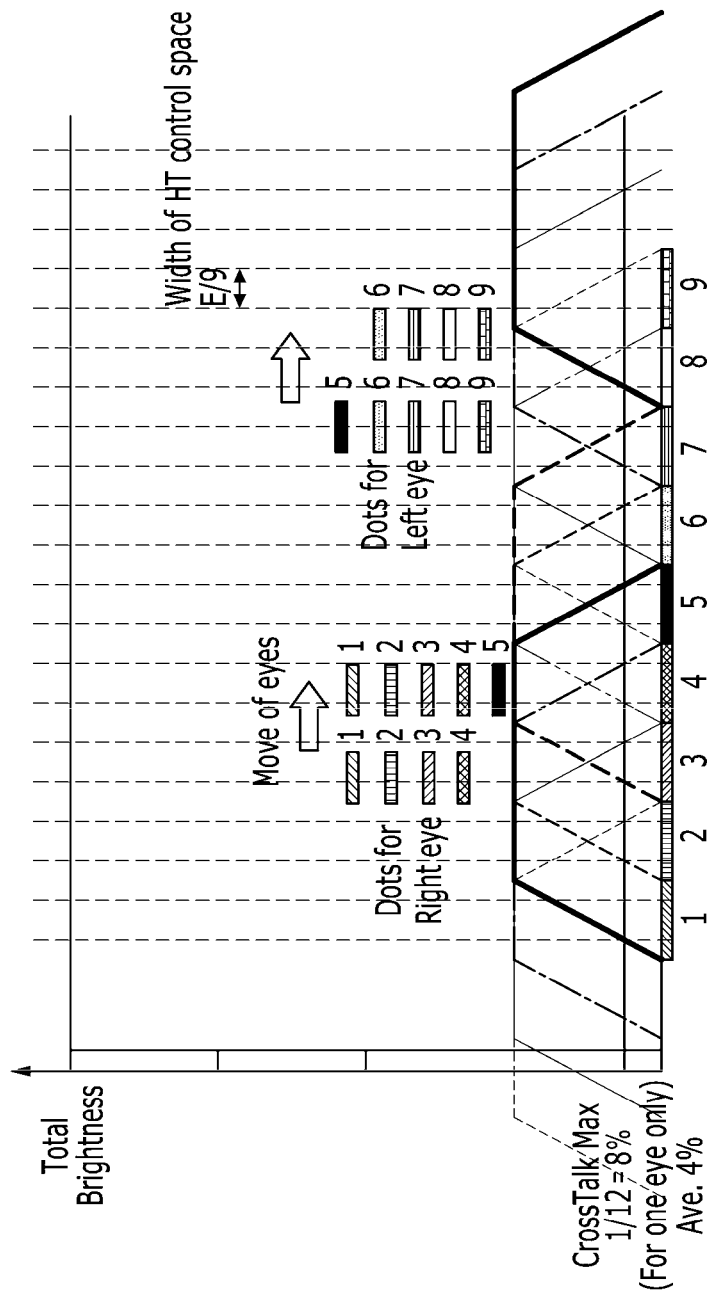

FIG. 36 and FIG. 37 show a simulation method and result for a free dot design in which nine dots are distributed for the LR image. Referring to FIG. 36 and FIG. 37, the opening of the barrier is formed with a width that corresponds to four dots. The luminance of one dot emitting light through an opening of which the width corresponds to the four dots has a rhombus luminance profile as shown in FIG. 36.

When nine dots are distributed with respect to the LR image, a control unit of the head tracking function is E/9. As shown in FIG. 37, four or five dots are viewed by the right eye or left eye of the observer as the eyes of the observer move to the left side or to the right side in the optimal viewing distance OVD. For example, when the eyes of the observer move while the right eye sees dots 1, 2, 3, and 4 and the left eye sees dots 5, 6, 7, 8, and 9, dots 1, 2, 3, and 4 and a part of dot 5 are viewed by the right eye so that crosstalk occurs. The maximum crosstalk is 8%. The total luminance is the sum of the luminance profiles of each of the four or five dots viewed by the eyes.

Figure 38:
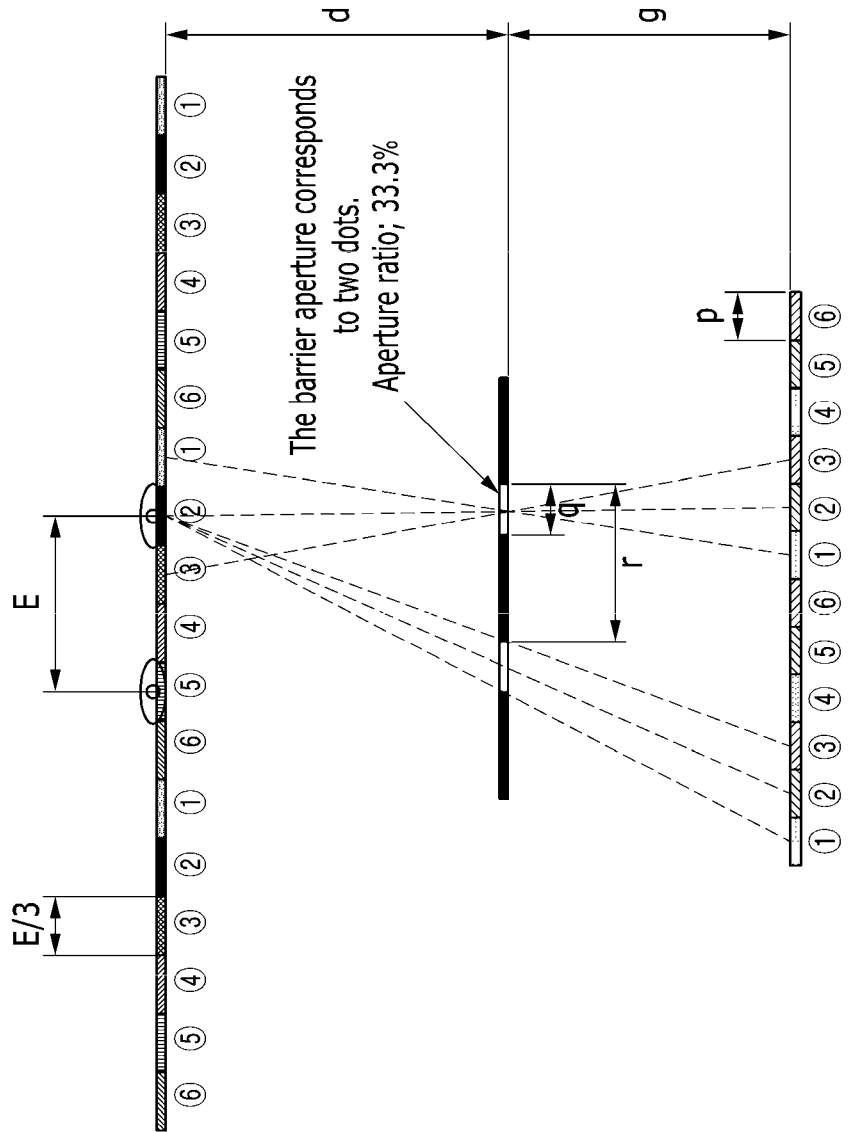
FIG. 38 and FIG. 39 show a simulation method and its result with respect to a free dot design in which six dots are distributed with respect to the LR image, according to an exemplary embodiment.
Figure 39:
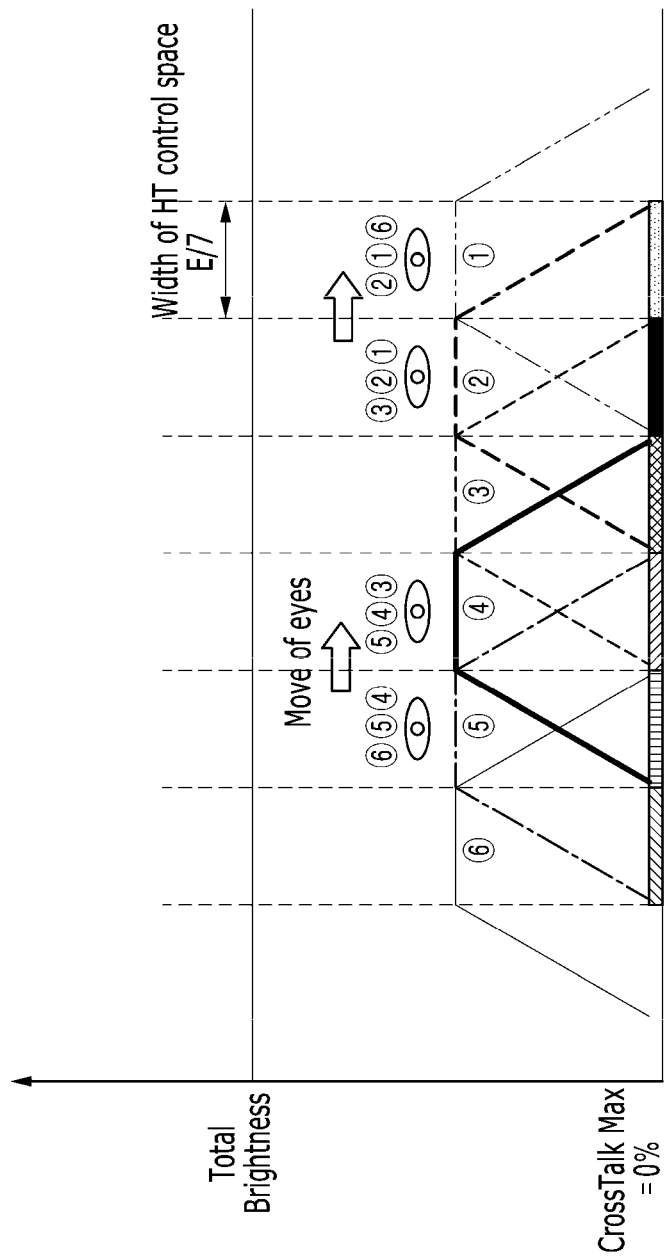

FIG. 38 and FIG. 39 show a simulation method and result for a free dot design in which six dots are distributed for the LR image. Referring to FIG. 38 and FIG. 39, p:g=E/3:d, d:q=(d+g):2p, and r=6q12 are established. That is, d=gE/3p, g=3pd/E, and q=2pd/(d+g).

The opening of the barrier is formed with a width that corresponds to two dots. The luminance of one dot emitting light through an opening of which the width corresponds to the two dots has a rhombus luminance profile as shown in FIG. 39.

When six dots are distributed with respect to the LR image, a control unit of the head tracking function is E/3. As shown in FIG. 39, three dots are viewed by the right eye or the left eye of the observer in the optimal viewing distance OVD. For example, when the eyes of the observer move while dots 6, 5, and 4 are viewed by the right eye and dots 3, 2, and 1 are viewed by the left eye, dot 3 is not viewed by the left eye when the right eye starts to see dot 3 and no crosstalk occurs. The maximum crosstalk is 0%. The total luminance is the sum of the luminance profiles of each of the three dots.

Figure 40:
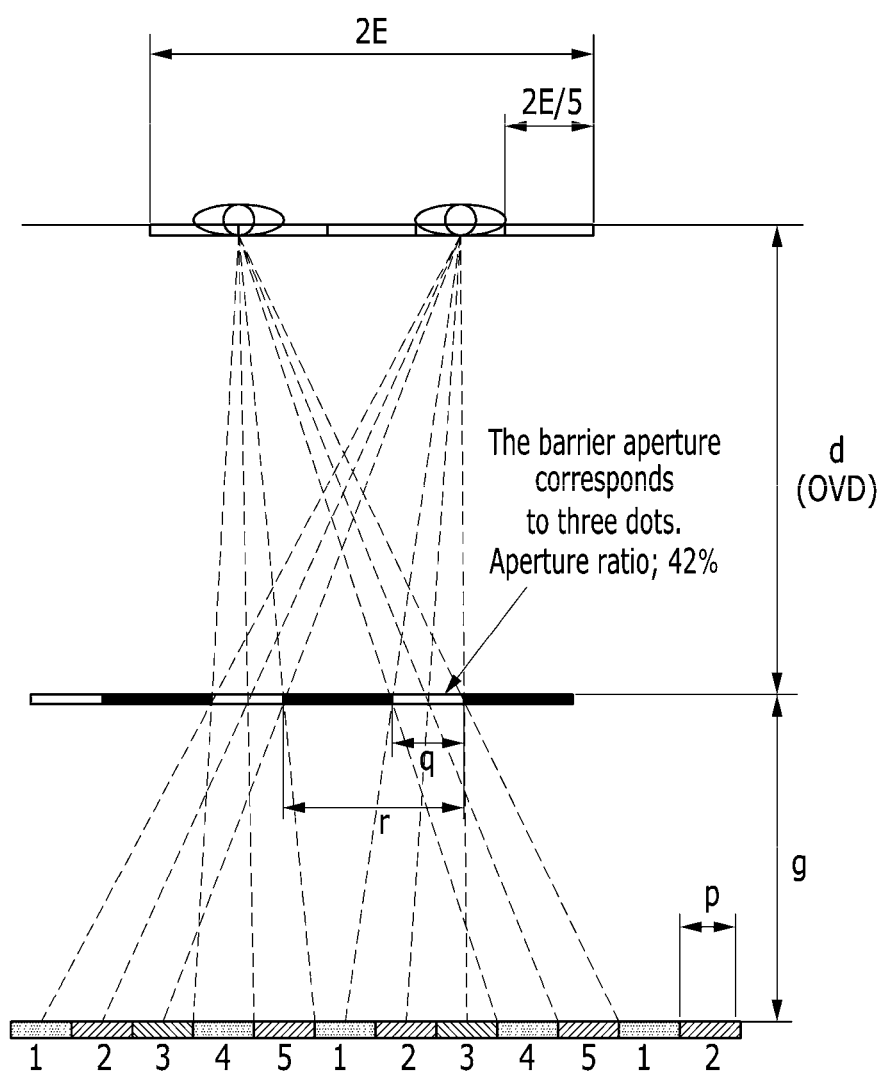
FIG. 40 and FIG. 41 show a simulation method and its result with respect to a free dot design in which five dots are distributed with respect to the LR image, according to an exemplary embodiment.
Figure 41:
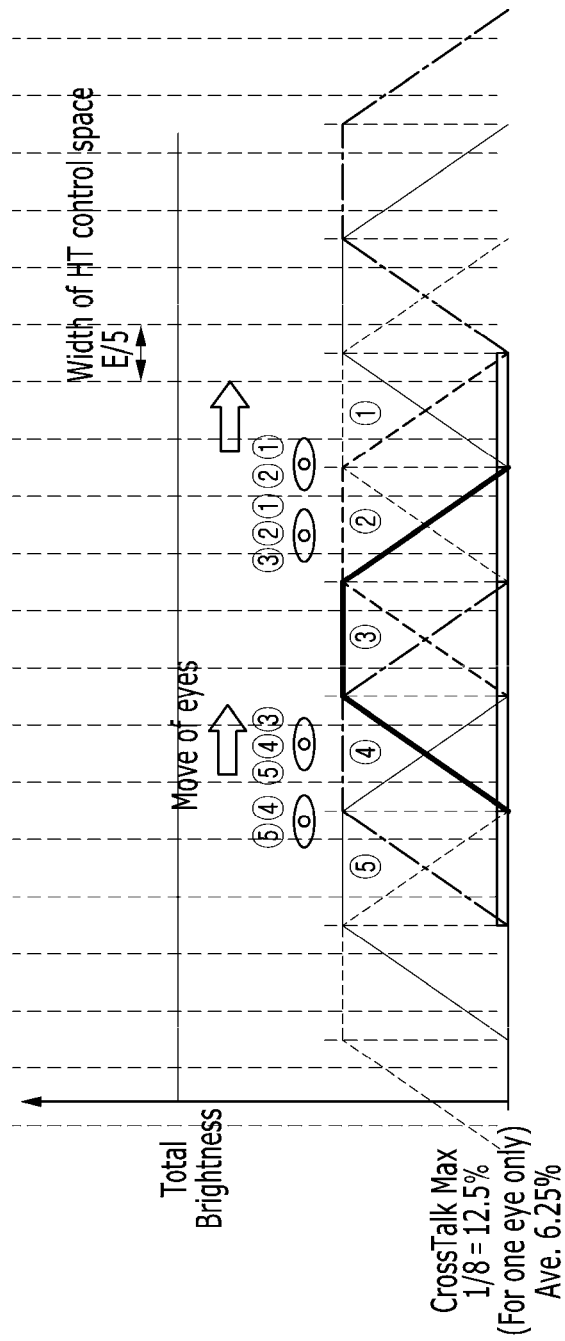

FIG. 40 and FIG. 41 show a simulation method and result for a free dot design in which five dots are distributed for the LR image. Referring to FIG. 40 and FIG. 41, p:g=2E/5:d, d:q=(d+g):2p, and r=5q12. That is, d=2gE/5p, g=5pd/2E, and q=2pd/(d+g).

The opening of the barrier is formed with a width that corresponds to two dots. The luminance of one dot emitting light through an opening of which the width corresponds to the two dots has a rhombus luminance profile as shown in FIG. 40.

When five dots are distributed with respect to the LR image, a control unit of the head tracking function is E/5. As shown in FIG. 41, two to three dots are viewed by each of the right eye and the left eye as the eyes of the observer move to the left side or to the right side in the optimal viewing distance OVD. For example, when the eyes of the observer move while dots 5 and 4 are viewed by the right eye and dots 3, 2, and 1 are viewed by the left eye, dots 5 and 4 and a part of dot 3 are viewed by the right eye so that crosstalk occurs. The maximum crosstalk is 12.5%. The total luminance is the sum of the luminance profiles of the two to three dots.

Figure 42:
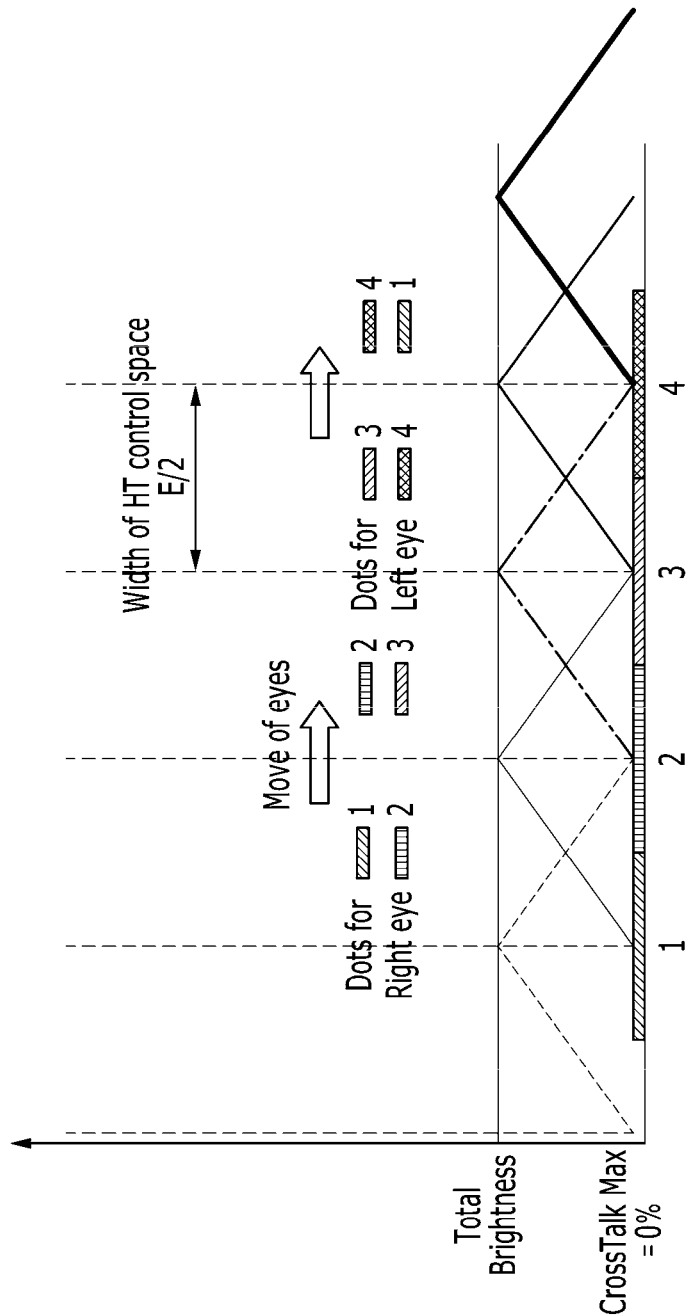
FIG. 42 shows a simulation result with respect to a free dot design in which four dots are distributed for the LR image, according to an exemplary embodiment.

FIG. 42 shows a simulation result for a free dot design in which four dots are distributed for the LR image. The simulation method involved with FIG. 42 may be the same as described above, and therefore no repeated description is provided.

Referring to FIG. 42, when four dots are distributed for the LR image, a control unit of the head tracking function is E/2. As the eyes of the observer move to the left side or to the right side in the optimal viewing distance OVD, two dots are viewed by the left eye or the right eye. For example, when the eyes of the observer move while dots 1 and 2 are viewed by the right eye and dots 3 and 4 are viewed by the left eye, dot 3 is not viewed by the left eye when the right eye starts to see dot 3 and no crosstalk occurs. The maximum crosstalk is 0%. The total luminance is the sum of the luminance profiles of the two dots viewed by the eyes.

Figure 43:
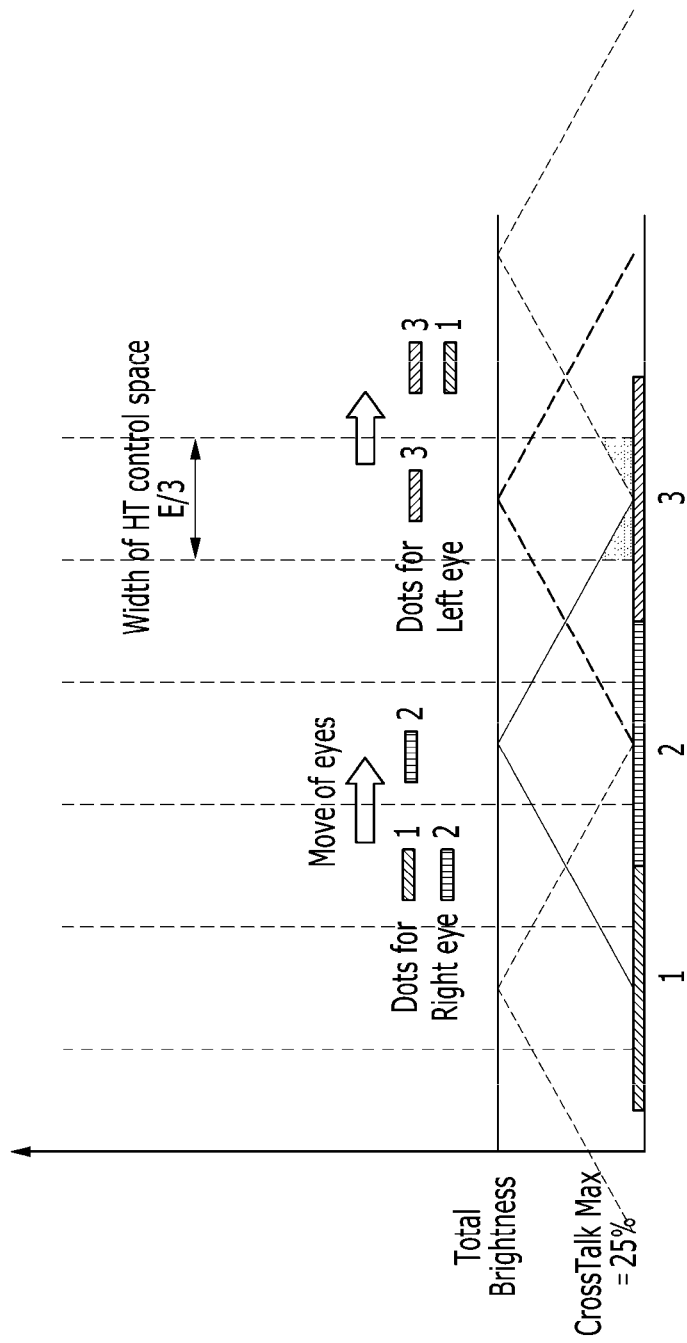
FIG. 43 shows a simulation result with respect to a free dot design in which three dots are distributed for the LR image, according to an exemplary embodiment.

FIG. 43 shows a simulation result of a free dot design in which three dots are distributed for the LR image. The simulation method involved with FIG. 43 may be the same as described above, and therefore no repeated description is provided. Referring to FIG. 43, when three dots are distributed for the LR image, a control unit of the head tracking function is E/3. As the eyes of the observer move to the left side or to the right side in the optimal viewing distance OVD, one to two dots are viewed by the left eye or the right eye. For example, when the eyes of the observer move while dots 1 and 2 are viewed by the right eye and dot 3 is viewed by the left eye, dot 3 and a part of dot 1 are viewed by the left eye so that crosstalk occurs. The maximum crosstalk is 25%. The total luminance is the sum of the luminance profiles of one to two dots viewed by the eyes.

An inclination angle (also referred as an inclination angle of a viewpoint division unit) formed by an alignment direction of the openings of the parallax barrier of the viewpoint division unit 800 inclined with reference to a column direction may vary, and can be given as Equation 2.

$$A = \tan^{-1} \frac{Hp \times a}{Vp \times b} \qquad \text{(Equation 2)}$$

Here, A denotes an inclination angle, Hp denotes a horizontal directional pitch of a pixel PX (or a dot), and Vp is a vertical directional pitch of the pixel PX (or the dot). a and b are respectively natural numbers, and b may be greater than 1.

According to Equation 2, a second pixel PX2—which is the next pixel in the same viewpoint viewed through the opening of the parallax barrier arranged in a line with respect to a first pixel PX1 displaying an image of a given viewpoint—is positioned after a columns to the right and b rows down from the first pixel PX1.

The inclination angle of the viewpoint division angle in Equation 2 may be applied to the portrait mode and the landscape mode. For example, in the portrait mode, if a=1 and b=1, the inclination angle of the barrier may be $A = \tan^{-1}$ Hp/Vp.

Hereinafter, a case in which a plurality of pixels included in the display panel 300 of the stereoscopic image display device according to an exemplary embodiment of the present system and method are formed in the landscape mode is described.

First, referring to FIG. 44 to FIG. 47, a method for designing an inclination angle and an aperture ratio of the opening of the parallax barrier and a method for realization of the head tracking function when the plurality of pixels are formed in the landscape mode are described.

Figure 44:
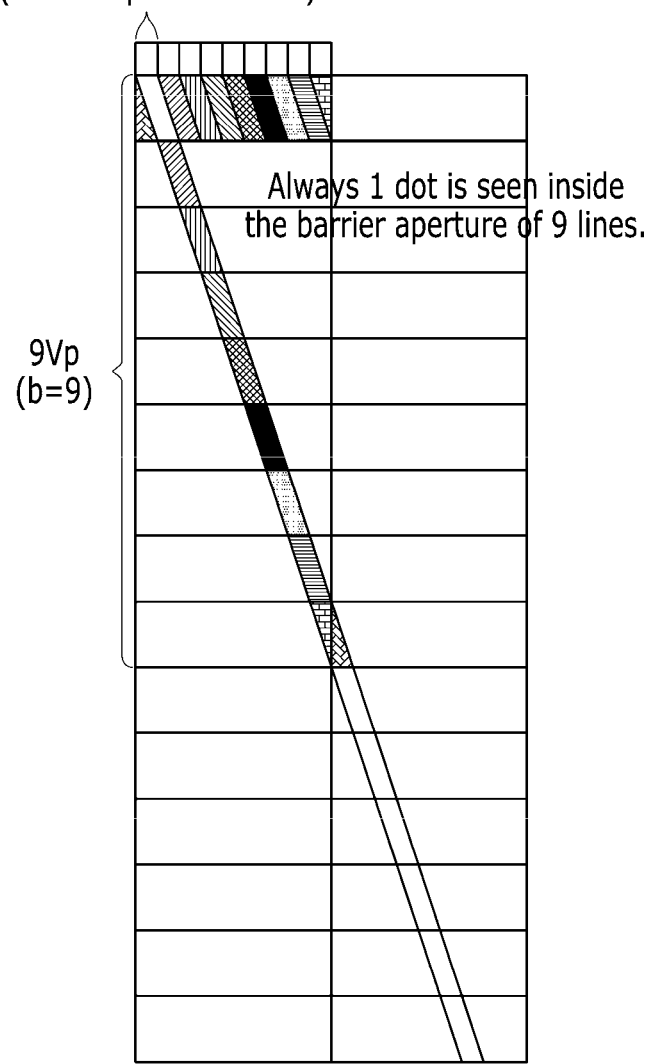
FIG. 44 shows an inclination angle of an opening of the parallax barrier in which a plurality of pixels of the stereoscopic image display device are formed in a landscape mode, according to an exemplary embodiment.
Figure 45:
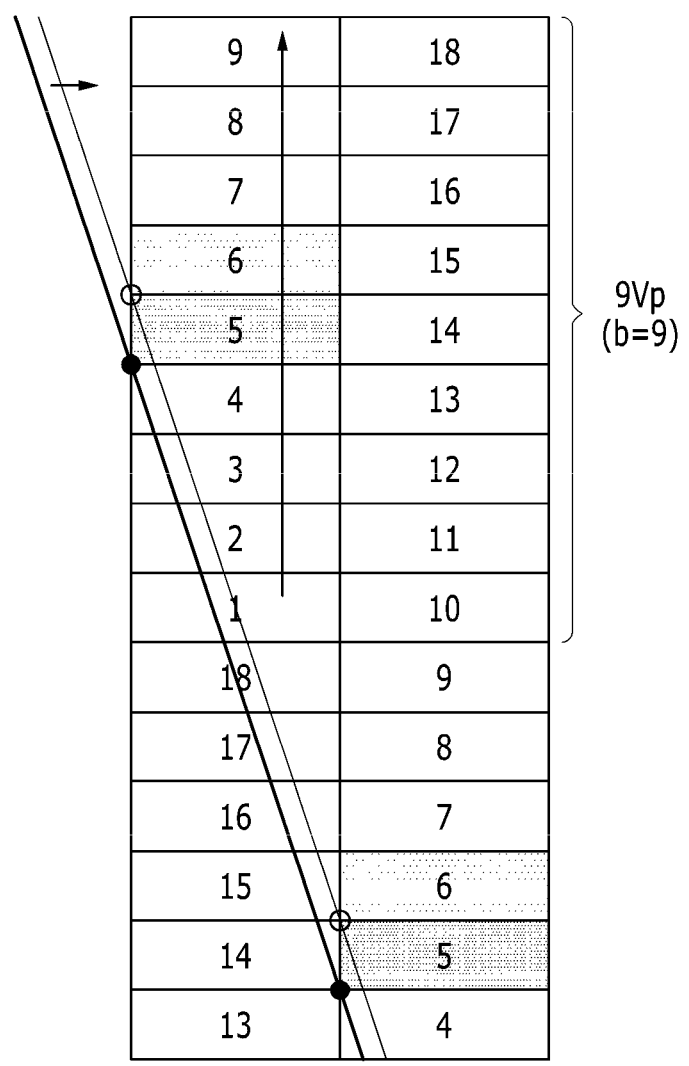
FIG. 45 exemplarily illustrates a variation of the dots viewed when an observer moves in a horizontal direction.
Figure 46:
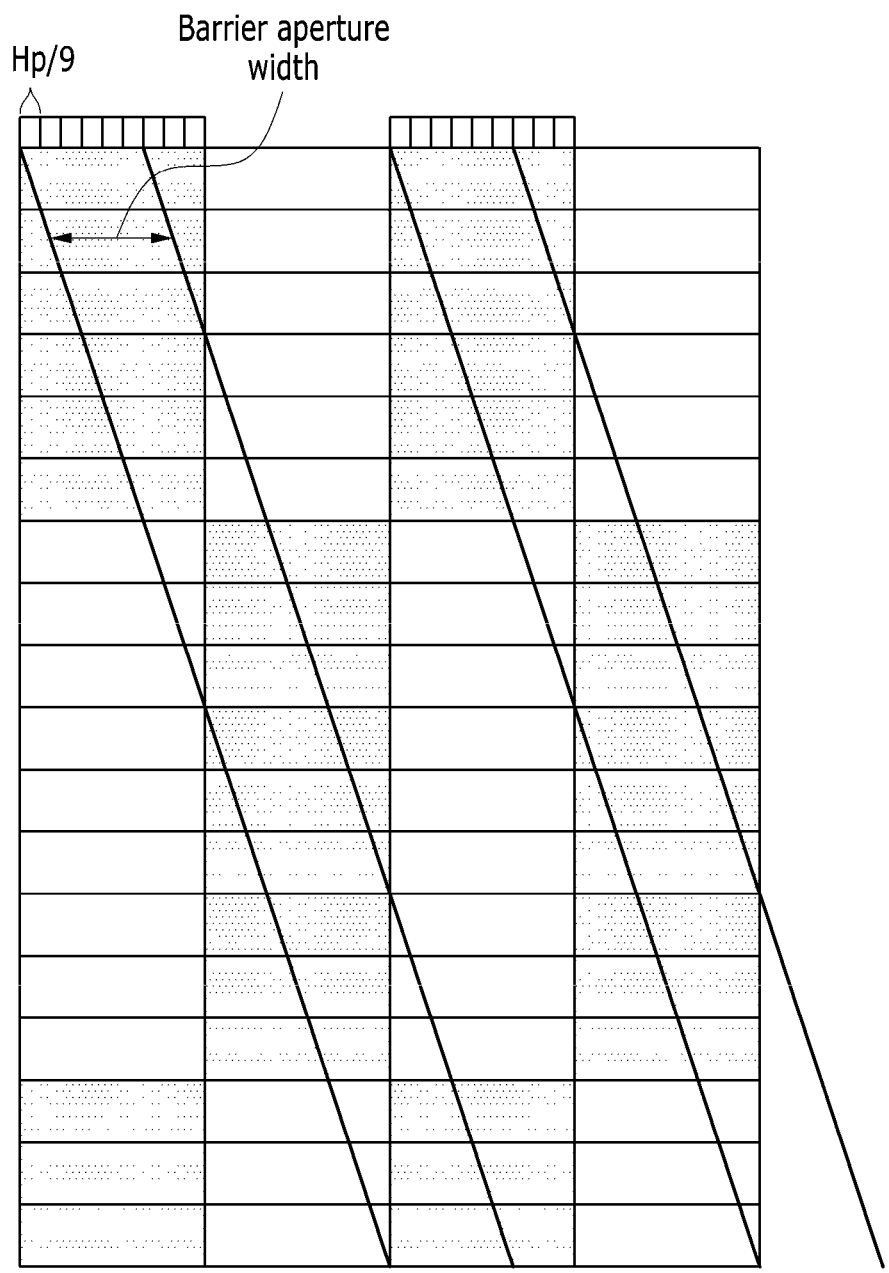
FIG. 46 and FIG. 47 show a method for designing an aperture of a parallax barrier and a method for realization of head tracking function in the landscape mode, according to an exemplary embodiment.
Figure 47:
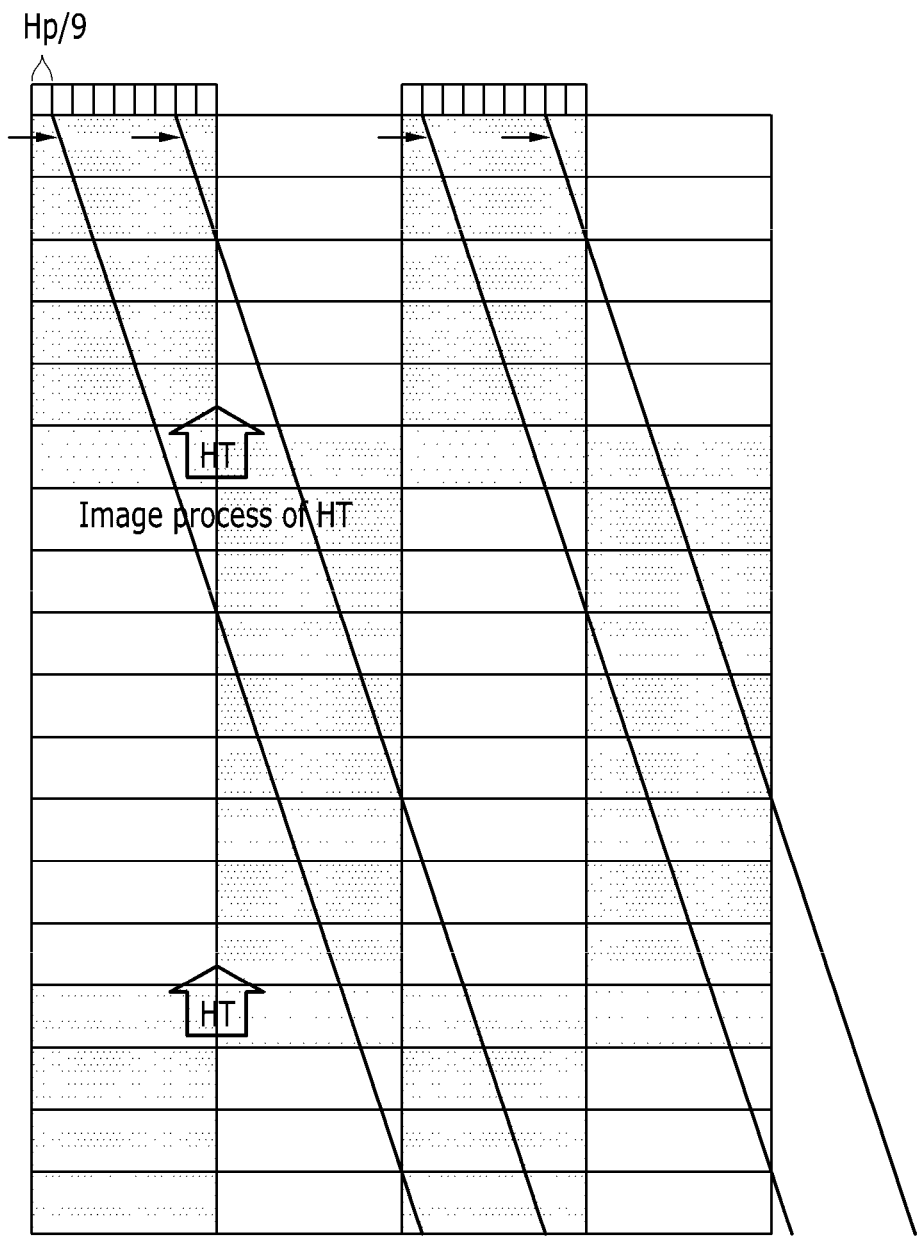

FIG. 44 shows the inclination angle of the opening of the parallax barrier when the plurality of pixels of the stereoscopic image display device are formed in the landscape mode according to an exemplary embodiment of the present system and method. FIG. 45 exemplarily shows a variation of the dots observed when the observer moves horizontally. FIG. 46 and FIG. 47 show a design of the aperture ratio of the parallax barrier and realization of the head tracking function in the landscape mode.

Referring to FIG. 44, when the plurality of pixels are formed in the landscape mode, the inclination angle of the parallax barrier is given as Equation 3, which is a simplification of Equation 2 with a=1.

$$A = \tan^{-1} \frac{Hp}{Vp \times b} \quad \text{Equation 3}$$

When a binocular distance of the observer is E, a control unit for changing dots for displaying a left-eye image and a right-eye image corresponding to the movement of the observer in the optimal viewing distance OVD has a width E/b that corresponds to one dot in the optimal viewing distance OVD. In addition, the opening of the parallax barrier is formed to have a horizontal directional width of m×Hp/b dots (here, m is a natural number), a horizontal directional pitch of the viewpoint division unit to have a horizontal direction width of two dots, and the viewpoint division unit to have an aperture ratio of m/2b. When a distance between the viewpoint division unit and the display panel is g and the optimal viewing distance is d in the landscape mode, the following Equation 4 can be satisfied.

$$E{:}d = Hp{:}g \quad \text{[Equation 4]}$$

FIG. 44 shows a case in which b=9 and the pixels in column 1 and row 9 are viewed through the opening of the parallax barrier. In this case, the width of the opening of the parallax barrier is Hp/9 and no moiré occurs. The parallax barrier includes an inclination angle such that when two dots arranged in parallel with the horizontal direction are viewed with the binocular gap E in the optimal viewing distance OVD, nine dots that are sequentially arranged in the vertical direction corresponds to the binocular gap E in the optimal viewing distance. That is, one viewpoint group is formed in the nine dots that are sequentially arranged in the vertical direction.

Referring to FIG. 45, the solid line denotes the observer's view before the movement of the observer and the dotted line denotes the observer's view after the movement of the observer. Before the movement of the observer, an edge of dot 5 is viewed through the opening of the parallax barrier. After the movement of the observer, an edge of dot 6 is viewed through the opening of the parallax barrier. That is, a dot viewed when the observer moves horizontally is changed in a vertical direction. This is different from the portrait mode in which a dot viewed when the observer moves in a horizontal direction is changed in a horizontal direction.

Referring to FIG. 46, since no moiré occurs when the width of the opening is Hp/9, an opening having a width of 6Hp/9 may be formed to prevent occurrences of moiré. In such case, the aperture ratio of the barrier may be 6/18=33.3%.

Referring to FIG. 47, as the observer moves in the horizontal direction at the optimal viewing distance OVD, a pixel area viewed by the observer is moved to the right side by Hp/9. In this case, a head tracking function is performed to process an image such that a dot set is moved upward by one dot. That is, in the landscape mode, an image is processed such that the dot set is moved in a vertical direction in response to the horizontal directional movement of the observer, thereby realizing the head tracking function. The image processing of the head tracking function can be realized by optimizing viewpoint information of a dot existing in a boundary.

Figure 48:
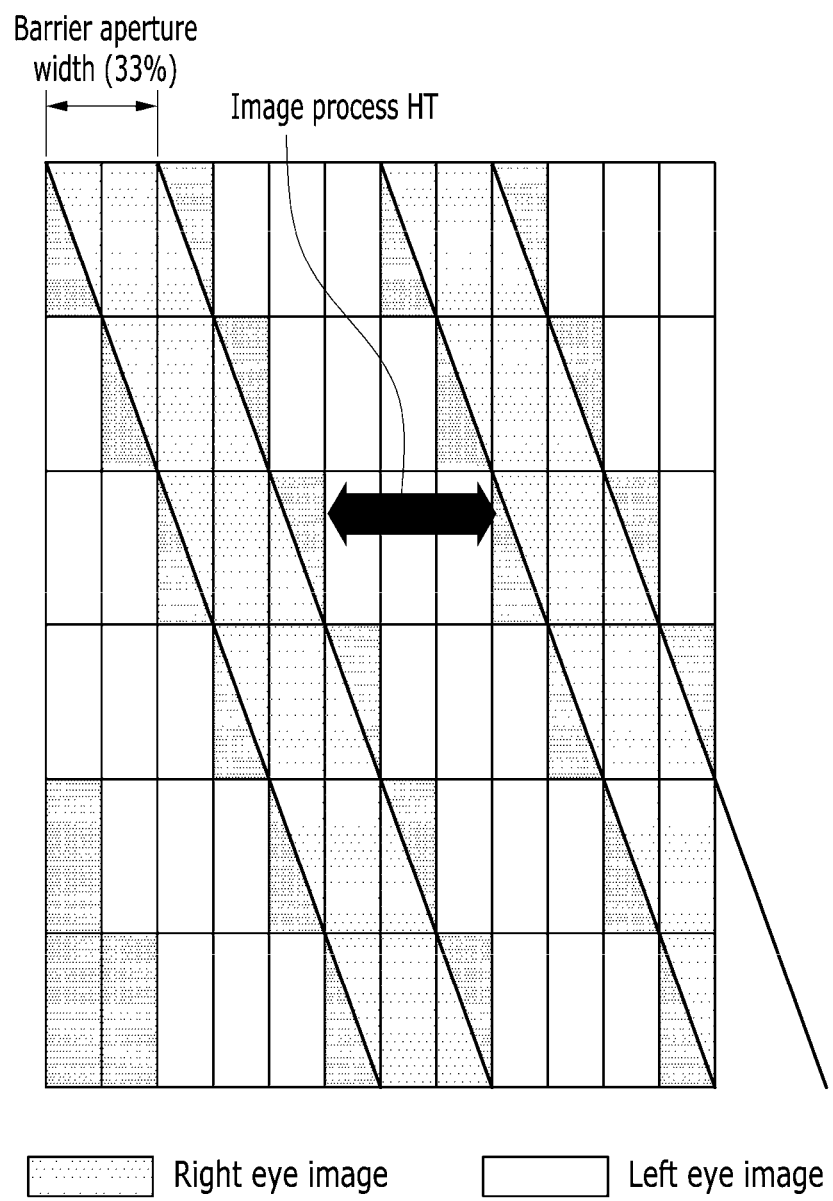
FIG. 48 shows a design of an opening of the parallax barrier in the portrait mode, according to an exemplary embodiment.
Figure 49:
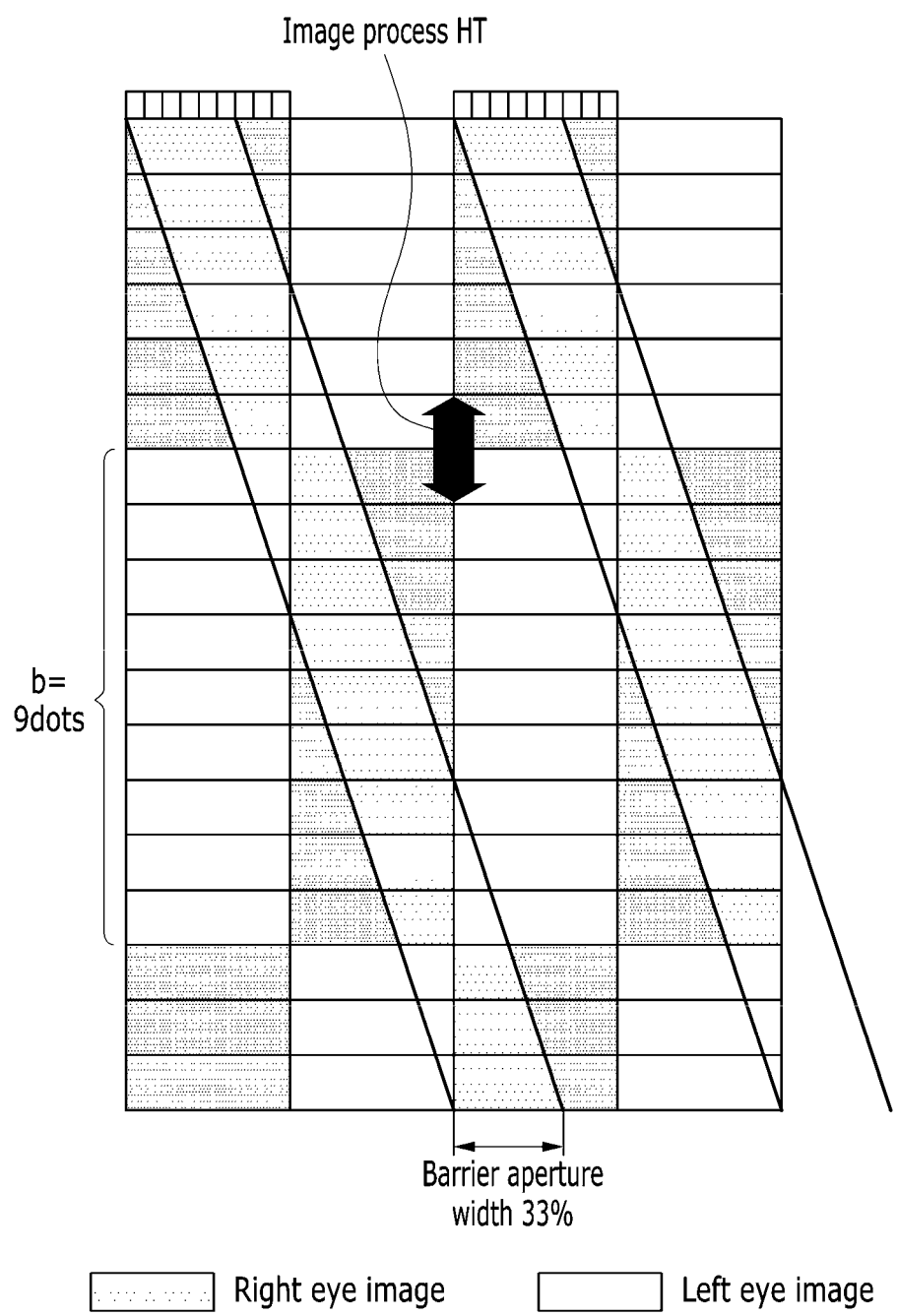
FIG. 49 shows a design of an opening of the parallax barrier in the landscape mode, according to an exemplary embodiment.

Hereinafter, a method for realization of the same aperture ratio in the portrait mode and the landscape mode is described. FIG. 48 shows a design of the opening of the parallax barrier in the portrait mode. FIG. 49 shows a design of the opening of the parallax barrier in the landscape mode.

Referring to FIG. 48, an inclination angle of the opening of the parallax barrier, that is, an inclination angle of the viewpoint division unit in the portrait mode is a case in which a=1 and b=1 in Equation 2, and therefore $A=\tan^{-1}$ (Hp/Vp). This is a case that b=1 in Equation 2. Since dots viewed by the observer are changed in the horizontal direction when the observer moves in the horizontal direction, the head tracking function may be to process an image such that a dot set is moved in the horizontal direction in response to the horizontal directional movement of the observer.

Referring to FIG. 49, in the landscape mode, an inclination angle of the opening of the parallax barrier, that is, an inclination angle of the viewpoint division unit, is a case in which b=9 in Equation 2, and therefore $A=\tan^{-1}$ (Hp/9Vp). Since dots viewed by the observer when the observer moves in the horizontal direction are changed in a vertical direction in the landscape mode, the head tracking function may be performed to process an image such that a dot set is moved in the vertical direction in response to the horizontal directional movement of the observer.

Comparing the pixel size in the landscape mode of FIG. 49 and the pixel size in the portrait mode of FIG. 48, a horizontal directional pitch of the pixels in the landscape mode is about three times bigger than the horizontal direction pitch of the pixels in the portrait mode. Furthermore, a vertical directional pitch of the pixels in the landscape mode is about ⅓ of a vertical directional pitch of the pixels in the portrait mode. Thus, the inclination angle of the parallax barrier in the portrait mode of FIG. 48 and the inclination angle of the parallax barrier in the landscape mode of FIG. 49 are formed to be equivalent to each other.

In addition, as shown in FIG. 48, an LR image is displayed for every three dots so that the optimal viewing distance OVD of the portrait mode and the optimal viewing distance OVD of the landscape mode may be equivalent to each other.

In addition, an aperture ratio of the opening of the parallax barrier in the portrait mode of FIG. 48 and an aperture ratio of the opening of the parallax barrier in the landscape mode of FIG. 49 are equally set to be about 33%, and no moiré occurs in both modes.

A difference between the portrait mode of FIG. 48 and the landscape mode of FIG. 49 is the alignment of the LR images and an image processing method of the head tracking function. In addition, in the portrait mode, no crosstalk occurs at the optimal location as shown in FIG. 48. In the landscape mode, crosstalk occurs at the optimal location as shown in FIG. 49. Such crosstalk, however, may be reduced by a black matrix (BM) that prevents wires and a thin film transistor connected to the plurality of pixels included in the display panel 300 from being viewed by a user. The black matrix may be provided between each of the plurality of pixels.

Figure 50:
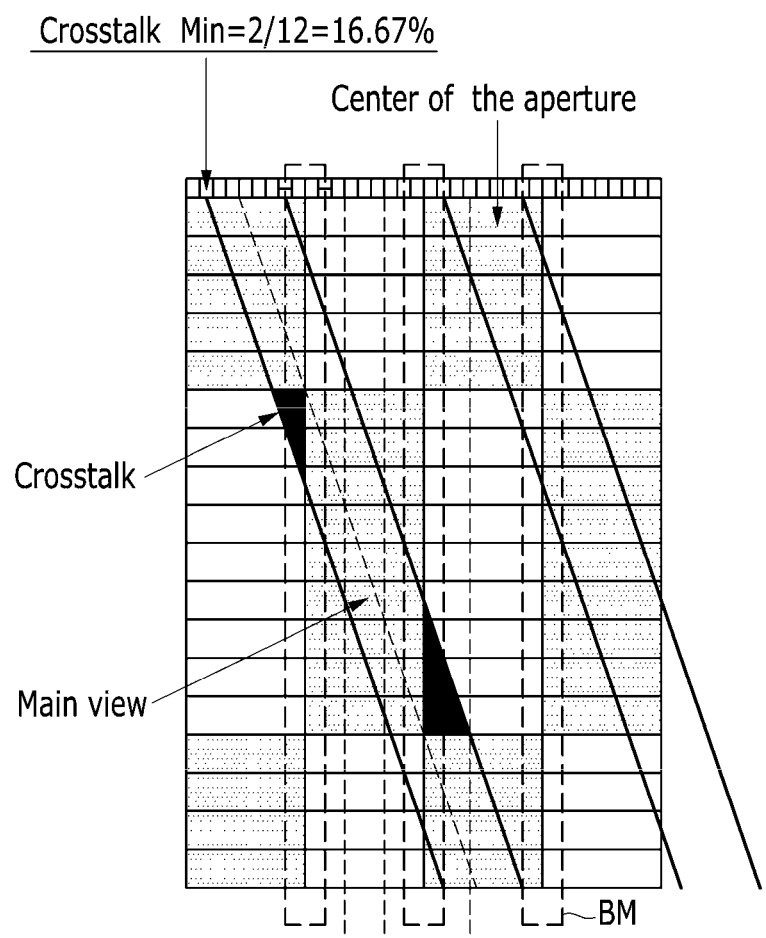
FIG. 50 and FIG. 51 exemplarily illustrate reduction of crosstalk by a black matrix in the landscape mode.
Figure 51:
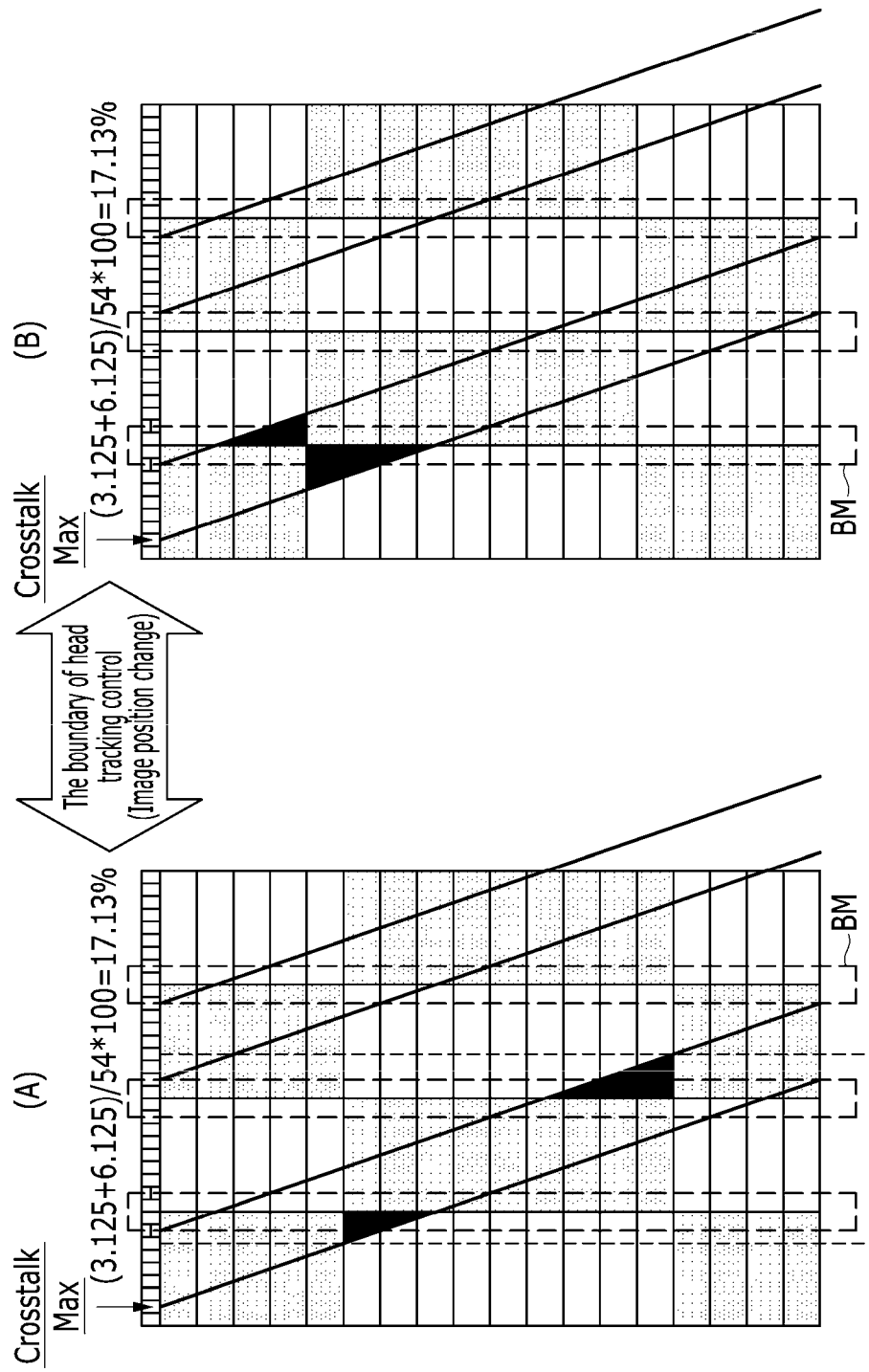

FIG. 50 and FIG. 51 show an example of using a black matrix to reduce crosstalk in the landscape mode. In particular, FIG. 50 shows a case in which occurrence of crosstalk is minimal and FIG. 51 shows a case in which occurrence of crosstalk is significant.

Referring to FIG. 50, when no black matrix is provided, the minimum value of the crosstalk is 16.67%. However, because most of the crosstalk occurs in a black matrix area, when a black matrix is provided, the crosstalk is excluded by the black matrix so that the minimum value of the crosstalk is substantially lower than 16.67%.

Portion (A) of FIG. 51 shows the position of a dot set before the dot set is moved in the vertical direction by the head tracking function through image processing. Portion (B) of FIG. 51 shows the position of the dot set after the dot set is moved in the vertical direction by the head tracking function through image processing. The maximum value of the crosstalk before and after the dot set is moved in the vertical direction is equal to 17.13%. That is, the maximum value of the crosstalk in the boundary portion where image processing is performed by the head tracking function is 17.13%. In such a case, when a black matrix is used, the maximum value of the crosstalk may become substantially lower than 17.13%.

In the portrait mode, the crosstalk can also be improved by using a black matrix. This is described later with reference to FIG. 66 and FIG. 67.

Figure 52:
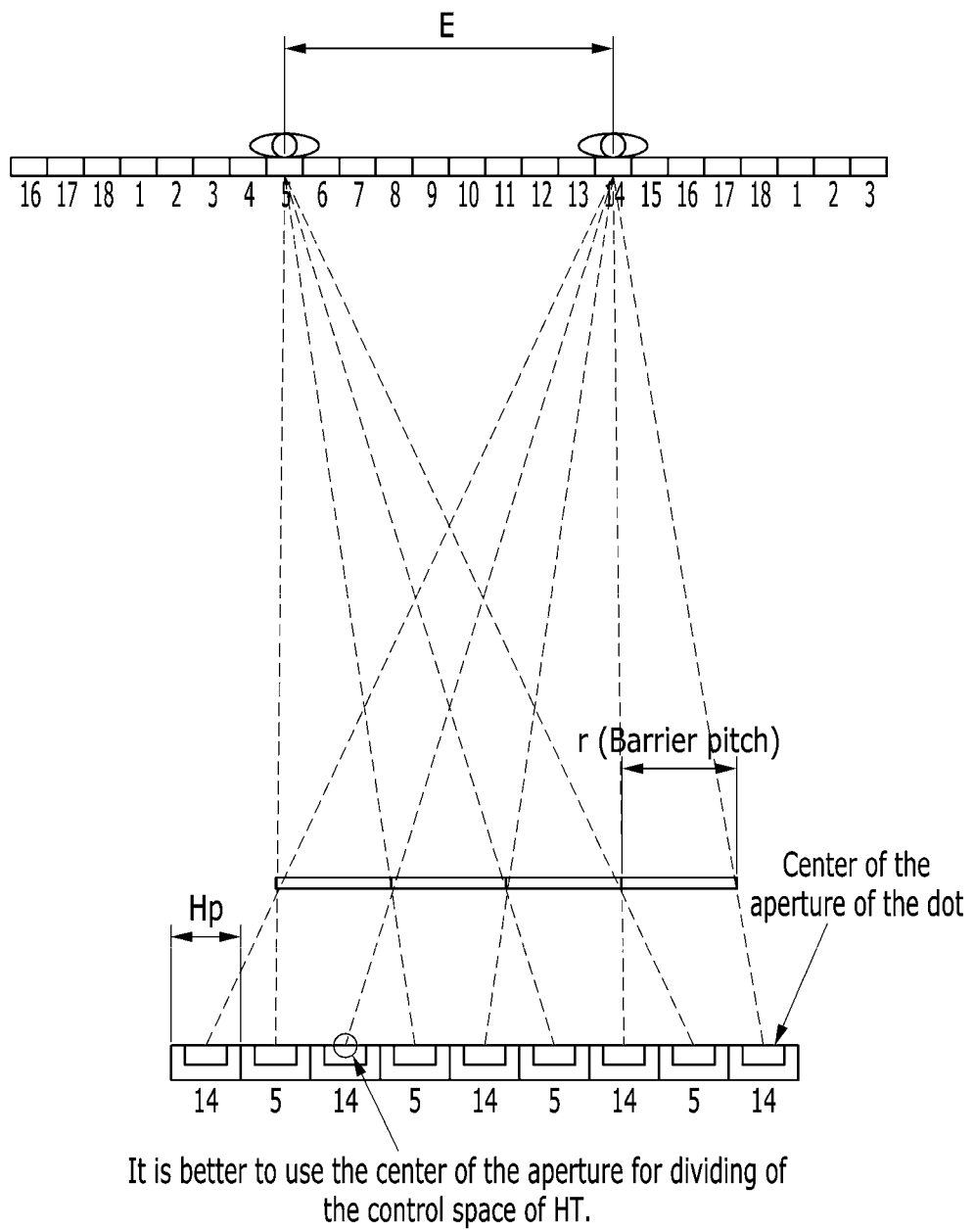
FIG. 52 exemplarily illustrates control of the head tracking function by regarding the center of an opening of a pixel as the center of a dot.

The center of an opening of a pixel defined as a black matrix may be regarded as the center of a dot. Since the head tracking function is controlled based on a state in which the pixels are in the view, the head tracking function can be controlled by regarding the center of an opening of a pixel, excluding a portion covered by the black matrix, as the center of a dot. This is described with reference to FIG. 52. FIG. 52 exemplarily illustrates control of the head tracking function by regarding the center of the opening of the pixel as the center of the dot. Referring to FIG. 52, a width between the center of an opening of a pixel (dot) and the center of an opening of an adjacent pixel (dot) may be set to a width Hp of the pixel (dot) by the black matrix, and the head tracking function can be controlled with reference thereto.

In the above description, the exemplary embodiment in which the inclination angle of the parallax barrier corresponds to b=9 in the landscape mode has been described. However, the inclination angle of the parallax barrier in the landscape mode is not limited thereto, and may have various angles.

Figure 53:
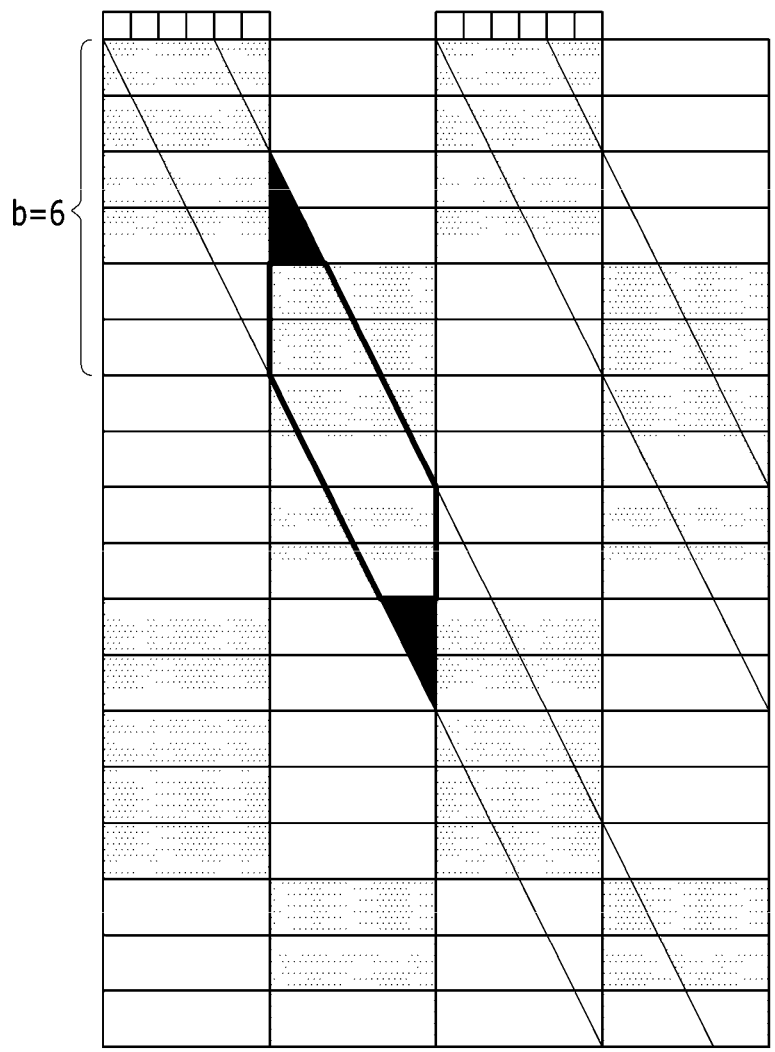
FIG. 53 and FIG. 54 show an exemplary embodiment of a parallax barrier having various inclination angles in the landscape mode.
Figure 54:
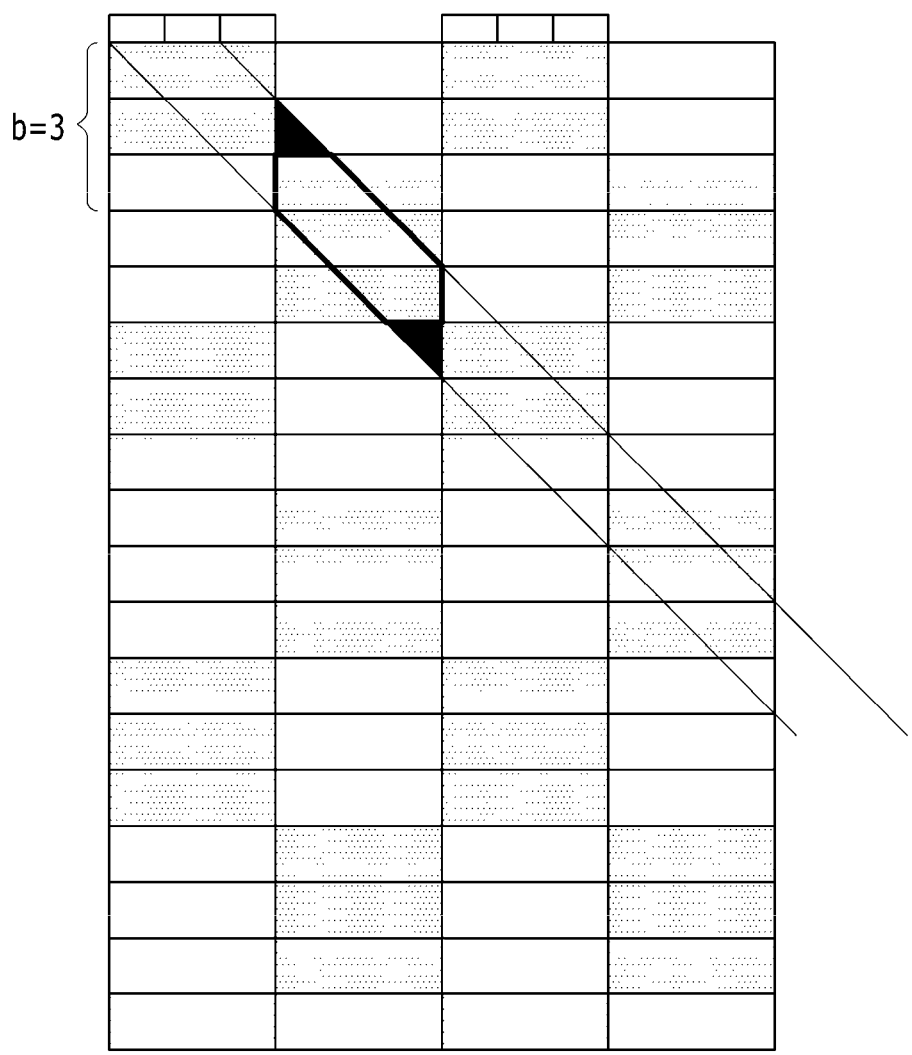

FIG. 53 and FIG. 54 show exemplary embodiments in which the parallax barrier has various inclination angles in the landscape mode.

FIG. 53 shows an exemplary embodiment in which the parallax barrier is designed with an inclination angle corresponding to b=6 in the landscape mode. In this case, an aperture ratio of the parallax barrier may be substantially realized to be 33% as in the portrait mode.

FIG. 54 shows an exemplary embodiment in which the parallax barrier is designed with an inclination angle corresponding to b=3 in the landscape mode. In this case, an aperture ratio of the parallax barrier may be substantially realized to be 33% as in the portrait mode.

As in FIG. 53 and FIG. 54, the number of dots determining an inclination angle of the parallax barrier is set to a multiple of three such that the aperture ratio can be substantially realized as 33%.

In the landscape mode, when the case in which the parallax barrier is designed with an inclination angle corresponding to b=9, the case in which the parallax barrier is designed with an inclination angle corresponding to b=6, and the case in which the parallax barrier is designed with an inclination angle corresponding to b=3 are compared based on the crosstalk and image quality, the image quality is highest when b=3 (i.e., the dot set is the smallest among the three cases) and lowest when b=9. Since the viewpoint changes less with respect to vertical directional movement of the observer as the inclination angle is closer to the vertical direction, it may be more effective to design the parallax barrier with an inclination angle corresponding to b=9 in the landscape mode to improve the performance of the stereoscopic image display device.

A method for controlling the head tracking function when the observer is not in the optimal viewing distance OVD in the landscape mode is described with reference to FIG. 55 to FIG. 58.

Figure 55:
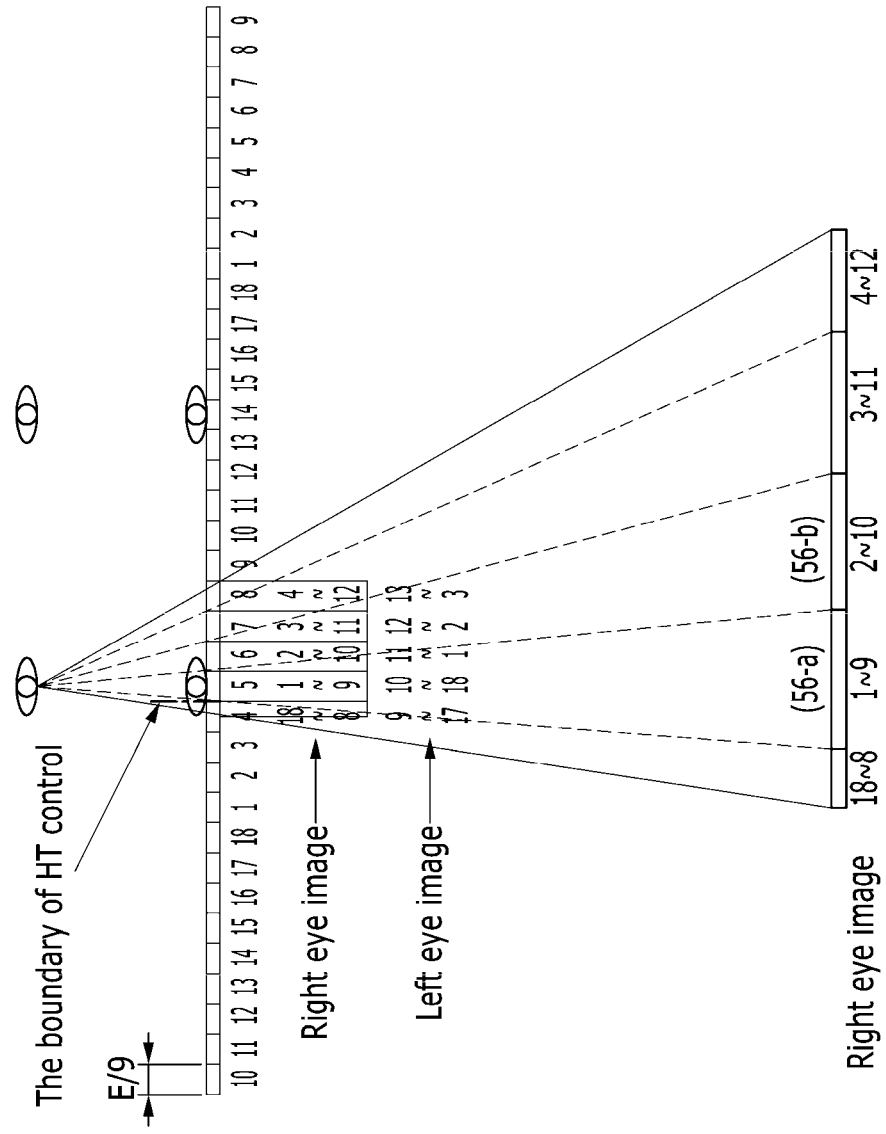

FIG. 55 shows a case in which the parallax barrier is designed with an inclination angle corresponding to b (here, b is an odd number) in the landscape mode. In this case, a boundary of an area corresponding to each dot in the optimal viewing distance OVD is set to a boundary of control of the head tracking function. As shown in the drawing, when the right eye of the observer is farther away than the optimal viewing distance OVD, a display screen may be partitioned by an extension line that connects the right eye of the observer and the boundary of the control of the head tracking function. It can be observed that an image of the right eye is displayed to b dots with reference to a dot corresponding to an area that corresponds to each dot in each partitioned area.

FIG. 56 shows a state in which different images are displayed in areas of (56-a) and (56-b) when b=9 in FIG. 55.

Figure 57:
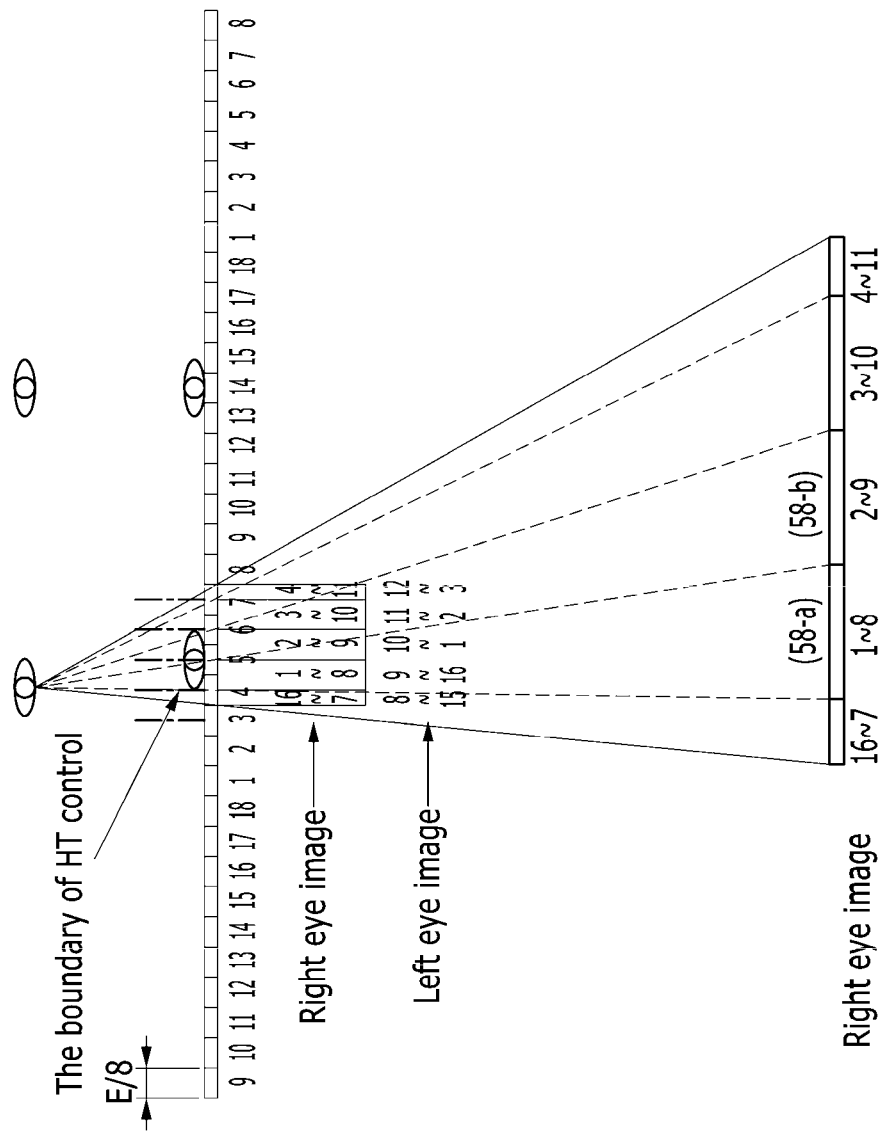

FIG. 57 shows a case in which the parallax barrier is designed with an inclination angle corresponding to b (here, b is an even number) in the landscape mode. In this case, a center of an area corresponding to each area in the optimal viewing distance OVD is set to a boundary of controlling of the head tracking function. As shown in the drawing, when the right eye of the observer is farther away than the optimal viewing distance OVD, a display screen may be partitioned by an extension line that connects the right eye of the observer and the boundary of the control of the head tracking function. An image of the right eye is displayed to b dots with reference to two dots that correspond to the center of the corresponding area of each dot that regulates a boundary of the area for each partitioned area.

FIG. 58 shows a state in which different images are displayed in areas of (58-a) and (58-b) when b=8 in FIG. 57.

As discussed above, when designing the opening of the parallax barrier, the aperture ratio and the inclination angle can be equally realized in the portrait mode and the landscape mode, such as shown in FIG. 48 and FIG. 49. However, the aperture ratio can be realized to be equal even though the inclination angle of the parallax barrier is changed in the portrait mode and the landscape mode. An exemplary embodiment related thereto is shown in FIG. 59 to FIG. 63.

Figure 59:
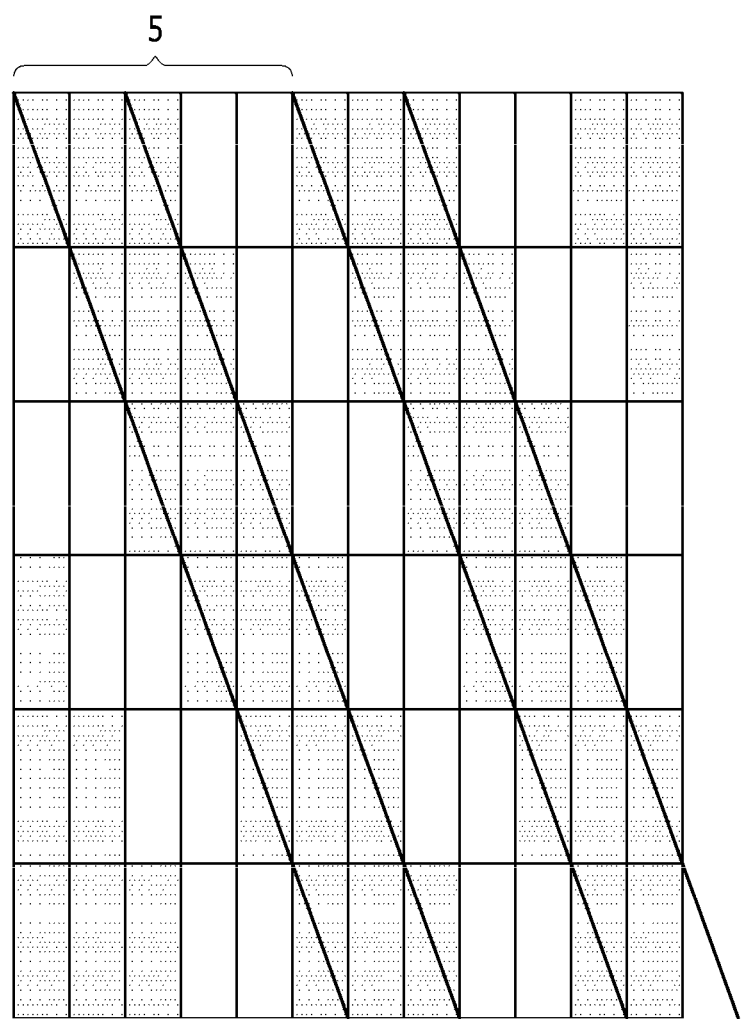
FIG. 59 exemplarily illustrates realization of an aperture ratio of the parallax barrier of 40% in the portrait mode.
Figure 60:
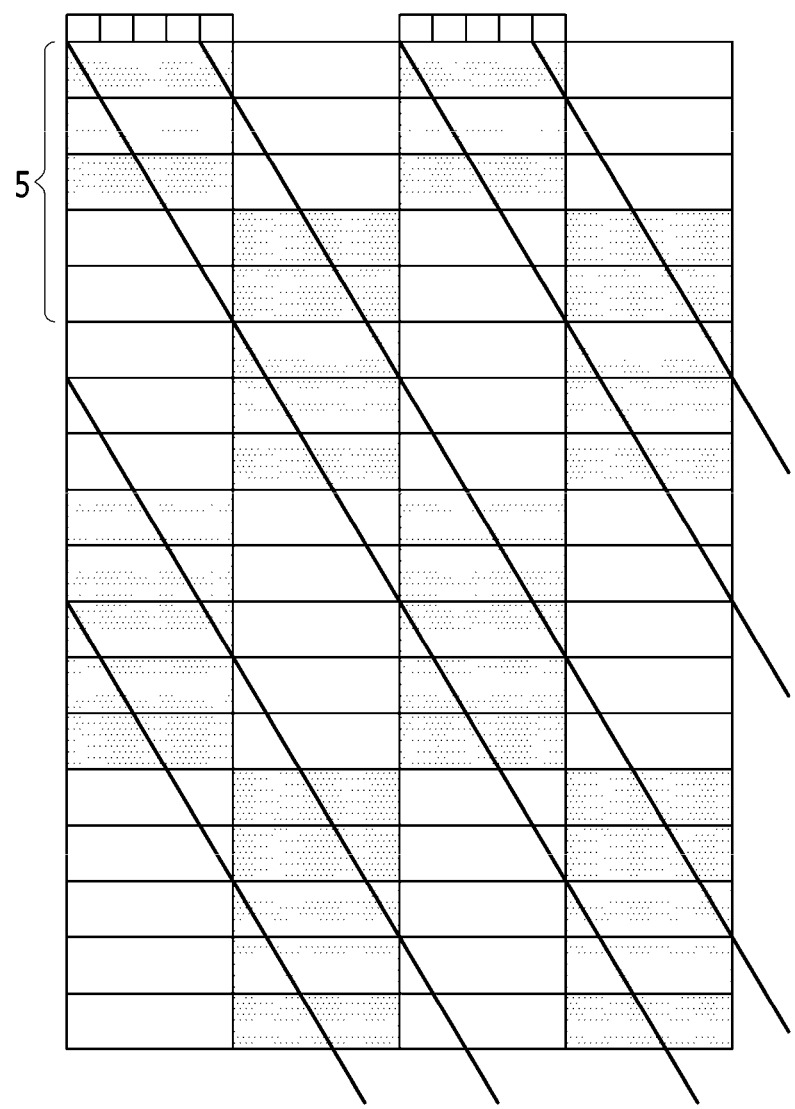
FIG. 60 and FIG. 61 exemplarily illustrate realization of the aperture ratio of the parallax barrier of 40% in the landscape mode.
Figure 61:
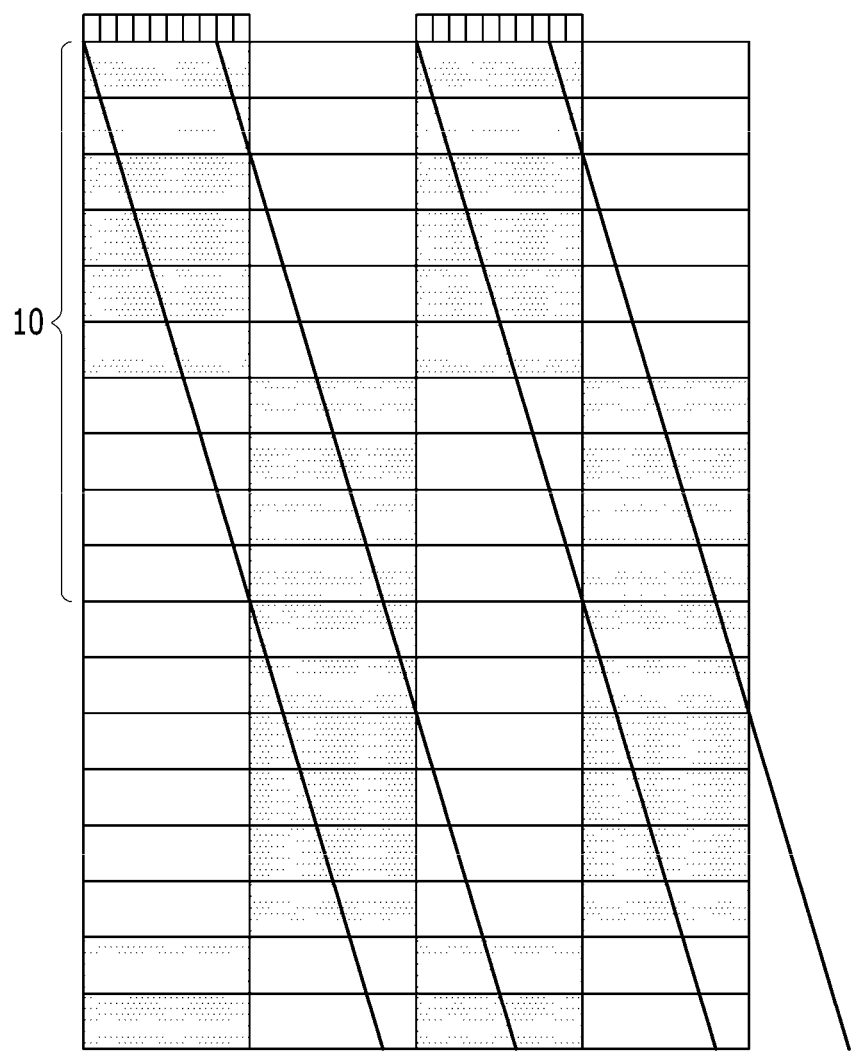
Figure 62:
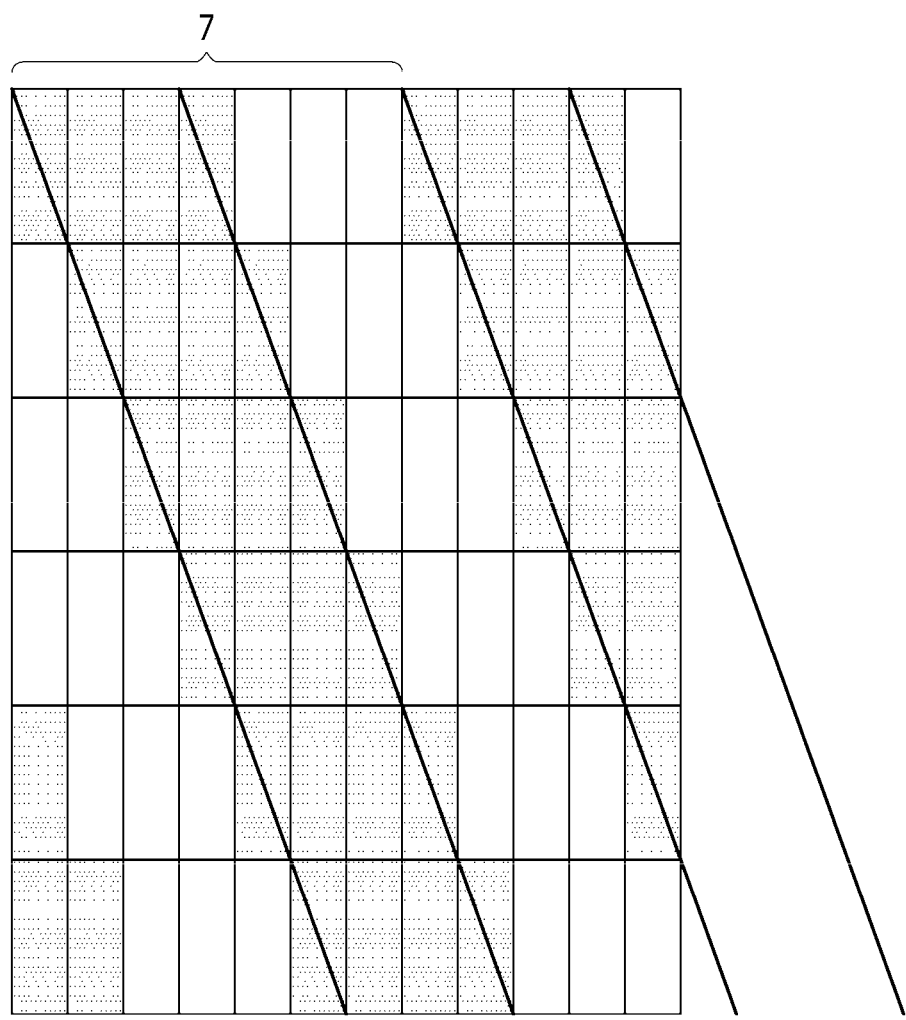
FIG. 62 exemplarily illustrates realization of the aperture ratio of the parallax barrier of 42.9% in the portrait mode.
Figure 63:
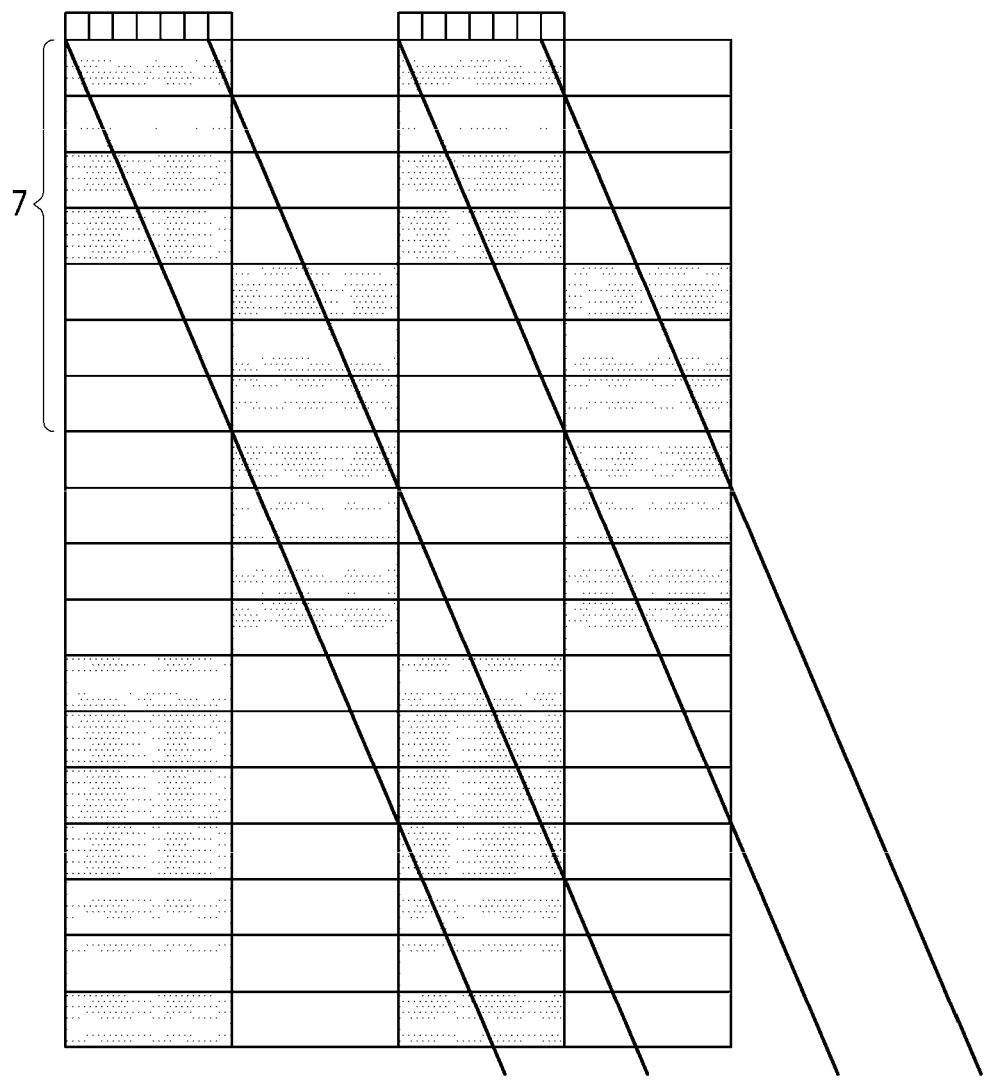
FIG. 63 exemplarily illustrates realization of the aperture ratio of the parallax barrier of 42.9% in the landscape mode.

FIG. 59 exemplarily illustrates a case in which an aperture ratio of the parallax barrier is 40% in the portrait mode FIG. 60 and FIG. 61 exemplarily illustrate a case in which an aperture ratio of the parallax barrier is 40% in the landscape mode. FIG. 62 exemplarily illustrates a case in which the aperture ratio of the parallax barrier is 42.9% in the portrait mode. FIG. 63 exemplarily illustrates a case in which the aperture ratio of the parallax barrier is 42.9% in the landscape mode.

Comparing FIG. 59, FIG. 60, and FIG. 61 to FIG. 62 and FIG. 63, a pitch of a dot set forming the LR image in the portrait mode is different from a pitch of a dot set forming the LR image in the landscape mode, and therefore the optimal viewing distance OVD between the portrait mode and the landscape mode is changed. The difference in the optimal viewing distance OVD can be followed in some degree by head tracking. Thus, an opening of the parallax barrier can be designed so that the aperture ratio in the portrait mode and the aperture ratio in the landscape mode are equal to each other, and so that the luminance between the portrait mode and the landscape mode match each other.

Figure 64:
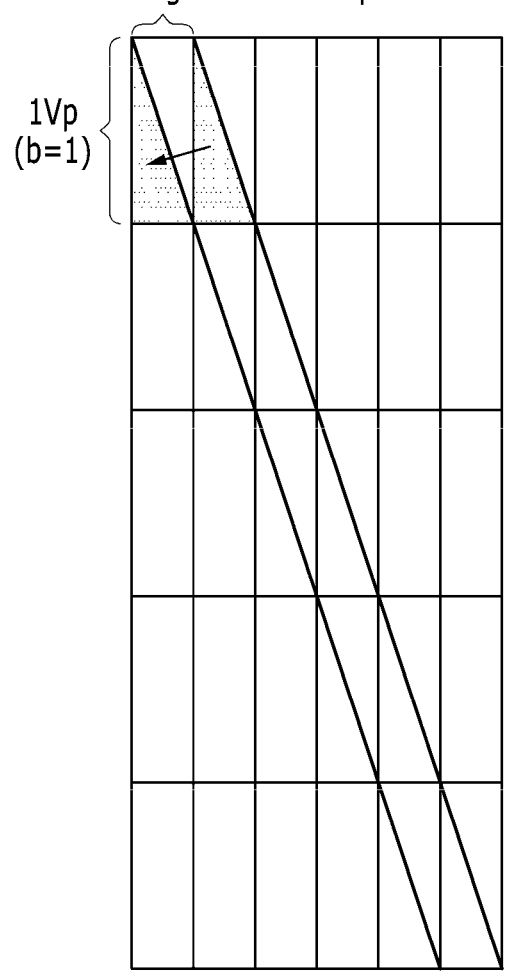
FIG. 64 shows an opening of the parallax barrier where no moiré is generated in the portrait mode, according to an exemplary embodiment.
Figure 65:
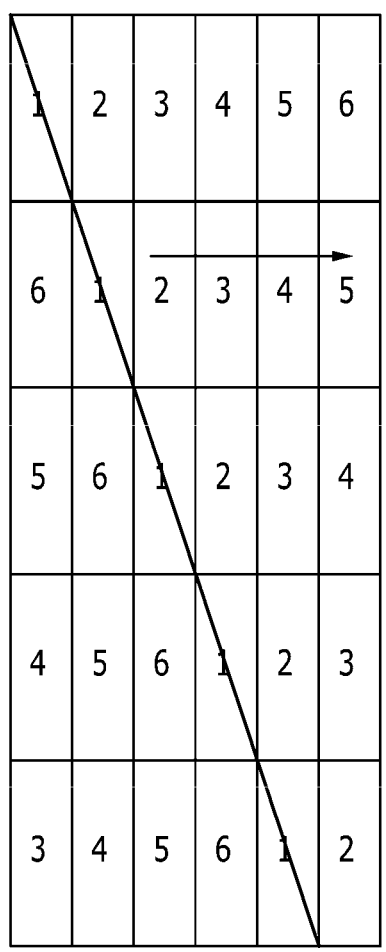
FIG. 65 shows a variation of the dots viewed according to movement of the observer, according to an exemplary embodiment.

Next, a reason that no moiré is generated is described with reference to FIG. 64 and FIG. 65 illustrate a design in which no moiré is generated, according to an embodiment. Particularly, FIG. 64 shows an opening of the parallax barrier in which no moiré is generated in the portrait mode. FIG. 65 shows a variation of dots observed according to the movement of the observer.

As shown in FIG. 64, when the width of the opening of the parallax barrier is formed to correspond to a horizontal directional pitch HP of the dot in the portrait mode, one dot is viewed through the opening. That is, the size of the area viewed through one opening becomes constant so that no moiré is generated.

In addition, as shown in FIG. 65, when the observer moves in the horizontal direction, a dot being viewed is changed in the horizontal direction. In this case, the size of an area viewed by one opening becomes constant so that no moiré is generated.

Figure 66:
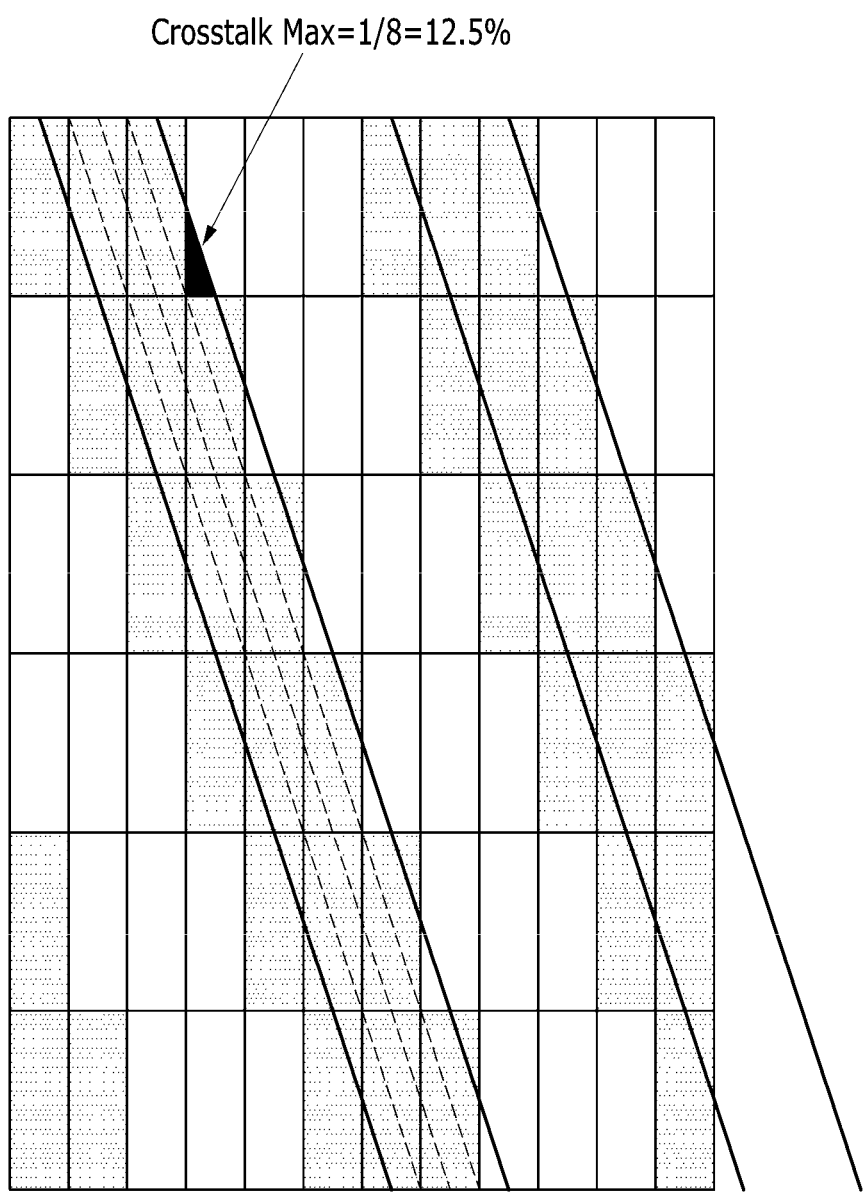
FIG. 66 and FIG. 67 exemplarily illustrate reduction of crosstalk by a black matrix in the portrait mode.
Figure 67:
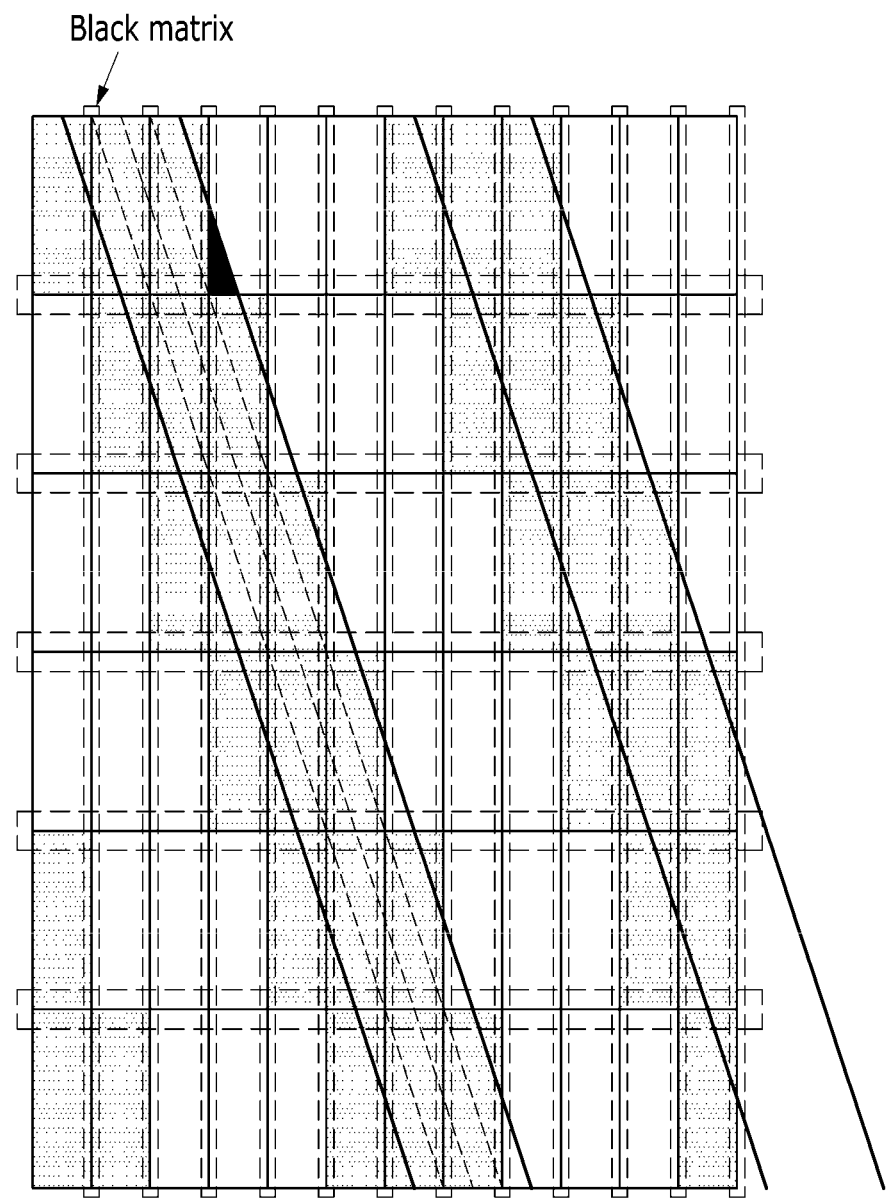

Next, an exemplary embodiment in which crosstalk is reduced by a black matrix in the portrait mode is described with reference to FIG. 66 and FIG. 67. FIG. 66 shows a case in which the maximum crosstalk occurs when no black matrix is provided. FIG. 67 shows a case in which the maximum crosstalk occurs when the black matrix is provided.

Referring to FIG. 66 and FIG. 67, the maximum value of the crosstalk is 12.5% when no black matrix is provided. However, because most of the crosstalk exists in the black matrix area, when a black matrix is provided, the crosstalk is excluded by the black matrix so that the maximum value of the crosstalk is substantially lower than 12.5%.

Figure 68:
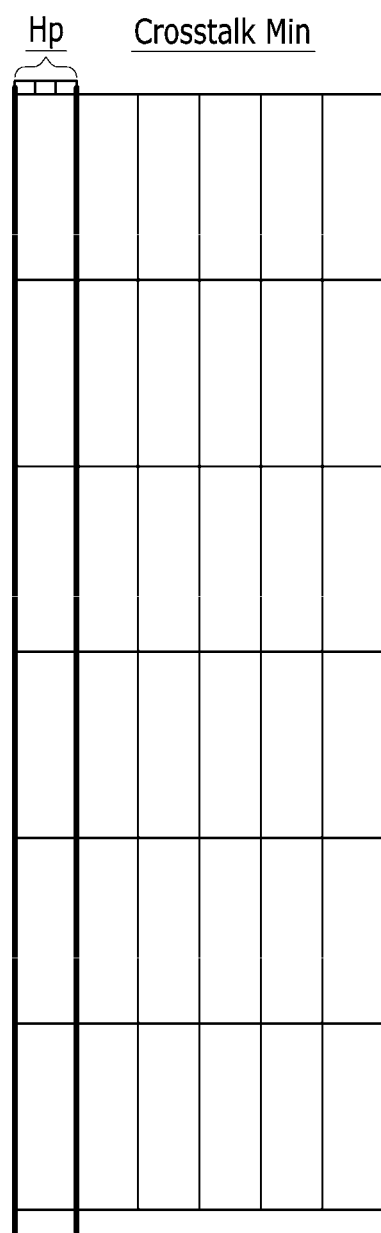
FIG. 68 and FIG. 69 show crosstalk when an opening of the parallax barrier is formed in a vertical direction, according to an exemplary embodiment.
Figure 69:
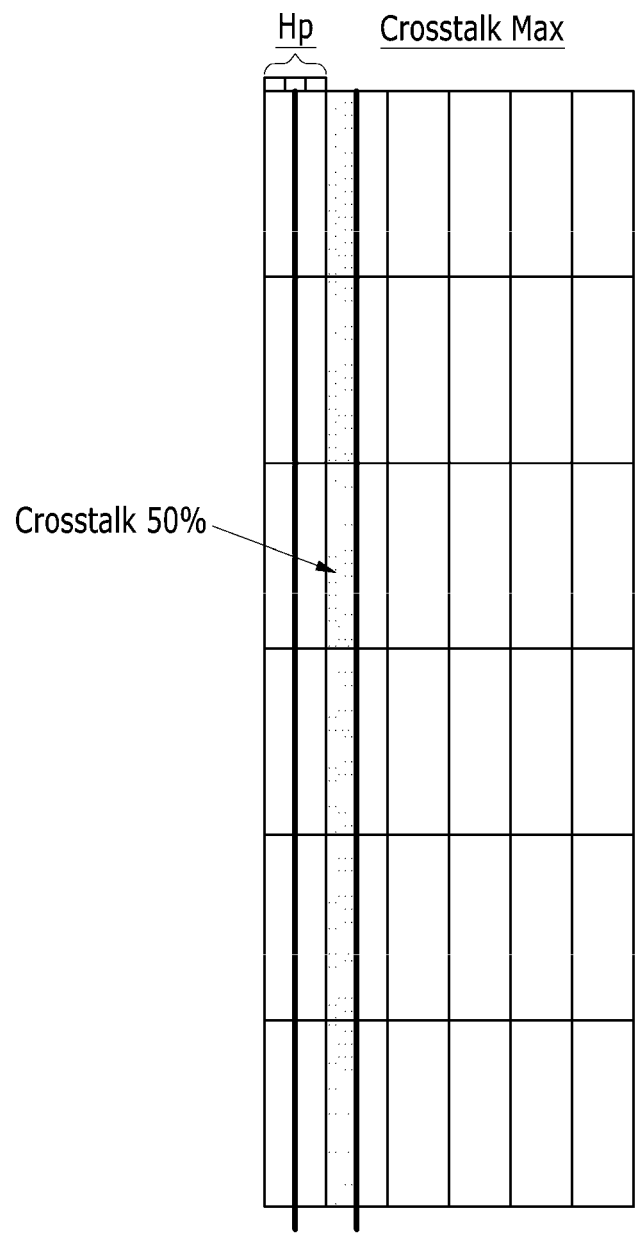
Figure 70:
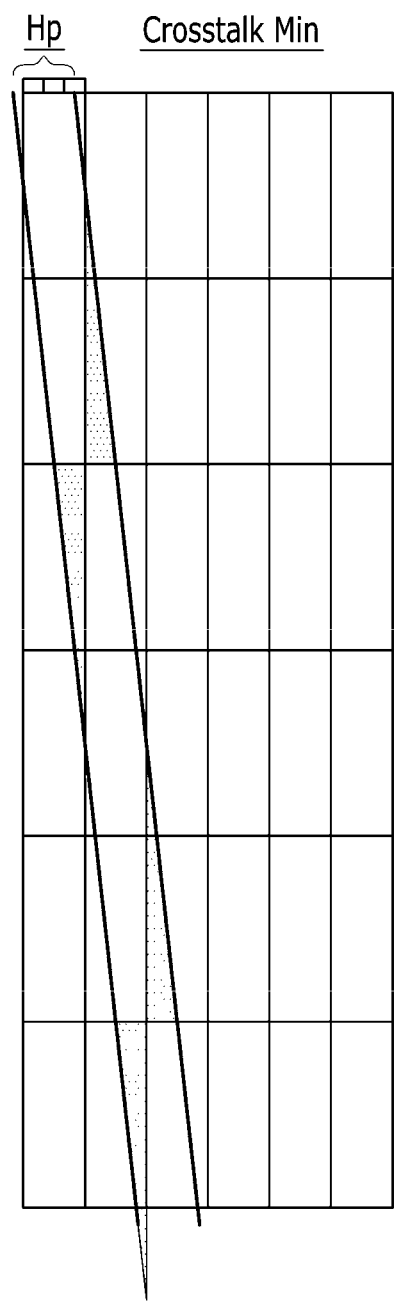
FIG. 70 and FIG. 71 show crosstalk when the opening of the parallax barrier is formed with an inclination angle inclined by a predetermined angle with respect to the vertical direction, according to an exemplary embodiment.
Figure 71:
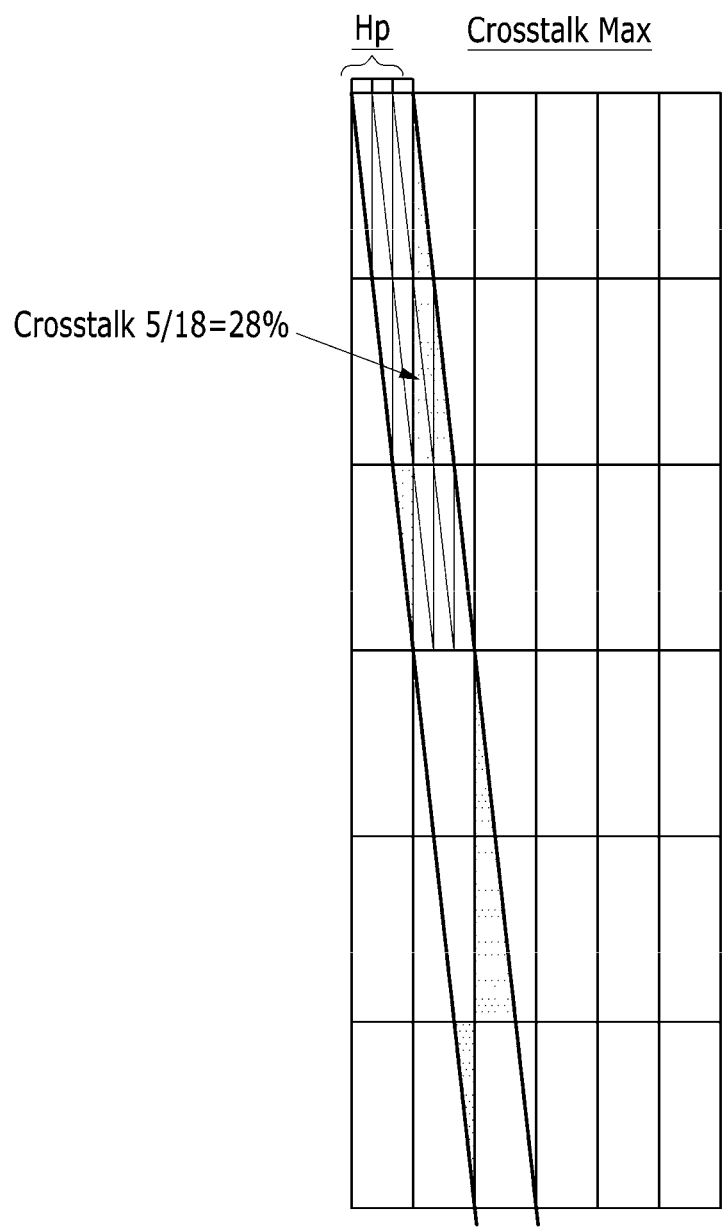

FIG. 68 and FIG. 69 show crosstalk when the opening of the parallax barrier is formed in the vertical direction. FIG. 70 and FIG. 71 show crosstalk when the opening of the parallax barrier is formed with an inclination angle that is inclined with a predetermined angle in the vertical direction.

As shown in FIG. 68 and FIG. 69, when the opening of the parallax barrier is formed in the vertical direction and the width of the opening is 1 Hp, the minimum value of the crosstalk is 0% and the maximum value of the crosstalk is 50%.

As shown in FIG. 70 and FIG. 71, when the opening of the parallax barrier is formed with an inclination angle with respect to the vertical direction and the width of the opening is 1 Hp, the minimum value of the crosstalk is substantially 25% and the maximum value of the crosstalk is substantially 28%.

The case in which the opening of the parallax barrier is formed in the vertical direction and the case in which the opening of the parallax barrier is formed with the inclination angle with respect to the vertical direction both have the same aperture ratio, but the crosstalk is smaller in the case in which the opening of the parallax barrier is formed with the inclination angle with respect to the vertical direction.

While the present system and method have been described in connection with exemplary embodiments, it is understood that the present system and method are not limited to these expressly disclosed embodiments. On the contrary, those of ordinary skill in the art would recognized that various modifications and equivalent arrangements are within the spirit and scope of the present system and method.

DESCRIPTION OF SYMBOLS

300: display panel
350: display panel driver
400: controller
410: LUT
420: sensor
800: viewpoint division unit
810: lenticular lens
820: opening of parallax barrier
830: light blocking unit of parallax barrier
850: viewpoint division unit driver

What is claimed is:

1. A stereoscopic image display device comprising:
   a display panel including a plurality of dots arranged in a matrix format; and
   a viewpoint division unit dividing light of a left-eye image and light of a right-eye image displayed by the plurality of dots and transferring the divided light to a plurality of viewpoints corresponding to each dot,
   wherein the viewpoint division unit comprises a plurality of openings and a light blocking unit, and
   when a horizontal directional width of each of the plurality of openings corresponds to an m number of dots (m is a natural number), a number of dots n adjacent in the horizontal direction displaying the left-eye image and the right-eye image is equal n=2m+1 or n=2(m+1),
   wherein when the number of dots is n=2(m+1) and a binocular distance of an observer is E, a control unit changes the dots displaying the left-eye image and the right-eye image based on sideways movement of the observer at an optimal viewing distance when the movement exceeds a sideways distance interval of 2E/n that corresponds to one dot in the optimal viewing distance, the sideways distance measured orthogonal to the optimal viewing distance.

2. The stereoscopic image display device of claim 1, wherein when the number of dots is n=2m+1, the control unit changes the dots displaying the left-eye image and the right-eye image based on sideways movement of the observer at the optimal viewing distance when the movement exceeds a sideways distance of E/n that corresponds to one dot in the optimal viewing distance.

3. The stereoscopic image display device of claim 1, wherein a free dot exists between at least one dot displaying the left-eye image and at least one dot displaying the right-eye image in the optimal viewing distance.

4. The stereoscopic image display device of claim 3, wherein when the number of dots distributed with respect to the left-eye image and the right-eye image is n=2m+1, one free dot exists.

5. The stereoscopic image display device of claim 4, wherein when m is 2, n is 5, and when m is 3, n is 7.

6. The stereoscopic image display device of claim 3, wherein when the number of dots distributed with respect to the left-eye image and the right-eye image is n=2(m+1), two free dots exist.

7. The stereoscopic image display device of claim 6, wherein m is equal to or smaller than 3, and when m is 3, n is 8.

8. A stereoscopic image display device comprising:
a display panel including a plurality of dots arranged in a matrix format; and
a viewpoint division unit dividing light of a left-eye image and light of a right-eye image displayed by the plurality of dots and transferring the divided light to a plurality of viewpoints corresponding to each dot,
wherein the viewpoint division unit comprises a plurality of openings and a light blocking unit, and
when a horizontal directional width of each of the plurality of openings corresponds to an m number of dots (m is a natural number), a number of dots n adjacent in the horizontal direction displaying the left-eye image and the right-eye image is equal n=2m+1 or n=2(m+1),
wherein a free dot exists between at least one dot displaying the left-eye image and at least one dot displaying the right-eye image in the optimal viewing distance, and
wherein when a binocular gap of an observer is E, a horizontal directional pitch of one dot is Hp, a distance between the viewpoint division unit and the display panel is g, and the optimal viewing distance is d, the following equation is satisfied:

$2E/n:d=Hp:g.$

9. The stereoscopic image display device of claim 8, wherein the opening is inclined with an inclination angle with respect to a column direction of the display panel, Vp is a column directional pitch of one dot, and the inclination angle satisfies the following equation:

$A=\tan^{-1} Hp/Vp.$

10. The stereoscopic image display device of claim 9, wherein a horizontal directional pitch of the viewpoint division unit corresponds to 2m+1 or 2(m+1) dots, and an aperture ratio of the viewpoint division unit is m/2m+1 or m/2(m+1).

11. A stereoscopic image display device comprising:
a display panel including a plurality of dots arranged in a matrix format extending in a vertical direction and a horizontal direction, each dot having one or more display pixels; and
a viewpoint division unit dividing light of a left-eye image and light of a right-eye image displayed by the plurality of dots and transferring the divided light to a plurality of viewpoints corresponding to each dot,
wherein the viewpoint division unit comprises a plurality of openings and a light blocking unit,
the opening is inclined with an inclination angle with reference to the vertical direction of the display panel, and
each of the plurality of dots is formed in a landscape mode in which a horizontal directional pitch is greater than a vertical directional pitch, the inclination angle satisfies the following equation, $$A = \tan^{-1} \frac{Hp}{Vp \times b}$$

and Hp denotes a horizontal directional pitch of a dot in the landscape mode, Vp is a vertical directional pitch of a dot, and b is a natural number.

12. The stereoscopic image display device of claim 11, wherein when a binocular distance of an observer is E, a control unit changes the dots displaying the left-eye image and the right-eye image based on sideways movement of the observer at an optimal viewing distance when the movement exceeds a sideways distance interval of E/b that corresponds to one dot in the optimal viewing distance, the sideways distance measured orthogonal to the optimal viewing distance.

13. The stereoscopic image display device of claim 12, wherein the opening is formed to have a horizontal directional width of mxHp/b (m is a natural number), a horizontal directional pitch of the viewpoint division unit has a horizontal directional width of two dots, and an aperture ratio of the viewpoint division unit is m/2b.

14. The stereoscopic image display device of claim 11, wherein when a binocular distance of an observer is E, a horizontal directional pitch of one dot is Hp, a distance between the viewpoint division unit and the display panel is g, and the optimal viewing distance is d, the following equation is satisfied:

$E:d=Hp:g.$

15. The stereoscopic image display device of claim 11, wherein when each of the plurality of dots is formed in a portrait mode in which a column directional pitch is greater than a row directional pitch, image processing is performed for a set of dots displaying the left-eye image and the right-eye image to move the images in the horizontal direction in response to movement in the horizontal direction of the observer.

16. The stereoscopic image display device of claim 11, wherein when the plurality of dots are formed in the landscape mode, image processing is performed for a set of dots displaying the left-eye image and the right-eye image to move the images in the vertical direction in response to movement in the horizontal direction of the observer.

17. The stereoscopic image display device of claim 11, wherein when the plurality of dots are formed in the landscape mode, the b is 9.

18. The stereoscopic image display device of claim 17, wherein when the plurality of dots are formed in the landscape mode and when the plurality of dots are formed in the portrait mode in which a column directional pitch is greater than a row directional pitch, the inclination angle and an aperture ratio are the same in both the landscape mode and the portrait mode.

19. The stereoscopic image display device of claim 11, wherein the display panel further comprises a black matrix provided between each of the plurality of dots, and crosstalk exists in an area of the black matrix.

* * * * *